US012608416B2

(12) United States Patent　　(10) Patent No.:　US 12,608,416 B2
Platt et al.　　　　　　　　　　(45) Date of Patent:　　　Apr. 21, 2026

(54) APPLIED ARTIFICIAL INTELLIGENCE TECHNOLOGY FOR AUTOMATICALLY GENERATING NARRATIVES FROM VISUALIZATION DATA

(71) Applicant: Salesforce, Inc., San Francisco, CA (US)

(72) Inventors: Daniel Joseph Platt, Chicago, IL (US); Mauro Eduardo Ignacio Mujica-Parodi, III, Chicago, IL (US); Lawrence A. Birnbaum, Evanston, IL (US); Alexander Rudolf Sippel, Chicago, IL (US); Jonathan Alden Drake, Chicago, IL (US); Peter Horace Sherman, Chicago, IL (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/917,502

(22) Filed: Oct. 16, 2024

(65) Prior Publication Data

US 2025/0045322 A1　　Feb. 6, 2025

Related U.S. Application Data

(63) Continuation of application No. 17/561,375, filed on Dec. 23, 2021, now Pat. No. 12,153,618, which is a
(Continued)

(51) Int. Cl.
G06F 16/00　　　(2019.01)
G06F 16/248　　　(2019.01)
(Continued)

(52) U.S. Cl.
CPC ............ G06F 16/51 (2019.01); G06F 16/248 (2019.01); G06F 16/9024 (2019.01); G06T 11/206 (2013.01)

(58) Field of Classification Search
None
See application file for complete search history.

(56) References Cited

U.S. PATENT DOCUMENTS 4,992,939　A　　2/1991　Tyler
5,619,631　A　　4/1997　Schott
(Continued)

FOREIGN PATENT DOCUMENTS

WO　　　　9630844　A1　　10/1996
WO　　2006122329　A2　　11/2006
(Continued)

OTHER PUBLICATIONS

Andersen, P., Hayes, P., Huettner, A., Schmandt, L, Nirenburg, I., and Weinstein, S. (1992). Automatic extraction of facts from press releases to generate news stories. In Proceedings of the third conference on Applied natural language processing. (Trento, Italy). ACM Press, New York, NY170-177.
(Continued)

*Primary Examiner* — Bai D Vu
(74) *Attorney, Agent, or Firm* — Polygon IP, LLP

(57)　　　　　　　ABSTRACT

Disclosed herein are example embodiments that describe how a narrative generation techniques can be used in connection with data visualization tools to automatically generate narratives that explain the information conveyed by a visualization of a data set. In example embodiments, new data structures and artificial intelligence (AI) logic can be used by narrative generation software to map different types of visualizations to different types of story configurations that will drive how narrative text is generated by the narrative generation software.

20 Claims, 39 Drawing Sheets

Related U.S. Application Data continuation of application No. 15/414,027, filed on Jan. 24, 2017, now Pat. No. 11,222,184, and a continuation of application No. 15/414,089, filed on Jan. 24, 2017, now Pat. No. 11,232,268, which is a continuation of application No. 15/253,385, filed on Aug. 31, 2016, now Pat. No. 11,238,090.

(60) Provisional application No. 62/249,813, filed on Nov. 2, 2015.

(51) Int. Cl.
| | |
|---|---|
| *G06F 16/51* | (2019.01) |
| *G06F 16/901* | (2019.01) |
| *G06T 11/20* | (2006.01) |

(56) References Cited

U.S. PATENT DOCUMENTS

| | | | |
|---|---|---|---|
| 5,687,364 | A | 11/1997 | Saund |
| 5,734,916 | A | 3/1998 | Greenfield |
| 5,794,050 | A | 8/1998 | Dahlgren |
| 5,802,495 | A | 9/1998 | Goltra |
| 5,999,664 | A | 12/1999 | Mahoney |
| 6,006,175 | A | 12/1999 | Holzrichter |
| 6,144,938 | A | 11/2000 | Surace |
| 6,278,967 | B1 | 8/2001 | Akers |
| 6,289,363 | B1 | 9/2001 | Consolatti |
| 6,502,081 | B1 | 12/2002 | Wiltshire, Jr. |
| 6,622,152 | B1 | 9/2003 | Sinn |
| 6,651,218 | B1 | 11/2003 | Adler |
| 6,665,666 | B1 | 12/2003 | Brown |
| 6,697,998 | B1 | 2/2004 | Damerau |
| 6,757,362 | B1 | 6/2004 | Cooper |
| 6,771,290 | B1 | 8/2004 | Hoyle |
| 6,810,111 | B1 | 10/2004 | Hunter |
| 6,820,237 | B1 | 11/2004 | Abu-Hakima |
| 6,917,936 | B2 | 7/2005 | Cancedda |
| 6,968,316 | B1 | 11/2005 | Hamilton |
| 6,976,031 | B1 | 12/2005 | Toupal |
| 6,976,207 | B1 | 12/2005 | Rujan |
| 7,027,974 | B1 | 4/2006 | Busch |
| 7,085,771 | B2 | 8/2006 | Chung |
| 7,089,241 | B1 | 8/2006 | Alspector |
| 7,191,119 | B2 | 3/2007 | Epstein |
| 7,246,315 | B1 | 7/2007 | Andrieu |
| 7,324,936 | B2 | 1/2008 | Saldanha |
| 7,333,967 | B1 | 2/2008 | Bringsjord |
| 7,496,567 | B1 | 2/2009 | Steichen |
| 7,496,621 | B2 | 2/2009 | Pan |
| 7,577,634 | B2 | 8/2009 | Ryan |
| 7,610,279 | B2 | 10/2009 | Budzik |
| 7,617,199 | B2 | 11/2009 | Budzik |
| 7,617,200 | B2 | 11/2009 | Budzik |
| 7,627,565 | B2 | 12/2009 | Budzik |
| 7,644,072 | B2 | 1/2010 | Budzik |
| 7,657,518 | B2 | 2/2010 | Budzik |
| 7,716,116 | B2 | 5/2010 | Schiller |
| 7,756,810 | B2 | 7/2010 | Nelken |
| 7,778,895 | B1 | 8/2010 | Baxter |
| 7,818,329 | B2 | 10/2010 | Campbell |
| 7,818,676 | B2 | 10/2010 | Baker |
| 7,825,929 | B2 | 11/2010 | Kincaid |
| 7,836,010 | B2 | 11/2010 | Hammond |
| 7,840,448 | B2 | 11/2010 | Musgrove |
| 7,856,390 | B2 | 12/2010 | Schiller |
| 7,865,496 | B1 | 1/2011 | Schiller |
| 7,930,169 | B2 | 4/2011 | Billerey-Mosier |
| 8,027,941 | B2 | 9/2011 | Probst |
| 8,046,226 | B2 | 10/2011 | Soble |
| 8,055,608 | B1 | 11/2011 | Rehling |
| 8,190,423 | B2 | 5/2012 | Rehberg |
| 8,311,863 | B1 | 11/2012 | Kemp |
| 8,355,903 | B1 | 1/2013 | Birnbaum |
| 8,355,904 | B2 | 1/2013 | Lee |
| 8,374,848 | B1 | 2/2013 | Birnbaum |
| 8,442,940 | B1 | 5/2013 | Faletti |
| 8,447,604 | B1 | 5/2013 | Chang |
| 8,458,154 | B2 | 6/2013 | Eden |
| 8,463,695 | B2 | 6/2013 | Schiller |
| 8,468,244 | B2 | 6/2013 | Redlich |
| 8,494,944 | B2 | 7/2013 | Schiller |
| 8,495,002 | B2 | 7/2013 | Nelken |
| 8,515,737 | B2 | 8/2013 | Allen |
| 8,612,208 | B2 | 12/2013 | Cooper |
| 8,630,844 | B1 | 1/2014 | Nichols |
| 8,630,912 | B2 | 1/2014 | Seki |
| 8,630,919 | B2 | 1/2014 | Baran |
| 8,645,124 | B2 | 2/2014 | Karov Zangvil |
| 8,645,825 | B1 | 2/2014 | Cornea |
| 8,661,001 | B2 | 2/2014 | Eliashberg |
| 8,676,691 | B2 | 3/2014 | Schiller |
| 8,688,434 | B1 | 4/2014 | Birnbaum |
| 8,751,563 | B1 | 6/2014 | Warden |
| 8,752,134 | B2 | 6/2014 | Ma |
| 8,762,133 | B2 | 6/2014 | Reiter |
| 8,762,134 | B2 | 6/2014 | Reiter |
| 8,762,285 | B2 | 6/2014 | Davis |
| 8,775,161 | B1 | 7/2014 | Nichols |
| 8,812,311 | B2 | 8/2014 | Weber |
| 8,819,001 | B1 | 8/2014 | Zhang |
| 8,843,363 | B2 | 9/2014 | Birnbaum |
| 8,886,520 | B1 | 11/2014 | Nichols |
| 8,892,417 | B1 | 11/2014 | Nichols |
| 8,892,419 | B2 | 11/2014 | Lundberg |
| 8,903,711 | B2 | 12/2014 | Lundberg |
| 8,909,645 | B2 | 12/2014 | Eden |
| 8,977,953 | B1 | 3/2015 | Pierre |
| 9,037,583 | B2 | 5/2015 | Nitesh |
| 9,047,283 | B1 | 6/2015 | Zhang |
| 9,111,534 | B1 | 8/2015 | Sylvester |
| 9,135,244 | B2 | 9/2015 | Reiter |
| 9,164,982 | B1 | 10/2015 | Kaeser |
| 9,208,147 | B1 | 12/2015 | Nichols |
| 9,244,894 | B1 | 1/2016 | Dale |
| 9,251,134 | B2 | 2/2016 | Birnbaum |
| 9,323,743 | B2 | 4/2016 | Reiter |
| 9,336,193 | B2 | 5/2016 | Logan |
| 9,342,588 | B2 | 5/2016 | Balchandran |
| 9,348,815 | B1 | 5/2016 | Estes |
| 9,355,093 | B2 | 5/2016 | Reiter |
| 9,396,168 | B2 | 7/2016 | Birnbaum |
| 9,396,181 | B1 | 7/2016 | Sripada |
| 9,396,758 | B2 | 7/2016 | Oz |
| 9,405,448 | B2 | 8/2016 | Reiter |
| 9,424,254 | B2 | 8/2016 | Howald |
| 9,430,557 | B2 | 8/2016 | Bhat |
| 9,460,075 | B2 | 10/2016 | Mungi |
| 9,473,637 | B1 | 10/2016 | Venkatapathy |
| 9,483,520 | B1 | 11/2016 | Reiner |
| 9,507,867 | B2 | 11/2016 | Johns |
| 9,529,795 | B2 | 12/2016 | Kondadadi |
| 9,535,902 | B1 | 1/2017 | Michalak |
| 9,536,049 | B2 | 1/2017 | Brown |
| 9,569,729 | B1 | 2/2017 | Oehrle |
| 9,576,009 | B1 | 2/2017 | Hammond |
| 9,594,756 | B2 | 3/2017 | Sabharwal |
| 9,630,912 | B2 | 4/2017 | Li |
| 9,665,259 | B2 | 5/2017 | Lee |
| 9,697,178 | B1 | 7/2017 | Nichols |
| 9,697,192 | B1 | 7/2017 | Estes |
| 9,697,197 | B1 | 7/2017 | Birnbaum |
| 9,697,492 | B1 | 7/2017 | Birnbaum |
| 9,720,884 | B2 | 8/2017 | Birnbaum |
| 9,720,899 | B1 | 8/2017 | Birnbaum |
| 9,741,151 | B2 | 8/2017 | Breedvelt-Schouten |
| 9,767,145 | B2 | 9/2017 | Prophete |
| 9,773,166 | B1 | 9/2017 | Connor |
| 9,792,277 | B2 | 10/2017 | Srinivasan |
| 9,870,362 | B2 | 1/2018 | Lee |
| 9,870,629 | B2 | 1/2018 | Cardno |
| 9,875,494 | B2 | 1/2018 | Kalns |
| 9,910,914 | B1 | 3/2018 | Cowley |
| 9,946,711 | B2 | 4/2018 | Reiter |

(56) References Cited

U.S. PATENT DOCUMENTS

| | | |
|---|---|---|
| 9,971,967 B2 | 5/2018 | Bufe, III |
| 9,977,773 B1 | 5/2018 | Birnbaum |
| 9,990,337 B2 | 6/2018 | Birnbaum |
| 10,019,512 B2 | 7/2018 | Boyle |
| 10,031,901 B2 | 7/2018 | Chakra |
| 10,037,377 B2 | 7/2018 | Boyle |
| 10,049,152 B2 | 8/2018 | Ajmera |
| 10,068,185 B2 | 9/2018 | Amershi |
| 10,073,840 B2 | 9/2018 | Hakkani-Tur |
| 10,073,861 B2 | 9/2018 | Shamir |
| 10,095,692 B2 | 10/2018 | Song |
| 10,101,889 B2 | 10/2018 | Prophete |
| 10,115,108 B1 | 10/2018 | Gendelev |
| 10,162,900 B1 | 12/2018 | Chatterjee |
| 10,185,477 B1 | 1/2019 | Paley |
| 10,268,678 B2 | 4/2019 | Qiu |
| 10,332,297 B1 | 6/2019 | Vadodaria |
| 10,339,423 B1 | 7/2019 | Dinerstein |
| 10,387,970 B1 | 8/2019 | Wang |
| 10,416,841 B2 | 9/2019 | Riche |
| 10,482,381 B2 | 11/2019 | Nichols |
| 10,489,488 B2 | 11/2019 | Birnbaum |
| 10,565,308 B2 | 2/2020 | Reiter |
| 10,572,606 B1 | 2/2020 | Paley |
| 10,579,835 B1 | 3/2020 | Phillips |
| 10,585,983 B1 | 3/2020 | Paley |
| 10,599,767 B1 | 3/2020 | Mattera |
| 10,599,885 B2 | 3/2020 | Galitsky |
| 10,606,953 B2 | 3/2020 | Mulwad |
| 10,621,183 B1 | 4/2020 | Chatterjee |
| 10,657,201 B1 | 5/2020 | Nichols |
| 10,679,011 B2 | 6/2020 | Galitsky |
| 10,698,585 B2 | 6/2020 | Kraljic |
| 10,699,079 B1 | 6/2020 | Paley |
| 10,706,045 B1 | 7/2020 | Hasija |
| 10,706,236 B1 | 7/2020 | Platt |
| 10,706,428 B2 | 7/2020 | Crites |
| 10,713,442 B1 | 7/2020 | Paley |
| 10,719,542 B1 | 7/2020 | Paley |
| 10,726,061 B2 | 7/2020 | Chu |
| 10,726,338 B2 | 7/2020 | Byron |
| 10,747,823 B1 | 8/2020 | Birnbaum |
| 10,755,042 B2 | 8/2020 | Birnbaum |
| 10,755,046 B1 | 8/2020 | Lewis Meza |
| 10,755,053 B1 | 8/2020 | Paley |
| 10,762,304 B1 | 9/2020 | Paley |
| 10,810,260 B2 | 10/2020 | Chen |
| 10,853,583 B1 | 12/2020 | Platt |
| 10,943,069 B1 | 3/2021 | Paley |
| 10,956,656 B2 | 3/2021 | Birnbaum |
| 10,963,493 B1 | 3/2021 | Hu |
| 10,963,649 B1 | 3/2021 | Sippel |
| 10,990,767 B1 | 4/2021 | Smathers |
| 11,003,866 B1 | 5/2021 | Sippel |
| 11,023,689 B1 | 6/2021 | Sippel |
| 11,030,408 B1 | 6/2021 | Lewis Meza |
| 11,030,697 B2 | 6/2021 | Erard |
| 11,037,342 B1 | 6/2021 | Agnew |
| 11,042,708 B1 | 6/2021 | Pham |
| 11,042,709 B1 | 6/2021 | Pham |
| 11,042,713 B1 | 6/2021 | Platt |
| 11,055,497 B2 | 7/2021 | Noh |
| 11,068,661 B1 | 7/2021 | Nichols |
| 11,074,286 B2 | 7/2021 | Byron |
| 11,126,798 B1 | 9/2021 | Lewis Meza |
| 11,144,838 B1 | 10/2021 | Platt |
| 11,170,038 B1 | 11/2021 | Platt |
| 11,182,556 B1 | 11/2021 | Lewis Meza |
| 11,188,588 B1 | 11/2021 | Platt |
| 11,222,184 B1 | 1/2022 | Platt |
| 11,232,268 B1 | 1/2022 | Platt |
| 11,232,270 B1 | 1/2022 | Platt |
| 11,238,090 B1 | 2/2022 | Platt |
| 11,270,211 B2 | 3/2022 | Ramos |
| 11,288,328 B2 | 3/2022 | Birnbaum |
| 11,334,726 B1 | 5/2022 | Platt |
| 11,341,330 B1 | 5/2022 | Smathers |
| 11,341,338 B1 | 5/2022 | Platt |
| 11,392,773 B1 | 7/2022 | Gangadharaiah |
| 11,475,076 B2 | 10/2022 | Birnbaum |
| 11,501,220 B2 | 11/2022 | Birnbaum |
| 11,521,079 B2 | 12/2022 | Nichols |
| 11,561,684 B1 | 1/2023 | Paley |
| 11,561,986 B1 | 1/2023 | Sippel |
| 11,562,146 B2 | 1/2023 | Paley |
| 11,568,148 B1 | 1/2023 | Nichols |
| 11,670,288 B1 | 6/2023 | Das |
| 11,741,301 B2 | 8/2023 | Birnbaum |
| 11,954,445 B2 | 4/2024 | Nichols |
| 2002/0046018 A1 | 4/2002 | Marcu |
| 2002/0083025 A1 | 6/2002 | Robarts |
| 2002/0099730 A1 | 7/2002 | Brown |
| 2002/0107721 A1 | 8/2002 | Darwent |
| 2003/0004706 A1 | 1/2003 | Yale |
| 2003/0061029 A1 | 3/2003 | Shaket |
| 2003/0084066 A1 | 5/2003 | Waterman |
| 2003/0110186 A1 | 6/2003 | Markowski |
| 2003/0182102 A1 | 9/2003 | Corston-Oliver |
| 2003/0212543 A1 | 11/2003 | Epstein |
| 2003/0216905 A1 | 11/2003 | Chelba |
| 2003/0217335 A1 | 11/2003 | Chung |
| 2004/0015342 A1 | 1/2004 | Garst |
| 2004/0029977 A1 | 2/2004 | Kawa |
| 2004/0034520 A1 | 2/2004 | Langkilde-Geary |
| 2004/0068691 A1 | 4/2004 | Asbury |
| 2004/0083092 A1 | 4/2004 | Valles |
| 2004/0093557 A1 | 5/2004 | Kawatani |
| 2004/0103116 A1 | 5/2004 | Palanisamy |
| 2004/0138899 A1 | 7/2004 | Birnbaum |
| 2004/0174397 A1 | 9/2004 | Cereghini |
| 2004/0225651 A1 | 11/2004 | Musgrove |
| 2004/0230989 A1 | 11/2004 | Macey |
| 2004/0255232 A1 | 12/2004 | Hammond |
| 2005/0027704 A1 | 2/2005 | Hammond |
| 2005/0028156 A1 | 2/2005 | Hammond |
| 2005/0033582 A1 | 2/2005 | Gadd |
| 2005/0049852 A1 | 3/2005 | Chao |
| 2005/0125213 A1 | 6/2005 | Chen |
| 2005/0137854 A1 | 6/2005 | Cancedda |
| 2005/0223021 A1 | 10/2005 | Batra |
| 2005/0273362 A1 | 12/2005 | Harris |
| 2006/0031182 A1 | 2/2006 | Ryan |
| 2006/0074634 A1 | 4/2006 | Gao |
| 2006/0100852 A1 | 5/2006 | Gamon |
| 2006/0101335 A1 | 5/2006 | Pisciottano |
| 2006/0155662 A1 | 7/2006 | Murakami |
| 2006/0165040 A1 | 7/2006 | Rathod |
| 2006/0181531 A1 | 8/2006 | Goldschmidt |
| 2006/0212446 A1 | 9/2006 | Hammond |
| 2006/0218485 A1 | 9/2006 | Blumenthal |
| 2006/0224570 A1 | 10/2006 | Quiroga |
| 2006/0241936 A1 | 10/2006 | Katae |
| 2006/0253431 A1 | 11/2006 | Bobick |
| 2006/0253783 A1 | 11/2006 | Vronay |
| 2006/0271535 A1 | 11/2006 | Hammond |
| 2006/0277168 A1 | 12/2006 | Hammond |
| 2007/0132767 A1 | 6/2007 | Wright |
| 2007/0136657 A1 | 6/2007 | Blumenthal |
| 2007/0185846 A1 | 8/2007 | Budzik |
| 2007/0185847 A1 | 8/2007 | Budzik |
| 2007/0185861 A1 | 8/2007 | Budzik |
| 2007/0185862 A1 | 8/2007 | Budzik |
| 2007/0185863 A1 | 8/2007 | Budzik |
| 2007/0185864 A1 | 8/2007 | Budzik |
| 2007/0185865 A1 | 8/2007 | Budzik |
| 2007/0250479 A1 | 10/2007 | Lunt |
| 2007/0250826 A1 | 10/2007 | O'Brien |
| 2007/0294201 A1 | 12/2007 | Nelken |
| 2008/0005677 A1 | 1/2008 | Thompson |
| 2008/0140696 A1 | 6/2008 | Mathuria |
| 2008/0198156 A1 | 8/2008 | Jou |
| 2008/0243285 A1 | 10/2008 | Reichhart |
| 2008/0250070 A1 | 10/2008 | Abdulla |
| 2008/0256066 A1 | 10/2008 | Zuckerman |

(56) References Cited

U.S. PATENT DOCUMENTS

| | | |
|---|---|---|
| 2008/0304808 A1 | 12/2008 | Newell |
| 2008/0306882 A1 | 12/2008 | Schiller |
| 2008/0312904 A1 | 12/2008 | Balchandran |
| 2008/0312906 A1 | 12/2008 | Balchandran |
| 2008/0313130 A1 | 12/2008 | Hammond |
| 2009/0019013 A1 | 1/2009 | Tareen |
| 2009/0030899 A1 | 1/2009 | Tareen |
| 2009/0049038 A1 | 2/2009 | Gross |
| 2009/0049041 A1 | 2/2009 | Tareen |
| 2009/0055164 A1 | 2/2009 | Hu |
| 2009/0083288 A1 | 3/2009 | Ledain |
| 2009/0089100 A1 | 4/2009 | Nenov |
| 2009/0116755 A1 | 5/2009 | Neogi |
| 2009/0119095 A1 | 5/2009 | Beggelman |
| 2009/0119584 A1 | 5/2009 | Herbst |
| 2009/0144608 A1 | 6/2009 | Oisel |
| 2009/0144609 A1 | 6/2009 | Liang |
| 2009/0150156 A1 | 6/2009 | Kennewick |
| 2009/0157664 A1 | 6/2009 | Wen |
| 2009/0175545 A1 | 7/2009 | Cancedda |
| 2009/0187556 A1 | 7/2009 | Ross |
| 2009/0248399 A1 | 10/2009 | Au |
| 2009/0254572 A1 | 10/2009 | Redlich |
| 2010/0043057 A1 | 2/2010 | Di Battista |
| 2010/0075281 A1 | 3/2010 | Manuel-Devadoss Johnson Smith |
| 2010/0082325 A1 | 4/2010 | Manuel-Devadoss Johnson Smith |
| 2010/0146393 A1 | 6/2010 | Land |
| 2010/0161541 A1 | 6/2010 | Covannon |
| 2010/0185984 A1 | 7/2010 | Wright |
| 2010/0228693 A1 | 9/2010 | Dawson |
| 2010/0241620 A1 | 9/2010 | Manister |
| 2010/0250497 A1 | 9/2010 | Redlich |
| 2010/0325107 A1 | 12/2010 | Kenton |
| 2011/0022941 A1 | 1/2011 | Osborne |
| 2011/0029532 A1 | 2/2011 | Knight |
| 2011/0040837 A1 | 2/2011 | Eden |
| 2011/0044447 A1 | 2/2011 | Morris |
| 2011/0077958 A1 | 3/2011 | Breitenstein |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha |
| 2011/0113334 A1 | 5/2011 | Joy |
| 2011/0182283 A1 | 7/2011 | Van Buren |
| 2011/0191417 A1 | 8/2011 | Rathod |
| 2011/0213642 A1 | 9/2011 | Makar |
| 2011/0246182 A1 | 10/2011 | Allen |
| 2011/0249953 A1 | 10/2011 | Suri |
| 2011/0261049 A1 | 10/2011 | Cardno |
| 2011/0288852 A1 | 11/2011 | Dymetman |
| 2011/0295595 A1 | 12/2011 | Cao |
| 2011/0295903 A1 | 12/2011 | Chen |
| 2011/0307435 A1 | 12/2011 | Overell |
| 2011/0311144 A1 | 12/2011 | Tardif |
| 2011/0314381 A1 | 12/2011 | Fuller |
| 2012/0011428 A1 | 1/2012 | Chisholm |
| 2012/0041903 A1 | 2/2012 | Beilby |
| 2012/0069131 A1 | 3/2012 | Abelow |
| 2012/0078911 A1 | 3/2012 | Johnston |
| 2012/0109637 A1 | 5/2012 | Merugu |
| 2012/0143849 A1 | 6/2012 | Wong |
| 2012/0158850 A1 | 6/2012 | Harrison |
| 2012/0166180 A1 | 6/2012 | Au |
| 2012/0203623 A1 | 8/2012 | Sethi |
| 2012/0265531 A1 | 10/2012 | Bennett |
| 2012/0291007 A1 | 11/2012 | Bagheri |
| 2012/0310699 A1 | 12/2012 | Mckenna |
| 2013/0013289 A1 | 1/2013 | Myaeng |
| 2013/0041677 A1 | 2/2013 | Nusimow |
| 2013/0091031 A1 | 4/2013 | Baran |
| 2013/0096947 A1 | 4/2013 | Shah |
| 2013/0138430 A1 | 5/2013 | Eden |
| 2013/0144605 A1 | 6/2013 | Brager |
| 2013/0144606 A1 | 6/2013 | Birnbaum |
| 2013/0145242 A1 | 6/2013 | Birnbaum |
| 2013/0173285 A1 | 7/2013 | Hyde |
| 2013/0174026 A1 | 7/2013 | Locke |
| 2013/0185049 A1 | 7/2013 | Zhao |
| 2013/0185051 A1 | 7/2013 | Buryak |
| 2013/0187926 A1 | 7/2013 | Silverstein |
| 2013/0211855 A1 | 8/2013 | Eberle |
| 2013/0226559 A1 | 8/2013 | Lim |
| 2013/0238316 A1 | 9/2013 | Shastri |
| 2013/0238330 A1 | 9/2013 | Casella Dos Santos |
| 2013/0246300 A1 | 9/2013 | Fischer |
| 2013/0246934 A1 | 9/2013 | Wade |
| 2013/0253910 A1 | 9/2013 | Turner |
| 2013/0262086 A1 | 10/2013 | Kim |
| 2013/0262092 A1 | 10/2013 | Wasick |
| 2013/0268490 A1 | 10/2013 | Keebler |
| 2013/0268534 A1 | 10/2013 | Mathew |
| 2013/0275121 A1 | 10/2013 | Tunstall-Pedoe |
| 2013/0297323 A1 | 11/2013 | Shah |
| 2013/0304507 A1 | 11/2013 | Dail |
| 2013/0316834 A1 | 11/2013 | Vogel |
| 2014/0006012 A1 | 1/2014 | Zhou |
| 2014/0040312 A1 | 2/2014 | Gorman |
| 2014/0046891 A1 | 2/2014 | Banas |
| 2014/0059443 A1 | 2/2014 | Tabe |
| 2014/0062712 A1 | 3/2014 | Reiter |
| 2014/0075004 A1 | 3/2014 | Van Dusen |
| 2014/0100844 A1 | 4/2014 | Stieglitz |
| 2014/0114489 A1 | 4/2014 | Duff |
| 2014/0129213 A1 | 5/2014 | Kimelfeld |
| 2014/0129942 A1 | 5/2014 | Rathod |
| 2014/0134590 A1 | 5/2014 | Hiscock, Jr. |
| 2014/0149107 A1 | 5/2014 | Schilder |
| 2014/0163962 A1 | 6/2014 | Castelli |
| 2014/0164978 A1 | 6/2014 | Deeter |
| 2014/0173425 A1 | 6/2014 | Hailpern |
| 2014/0200878 A1 | 7/2014 | Mylonakis |
| 2014/0200891 A1 | 7/2014 | Larcheveque |
| 2014/0201202 A1 | 7/2014 | Jones |
| 2014/0208215 A1 | 7/2014 | Deshpande |
| 2014/0281935 A1 | 9/2014 | Byron |
| 2014/0282184 A1 | 9/2014 | Dewan |
| 2014/0310002 A1 | 10/2014 | Nitz |
| 2014/0314225 A1 | 10/2014 | Riahi |
| 2014/0322677 A1 | 10/2014 | Segal |
| 2014/0351281 A1 | 11/2014 | Tunstall-Pedoe |
| 2014/0356833 A1 | 12/2014 | Sabczynski |
| 2014/0372850 A1 | 12/2014 | Campbell |
| 2014/0375466 A1 | 12/2014 | Reiter |
| 2015/0019540 A1 | 1/2015 | Ganjam |
| 2015/0032730 A1 | 1/2015 | Cialdea, Jr. |
| 2015/0039537 A1 | 2/2015 | Peev |
| 2015/0049951 A1 | 2/2015 | Chaturvedi |
| 2015/0078232 A1 | 3/2015 | Djinki |
| 2015/0088808 A1 | 3/2015 | Tyagi |
| 2015/0095015 A1 | 4/2015 | Lani |
| 2015/0120738 A1 | 4/2015 | Srinivasan |
| 2015/0134694 A1 | 5/2015 | Burke |
| 2015/0142704 A1 | 5/2015 | London |
| 2015/0161997 A1 | 6/2015 | Wetsel |
| 2015/0169548 A1 | 6/2015 | Reiter |
| 2015/0178386 A1 | 6/2015 | Oberkampf |
| 2015/0186504 A1 | 7/2015 | Gorman |
| 2015/0199339 A1 | 7/2015 | Mirkin |
| 2015/0227508 A1 | 8/2015 | Howald |
| 2015/0227588 A1 | 8/2015 | Shapira |
| 2015/0242384 A1 | 8/2015 | Reiter |
| 2015/0249584 A1 | 9/2015 | Cherifi |
| 2015/0261745 A1 | 9/2015 | Song |
| 2015/0268930 A1 | 9/2015 | Lee |
| 2015/0286630 A1 | 10/2015 | Bateman |
| 2015/0286747 A1 | 10/2015 | Anastasakos |
| 2015/0324347 A1 | 11/2015 | Bradshaw |
| 2015/0324351 A1 | 11/2015 | Sripada |
| 2015/0324374 A1 | 11/2015 | Sripada |
| 2015/0325000 A1 | 11/2015 | Sripada |
| 2015/0331846 A1 | 11/2015 | Guggilla |
| 2015/0331850 A1 | 11/2015 | Ramish |

(56) References Cited

U.S. PATENT DOCUMENTS

| | | |
|---|---|---|
| 2015/0332665 A1 | 11/2015 | Mishra |
| 2015/0339284 A1 | 11/2015 | Ban |
| 2015/0347391 A1 | 12/2015 | Chen |
| 2015/0347400 A1 | 12/2015 | Sripada |
| 2015/0347901 A1 | 12/2015 | Cama |
| 2015/0356463 A1 | 12/2015 | Overell |
| 2015/0356967 A1 | 12/2015 | Byron |
| 2015/0363364 A1 | 12/2015 | Sripada |
| 2015/0365447 A1 | 12/2015 | Klein |
| 2015/0370778 A1 | 12/2015 | Tremblay |
| 2016/0019200 A1 | 1/2016 | Allen |
| 2016/0026253 A1 | 1/2016 | Bradski |
| 2016/0027125 A1 | 1/2016 | Bryce |
| 2016/0054889 A1 | 2/2016 | Hadley |
| 2016/0062604 A1 | 3/2016 | Kraljic |
| 2016/0062954 A1 | 3/2016 | Ruff |
| 2016/0078022 A1 | 3/2016 | Lisuk |
| 2016/0086084 A1 | 3/2016 | Nichols |
| 2016/0103559 A1 | 4/2016 | Maheshwari |
| 2016/0132489 A1 | 5/2016 | Reiter |
| 2016/0140090 A1 | 5/2016 | Dale |
| 2016/0155067 A1 | 6/2016 | Dubnov |
| 2016/0162445 A1 | 6/2016 | Birnbaum |
| 2016/0162582 A1 | 6/2016 | Chatterjee |
| 2016/0162803 A1 | 6/2016 | Amershi |
| 2016/0196491 A1 | 7/2016 | Chandrasekaran |
| 2016/0217133 A1 | 7/2016 | Reiter |
| 2016/0232152 A1 | 8/2016 | Mahamood |
| 2016/0232221 A1 | 8/2016 | Mccloskey |
| 2016/0314121 A1 | 10/2016 | Arroyo |
| 2016/0314123 A1 | 10/2016 | Ramachandran |
| 2016/0328365 A1 | 11/2016 | Birnbaum |
| 2016/0379132 A1 | 12/2016 | Jin |
| 2017/0004415 A1 | 1/2017 | Moretti |
| 2017/0006135 A1 | 1/2017 | Siebel |
| 2017/0011742 A1 | 1/2017 | Jing |
| 2017/0017897 A1 | 1/2017 | Bugay |
| 2017/0024465 A1 | 1/2017 | Yeh |
| 2017/0026705 A1 | 1/2017 | Yeh |
| 2017/0039275 A1 | 2/2017 | Akolkar |
| 2017/0046016 A1 | 2/2017 | Riche |
| 2017/0060857 A1 | 3/2017 | Imbruce |
| 2017/0061093 A1 | 3/2017 | Amarasingham |
| 2017/0068551 A1 | 3/2017 | Vadodaria |
| 2017/0083484 A1 | 3/2017 | Patil |
| 2017/0091291 A1 | 3/2017 | Bostick |
| 2017/0104785 A1 | 4/2017 | Stolfo |
| 2017/0116327 A1 | 4/2017 | Gorelick |
| 2017/0124062 A1 | 5/2017 | Bhaowal |
| 2017/0125015 A1 | 5/2017 | Dielmann |
| 2017/0131975 A1 | 5/2017 | Balasubramanian |
| 2017/0140405 A1 | 5/2017 | Gottemukkala |
| 2017/0161242 A1 | 6/2017 | Clark |
| 2017/0177559 A1 | 6/2017 | Dang |
| 2017/0177660 A1 | 6/2017 | Chang |
| 2017/0177715 A1 | 6/2017 | Chang |
| 2017/0185674 A1 | 6/2017 | Tonkin |
| 2017/0199928 A1 | 7/2017 | Zhao |
| 2017/0206890 A1 | 7/2017 | Tapuhi |
| 2017/0212671 A1 | 7/2017 | Sathish |
| 2017/0213157 A1 | 7/2017 | Bugay |
| 2017/0228372 A1 | 8/2017 | Moreno |
| 2017/0228659 A1 | 8/2017 | Lin |
| 2017/0242886 A1 | 8/2017 | Jolley |
| 2017/0270105 A1 | 9/2017 | Ninan |
| 2017/0286377 A1 | 10/2017 | Chakra |
| 2017/0293864 A1 | 10/2017 | Oh |
| 2017/0300477 A1 | 10/2017 | Long |
| 2017/0329842 A1 | 11/2017 | Ng Tari |
| 2017/0339089 A1 | 11/2017 | Longdale |
| 2017/0344518 A1 | 11/2017 | Birnbaum |
| 2017/0358295 A1 | 12/2017 | Roux |
| 2017/0371856 A1 | 12/2017 | Can |
| 2018/0008894 A1 | 1/2018 | Sack |
| 2018/0024989 A1 | 1/2018 | Bharti |
| 2018/0025726 A1 | 1/2018 | Gatti De Bayser |
| 2018/0060759 A1 | 3/2018 | Chu |
| 2018/0075368 A1 | 3/2018 | Brennan |
| 2018/0081869 A1 | 3/2018 | Hager |
| 2018/0082184 A1 | 3/2018 | Guo |
| 2018/0089177 A1 | 3/2018 | Cho |
| 2018/0114158 A1 | 4/2018 | Foubert |
| 2018/0129721 A1 | 5/2018 | Apple |
| 2018/0181613 A1 | 6/2018 | Acharya |
| 2018/0189284 A1 | 7/2018 | Hosabettu |
| 2018/0232443 A1 | 8/2018 | Delgo |
| 2018/0232487 A1 | 8/2018 | Erard |
| 2018/0232493 A1 | 8/2018 | Erard |
| 2018/0232812 A1 | 8/2018 | Erard |
| 2018/0234442 A1 | 8/2018 | Luo |
| 2018/0260380 A1 | 9/2018 | Birnbaum |
| 2018/0261203 A1 | 9/2018 | Zoller |
| 2018/0285324 A1 | 10/2018 | Birnbaum |
| 2018/0293483 A1 | 10/2018 | Abramson |
| 2018/0300311 A1 | 10/2018 | Krishnamurthy |
| 2018/0314689 A1 | 11/2018 | Wang |
| 2018/0373999 A1 | 12/2018 | Xu |
| 2019/0042559 A1 | 2/2019 | Allen |
| 2019/0056913 A1 | 2/2019 | Jaroch |
| 2019/0095499 A1 | 3/2019 | Payne |
| 2019/0102614 A1 | 4/2019 | Winder |
| 2019/0114304 A1 | 4/2019 | Oliveira |
| 2019/0121918 A1 | 4/2019 | Fort |
| 2019/0138615 A1 | 5/2019 | Huh |
| 2019/0147849 A1 | 5/2019 | Talwar |
| 2019/0179893 A1 | 6/2019 | Mulwad |
| 2019/0197097 A1 | 6/2019 | Nagarajan |
| 2019/0213254 A1 | 7/2019 | Ray |
| 2019/0236140 A1 | 8/2019 | Canim |
| 2019/0267118 A1 | 8/2019 | Miled |
| 2019/0272827 A1 | 9/2019 | Vozila |
| 2019/0286741 A1 | 9/2019 | Agarwal |
| 2019/0312968 A1 | 10/2019 | Moon |
| 2019/0317994 A1 | 10/2019 | Singh |
| 2019/0332666 A1 | 10/2019 | Dadachev |
| 2019/0332667 A1 | 10/2019 | Williams |
| 2019/0347553 A1 | 11/2019 | Lo |
| 2019/0370084 A1 | 12/2019 | Behar |
| 2019/0370696 A1 | 12/2019 | Ezen Can |
| 2019/0377790 A1 | 12/2019 | Redmond |
| 2020/0019370 A1 | 1/2020 | Doggett |
| 2020/0041289 A1 | 2/2020 | Mokhnatkina |
| 2020/0042646 A1 | 2/2020 | Nagaraja |
| 2020/0066391 A1 | 2/2020 | Sachdeva |
| 2020/0074013 A1 | 3/2020 | Chen |
| 2020/0074310 A1 | 3/2020 | Li |
| 2020/0074401 A1 | 3/2020 | Oliveira Almeida |
| 2020/0081939 A1 | 3/2020 | Subramaniam |
| 2020/0082276 A1 | 3/2020 | Nichols |
| 2020/0089735 A1 | 3/2020 | Birnbaum |
| 2020/0110902 A1 | 4/2020 | Zakour |
| 2020/0134032 A1 | 4/2020 | Lin |
| 2020/0134090 A1 | 4/2020 | Mankovskii |
| 2020/0143468 A1 | 5/2020 | Riley |
| 2020/0151443 A1 | 5/2020 | Florencio |
| 2020/0160190 A1 | 5/2020 | Swamy |
| 2020/0202846 A1 | 6/2020 | Bapna |
| 2020/0279072 A1 | 9/2020 | Nichols |
| 2020/0302393 A1 | 9/2020 | Gupta |
| 2020/0334299 A1 | 10/2020 | Birnbaum |
| 2020/0334300 A1 | 10/2020 | Birnbaum |
| 2020/0334418 A1 | 10/2020 | Platt |
| 2020/0379780 A1 | 12/2020 | Sutton |
| 2020/0387666 A1 | 12/2020 | Birnbaum |
| 2020/0401770 A1 | 12/2020 | Paley |
| 2021/0081499 A1 | 3/2021 | Rakshit |
| 2021/0192132 A1 | 6/2021 | Birnbaum |
| 2021/0192144 A1 | 6/2021 | Paley |
| 2021/0209168 A1 | 7/2021 | Oswald |
| 2021/0256221 A1 | 8/2021 | Adam |
| 2021/0271824 A1 | 9/2021 | Pham |
| 2021/0279425 A1 | 9/2021 | Horowitz |
| 2021/0375289 A1 | 12/2021 | Zhu |
| 2022/0050973 A1 | 2/2022 | Calapodescu |

(56)                    References Cited

U.S. PATENT DOCUMENTS

| 2022/0092508 | A1 | 3/2022 | Suthan |
| 2022/0114206 | A1 | 4/2022 | Platt |
| 2022/0115137 | A1 | 4/2022 | Goldstein |
| 2022/0223146 | A1 | 7/2022 | Aili |
| 2022/0237228 | A1 | 7/2022 | Xu |
| 2022/0269354 | A1 | 8/2022 | Prasad |
| 2022/0284195 | A1 | 9/2022 | Platt |
| 2022/0321511 | A1 | 10/2022 | Hansmann |
| 2022/0414228 | A1 | 12/2022 | Difonzo |
| 2023/0027421 | A1 | 1/2023 | Birnbaum |
| 2023/0053724 | A1 | 2/2023 | Birnbaum |
| 2023/0109572 | A1 | 4/2023 | Nichols |
| 2023/0206006 | A1 | 6/2023 | Nichols |

FOREIGN PATENT DOCUMENTS

| WO | 2014035400 | A1 | 3/2014 |
| WO | 2014035402 | A1 | 3/2014 |
| WO | 2014035403 | A1 | 3/2014 |
| WO | 2014035406 | A1 | 3/2014 |
| WO | 2014035407 | A1 | 3/2014 |
| WO | 2014035447 | A1 | 3/2014 |
| WO | 2014070197 | A1 | 5/2014 |
| WO | 2014076524 | A1 | 5/2014 |
| WO | 2014076525 | A1 | 5/2014 |
| WO | 2014102568 | A1 | 7/2014 |
| WO | 2014102569 | A1 | 7/2014 |
| WO | 2014111753 | A1 | 7/2014 |
| WO | 2015028844 | A1 | 3/2015 |
| WO | 2015159133 | A1 | 10/2015 |

OTHER PUBLICATIONS

Andre, E., Herzog, G., & Rist, T. (1988). On the simultaneous interpretation of real world image sequences and their natural language description: the system Soccer. Paper presented at Proceedings of the 8th. European Conference on Artificial Intelligence (ECAI)Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J, Caldwell, T, Evans, M., Kittredge, R., Lavoie, B., and Werner, J. (2005). Generation of Realtime Narrative Summaries for Real-time Water Levels and Meteorological Observations in Ports®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finlandpp. 318-320.

Boyd, S. (1998) Trend: a system for generating intelligent descriptions of time series data. Paper presented at Proceedings of the IEEE international conference on intelligent processing systems (ICIPS-1998).

Character Writer Version 3.01, Typing Chimp Software LLC, 2012, screenshots from working program, pp. 1-19 (Year: 2012).

Cyganiak et al., "RDF 1.1 Concepts and Abstract Syntax", W3C Recommendation, 2014, vol. 25, No. 2.

Dehn, N. (1981). Story generation after Tale-Spin. In Proceedings of the Seventh International Joint Conference on okrtificial Intelligence. (Vancouver, Canada).

Dramatica Pro version 4, Write Brothers, 1993-2006, user manual.

EnglisheForums, "Direct Objects, Indirect Objects, Obliques, Dative Movement?", [online] https://www.englishforums.com, published 2007. (Year 2007).

Gatt A. and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural—Language Processing to Produce Weather rorecasts. IEEE Expert, 9 (2), 45.

Hargood, C. Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedingspp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent SystemsPAIS-08.

Kittredge, R., and Lavoie, B. (1998). MeteoCogent a Knowledge-Based Tool for Generating Weather Forecast Texts. In Proceedings of the American Meteorological Society AI Conference (AMS-98), Phoenix, Arizona.

Kittredge, R, Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Kssociation for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Nashington, DC.

Mack et al., "A Framework for Metrics in Large Complex Systems", IEEE Aerospace Conference Proceedings, 2004, pp. 3217-3228, vol. 5, doi: 10.1109/AERO .2004.1368127.

Mahamood, Saad, William Bradshaw, and Ehud Reiter. "Generating annotated graphs using the nlg pipeline architecture." Proceedings of the 8th International Natural Language Generation Conference (INLG). 2014. (Year: 2014).

McKeown, K., Kukich, K., & Shaw, J. (1994). Practical issues in automatic documentation generation. 4th Conference pn Applied Natural Language Processing, Stuttgart, Germany, pp. 7-14.

Meehan, James R, Tale-Spin. (1977). An Interactive Program that Writes Stories. In Proceedings of the Fifth International Joint Conference on Artificial Intelligence.

Memorandum Opinion and Order for *O2Media, LLC* v. *Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 MediaLLC).

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements ol Patient Supporters. 21st IEEE International Symposium on Computer-Based Medical Systems (CBMS 2008), pp. 443-448.

Movie Magic Screenwriter, Write Brothers, 2009, user manual.

Nathan Weston; "A Framework for Constructing Semantically Composable Feature Models from Natural Language Requirements"; SPLC '09: Proceedings of the 13th International Software Product Line Conference;2009;pp. 211-220 (Year: 2009).

Portet Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07)pp. 227-236.

(56)                  References Cited

OTHER PUBLICATIONS

Reiter et al., "Building Applied Natural Language Generation Systems", Cambridge University Press, 1995, pp. 1-32.
Reiter, E. (2007). An architecture for Data-To-Text systems. In: Busemann, Stephan (Ed ), Proceedings of the 11th European Workshop on Natural Language Generation, pp. 97-104.
Reiter, E., Gatt, A., Portet, F., and van der MeulenM. (2008). The importance of narrative and other lessons from an evaluation of an NLG system that summarises clinical data Proceedings of the 5th International Conference on Natural Language Generation.
Reiter, E., Sripada, S., Hunter, J., Yu, J., and Davy, I. (2005). Choosing words in computer-generated weather brecasts. Artificial Intelligence167:137-169.
Riedl et al, "Narrative Planning: Balancing Plot and Character", Journal of Artificial Intelligence Research, 2010, pp. 217-268, vol. 39.
Riedl et al., "From Linear Story Generation to Branching Story Graphs", IEEE Computer Graphics and Applications, 2006, pp. 23-31.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Robin, J. (1996). Evaluating the portability of revision rules for incremental summary generation. Paper presented at Proceedings of the 34th. Annual Meeting of the Association for Computationa Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New fork, NY 105-115.
Segel et al., "Narrative Visualization: Telling Stories with Data", Stanford University, Oct. 2010, 10 pgs.
Smith, "The Multivariable Method in Singular Perturbation Analysis", SIAM Review, 1975, pp. 221-273, vol. 17, No. 2.
Sripada, S., Reiter, E., and Davy, L (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J, and Krahmer, E. (2001) "From Data to Speech: A General Approach", Natural Language Engineering 7(1): 47-86.
Thomas, K, and Sripada, S. (2008). What's in a message? Interpreting Geo-referenced Data for the Visually-impaired. Proceedings of the Int. conference on NLG.
Thomas, K, Sumegi, L., Ferres, L., and Sripada, S. (2008). Enabling Access to Geo-referenced Information: Atlas.txt. Proceedings of the Cross-disciplinary Conference on Web Accessibility.
Thomas, K., and SripadaS. (2007). Atlas.txt: Linking Geo-referenced Data to Text for NLG. Paper presented at Proceedings of the 2007 European Natural Language Generation Workshop (ENLGO7).
Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Sraphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
Albert Gatt and Emiel Krahmer. 2018. Survey of the state of the art in natural language generation: core tasks, applications and evaluation. J. Artif. Int. Res. 61, 1 (Jan. 2018), 65-170. (Year: 2018).
Gamma et al., "Design Patterns: Elements of Reusable Object-Oriented Software", Addison Wesley, 1994. (Year: 1994) 272 pages.
Garbacea, Cristina and Qiaozhu Mei. "Why is constrained neural language generation particularly challenging?" ArXiv abs/ 2206. 05395 (2022): n. pp. 1-22. (Year: 2022).
Juraska et al., Characterizing Variation in Crowd-Sourced Data for Training Neural Language Generators to Produce Stylistically Varied Outputs. In Proceedings of the 11th International Conference on Natural Language Generation, pp. 441-450, Tilburg University, the Netherlands. Association (Year: 2018).
Office Action (Final Rejection) dated Jul. 8, 2025 for U.S. Appl. No. 18/543,354 (pp. 1-14).
Office Action (Final Rejection) dated Aug. 8, 2025 for U.S. Appl. No. 18/644,444 (pp. 1-13).
Office Action (Non-Final Rejection) dated Aug. 27, 2025 for U.S. Appl. No. 17/749,578 (pp. 1-37).
Office Action (Non-Final Rejection) dated Nov. 12, 2025 for U.S. Appl. No. 18/543,354 (pp. 1-7).
Office Action (Notice of Allowance and Fees Due (PTOL-85)) dated Jul. 3, 2025 for U.S. Appl. No. 18/161,311 (pp. 1-7).
Office Action (Notice of Allowance and Fees Due (PTOL-85)) dated Aug. 8, 2025 for U.S. Appl. No. 17/749,518 (pp. 1-12).
Office Action (Notice of Allowance and Fees Due (PTOL-85)) dated Aug. 19, 2025 for U.S. Appl. No. 17/749,472 (pp. 1-5).
Office Action (Notice of Allowance and Fees Due (PTOL-85)) dated Aug. 20, 2025 for U.S. Appl. No. 17/749,518 (pp. 1-2).
Saleh et al., "A Reusable Model for Data-Centric Web Services," 2009, pp. 288-297, Springer-Verlag Berlin.
Smari et al., "An Integrated Approach to Collaborative Decision Making Using Computer-Supported Conflict Management Methodology", IEEE International Conference on Information Reuse and Integration, 2005, pp. 182-191.
Sourab Mangrulkar, Suhani Shrivastava, Veena Thenkanidiyoor, and Dileep Aroor Dinesh. 2018. A Context-aware Convolutional Natural Language Generation model for Dialogue Systems. In Proceedings of the 19th Annual SIGdial Meeting on Discourse and Dialogue, pp. 191-200, Melbourne, Australia. (Year: 2018).
Troiano, E., Velutharambath, A. and Klinger, R. (2023) 'From theories on styles to their transfer in text: Bridging the gap with a hierarchical survey', Natural Language Engineering, 29(4), pp. 849-908. (Year: 2023).
Wei Lu, Hwee Tou Ng, and Wee Sun Lee. 2009. Natural Language Generation with Tree Conditional Random Fields. In Proc. of the 2009 Conference on Empirical Methods in Natural Language Processing, pp. 400-409 (Year: 2009).

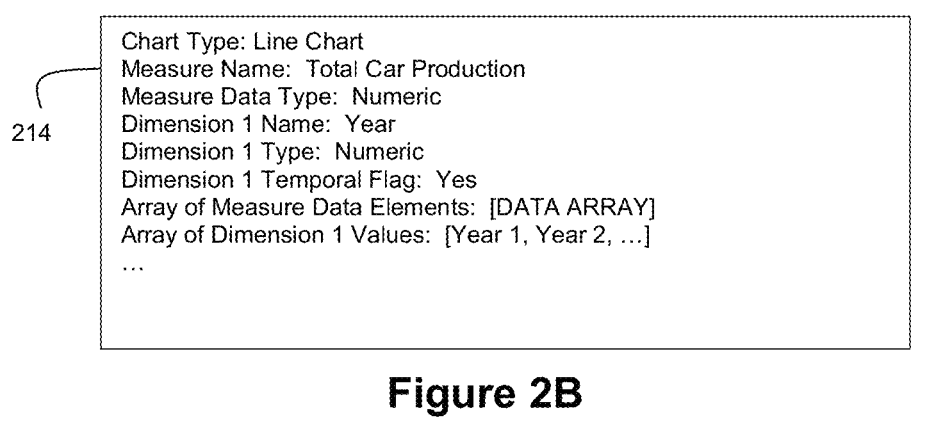

214

Chart Type: Line Chart
Measure Name:  Total Car Production
Measure Data Type:  Numeric
Dimension 1 Name:  Year
Dimension 1 Type:  Numeric
Dimension 1 Temporal Flag:  Yes
Array of Measure Data Elements:  [DATA ARRAY]
Array of Dimension 1 Values:  [Year 1, Year 2, ...]
...

Figure 2B

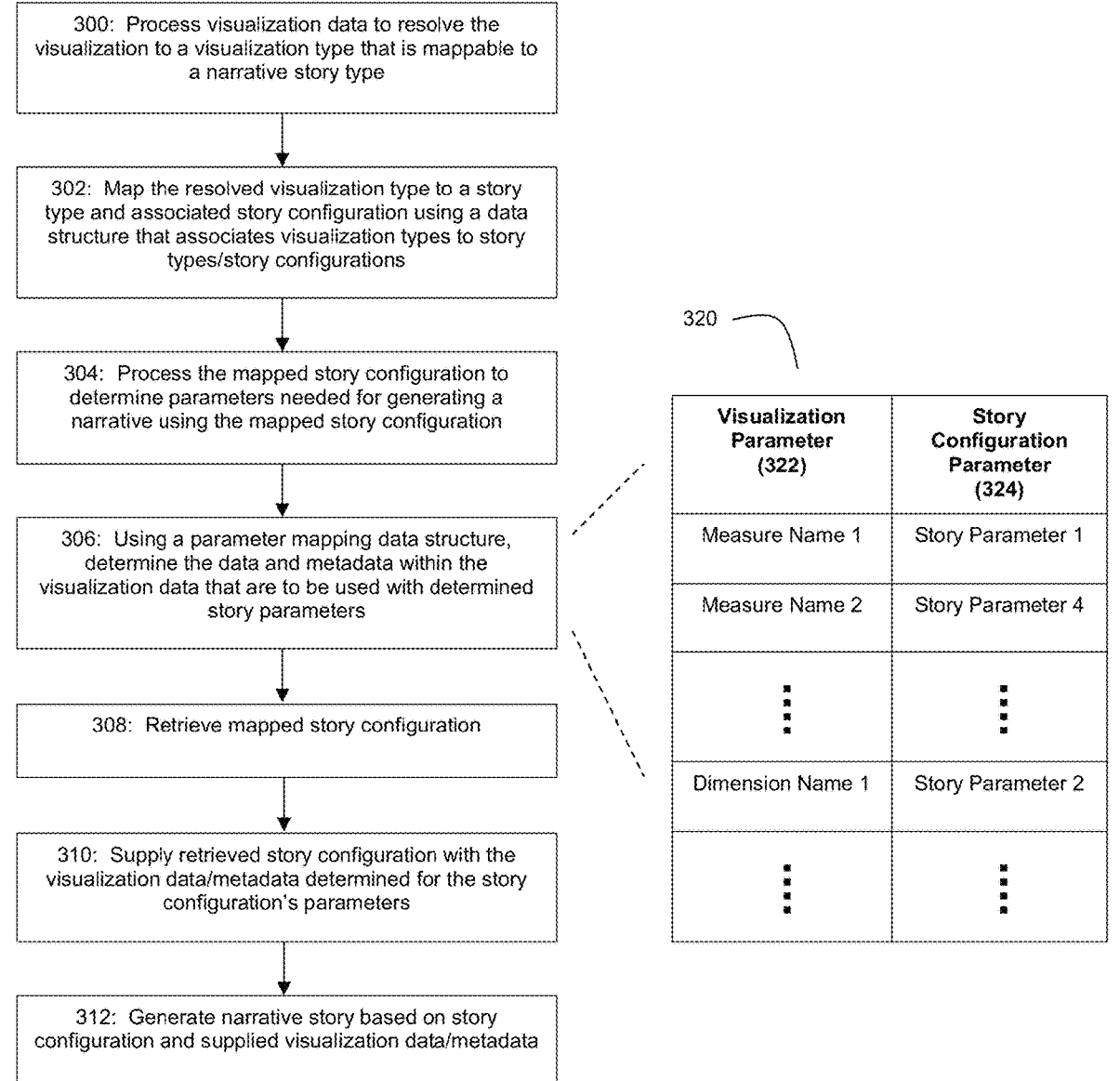

300: Process visualization data to resolve the visualization to a visualization type that is mappable to a narrative story type 302: Map the resolved visualization type to a story type and associated story configuration using a data structure that associates visualization types to story types/story configurations 304: Process the mapped story configuration to determine parameters needed for generating a narrative using the mapped story configuration 306: Using a parameter mapping data structure, determine the data and metadata within the visualization data that are to be used with determined story parameters 308: Retrieve mapped story configuration 310: Supply retrieved story configuration with the visualization data/metadata determined for the story configuration's parameters 312: Generate narrative story based on story configuration and supplied visualization data/metadata

320

| Visualization Parameter (322) | Story Configuration Parameter (324) |
|---|---|
| Measure Name 1 | Story Parameter 1 |
| Measure Name 2 | Story Parameter 4 |
| ⋮ | ⋮ |
| Dimension Name 1 | Story Parameter 2 |
| ⋮ | ⋮ |

Figure 3

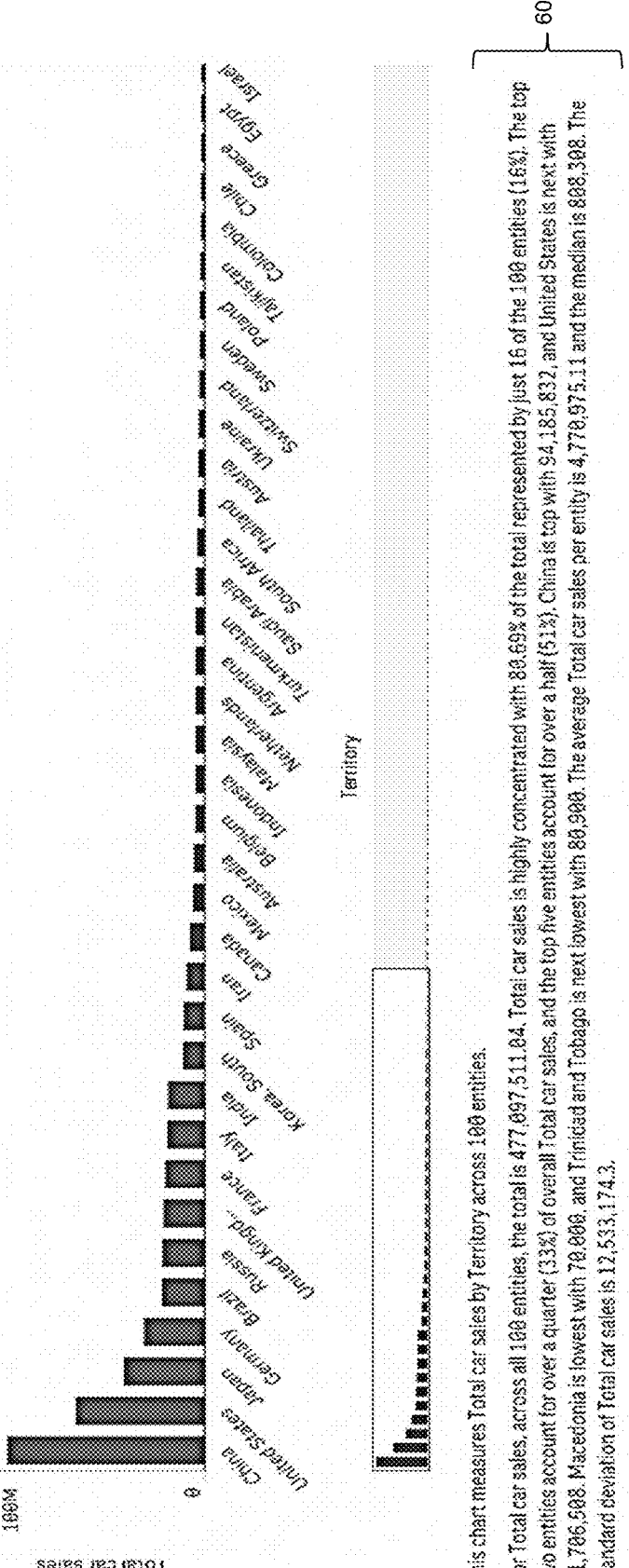

This chart measures Total car sales by Territory across 100 entities.

For Total car sales, across all 100 entities, the total is 477,097,511.84. Total car sales is highly concentrated with 88.69% of the total represented by just 16 of the 100 entities (16%). The top two entities account for over a quarter (33%) of overall Total car sales, and the top five entities account for over a half (51%). China is top with 94,185,832, and United States is next with 61,786,508. Macedonia is lowest with 70,866, and Trinidad and Tobago is next lowest with 80,988. The average Total car sales per entity is 4,770,975.11 and the median is 808,308. The standard deviation of Total car sales is 12,533,174.3.

Figure 6A

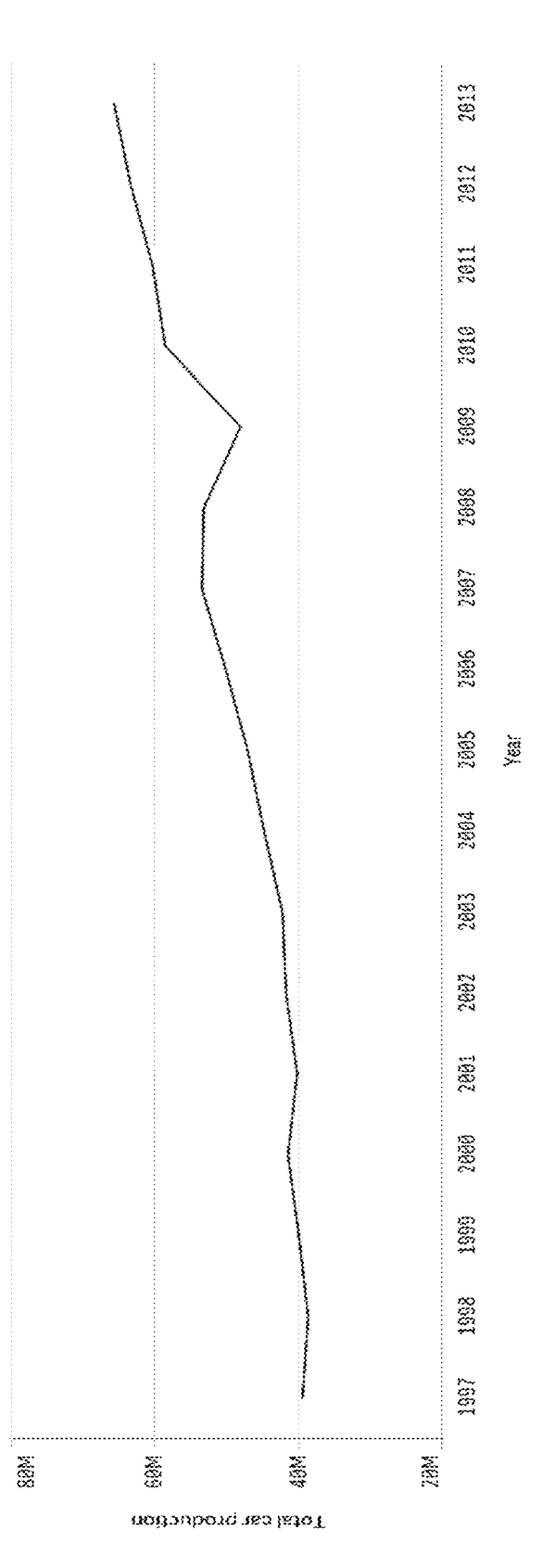

Figure 6B

The chart measures Total car production by Year from 1997 to 2012.

Over the course of the series, Total car production rose 66.42% from 39,248,935 to 65,316,496. The largest increase, which was a 21.91% rise from 47,772,598 to 58,239,494 (+10,466,896), occurred between 2009 and 2010. Total car production grew at a higher rate later in the series compared to earlier on. Values for Total car production ranged from 38,474,970 (at 1998) to 65,316,496 (at 2013). The series showed consistent growth over six periods from 2001 to 2007 with consecutive increases over that span. Total car production showed consistent decline over two periods from 2007 to 2009 with consecutive decreases over that span.

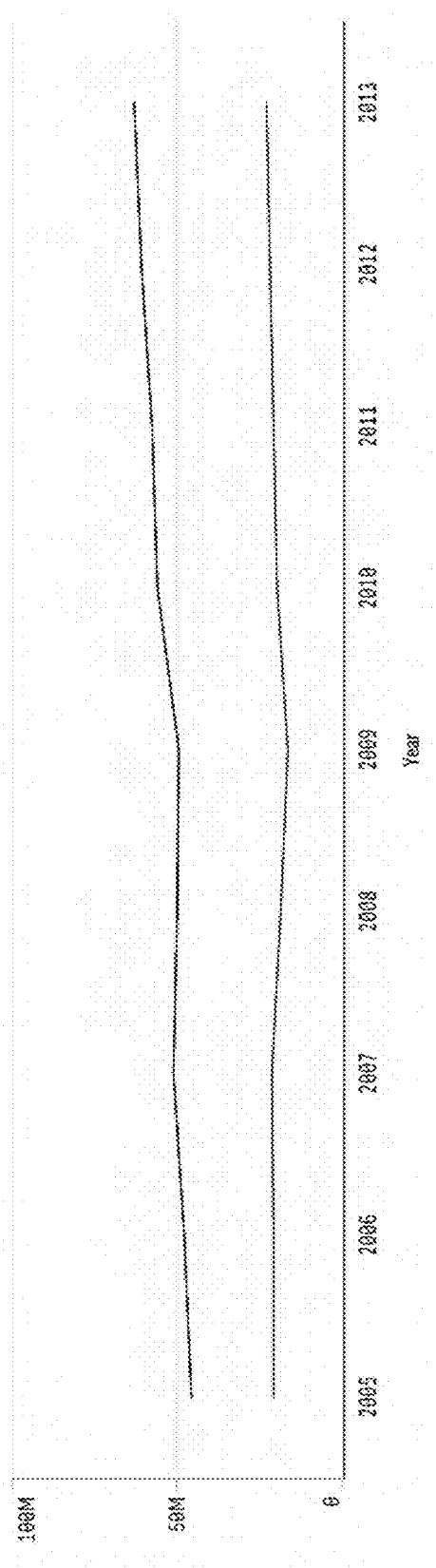

Accounting for your selection, the chart measures Total car sales and Total commercial vehicle sales by Year from 2013 to 2009.

- Both series decreased from 2013 to 2009 with Total commercial vehicle sales falling 28.57% and Total car sales falling 21.23% over that span.
- Total car sales had the longest span of consecutive increases, which occurred over two periods from 2005 to 2010.
- Total commercial vehicle sales had the longest span of consecutive decreases, which occurred over eight periods from 2013 to 2009

For Total car sales:

- Over the course of the series, Total car sales fell 21.23% from 62,644,466.04 to 49,344,668. The largest decrease, which was a 21.1% drop from 57,299,917 to 45,209,905 (-12,090,012), occurred between 2011 and 2005.
- Total car sales fluctuated over the course of the series with 57.14% of data points moving in an opposite direction from the previous point.
- Values for Total car sales ranged from 45,209,905 (at 2005) to 62,644,466.04 (at 2013).
- Total car sales showed consistent decline over two periods from 2010 to 2009 with consecutive decreases over that span
- The series showed consistent growth over two periods from 2005 to 2010 with consecutive increases over that span For Total commercial vehicle sales:

- Over the course of the series, Total commercial vehicle sales fell 28.57% from 22,749,342.96 to 16,249,925. The largest decrease, which was a 12.82% drop from 18,638,677 to 16,249,925 (-2,388,752), occurred between 2009 and 2005.
- Values for Total commercial vehicle sales ranged from 16,249,925 (at 2009) to 22,749,342.96 (at 2013).
- Total commercial vehicle sales showed consistent decline over eight periods from 2013 to 2009 with consecutive decreases over that span.

Figure 6C

```
<p class="ns_paragraph">The chart measures Northeast Revenue by YearMonth.</p><p
class="ns_paragraph"><ul class="ns_bullet"><li>Northeast Revenue was 7,225,220 across all
24 <span data-dimension-id="nqBGAUb" data-tense="plural" class="entity-
label">periods</span>.</li><li>Northeast Revenue decreased 28.86% over the course of the
series from 158,618 to 112,839. The largest single decrease on a percentage basis, which
was a 87.26% drop from 603,965 to 76,949.82, occurred between Mar-06 and Apr-06. However,
the largest single decline on an absolute basis, which was a decline of 592,888 from
705,727 to 112,839, occurred between Nov-07 and Dec-07.</li><li>Northeast Revenue had a
significant positive peak between Jul-06 and Oct-06, starting at 77,195.93, rising to
611,452 at Sep-06 and ending at 167,828.</li><li>The largest net decline was from Sep-07
to Dec-07, when Northeast Revenue fell 612,470 (84.44%). Northeast Revenue showed the
longest span of consistent decline over two <span data-dimension-id="nqBGAUb" data-
tense="plural" class="entity-label">periods</span> from May-06 to Jul-06, decreasing
61.01%.</li><li>Northeast Revenue fluctuated over the course of the series with 86.36% of
data points moving in an opposite direction from the previous point.</li><li>Values for
Northeast Revenue ranged from 76,949.82 (Apr-06) to 725,309 (Sep-07), averaging
301,051.</li></ul></p>
```

Figure 7B

The chart measures Northeast Revenue by YearMonth.

- Northeast Revenue was 7,225,220 across all 24 periods.
- Northeast Revenue fell 28.86% over the course of the series from 158,618 to 112,839. The largest single decrease on a percentage basis, which was a 87.26% drop from 603,965 to 76,949.82, occured between Mar-06 and Apr-06. However, the largest single decline on an absolute basis, which was a decline of 592,888 from 705,727 to 112,839, occured between Nov-07 and Dec-07.
- Northeast Revenue had a significant positive peak between Jul-06 and Oct-06, starting at 77,195.93, rising to 611,452 at Sep-06 and ending at 167,828.
- The largest net decline was from Sep-07 to Dec-07, when Northeast Revenue decreased 612,470 (84.44%). Northeast Revenue showed the longest span of consistent decline over two periods from May-06 to Jul-06 decreasing 61.01% powered by Narrative Science

700

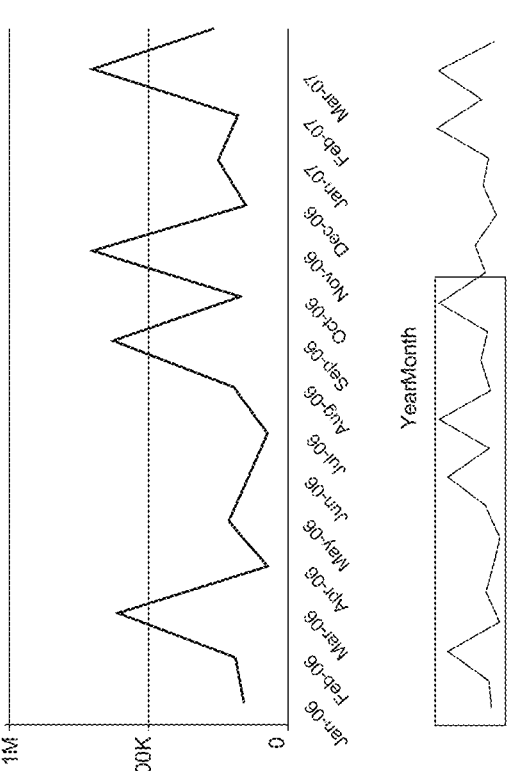

FIGURE 7C

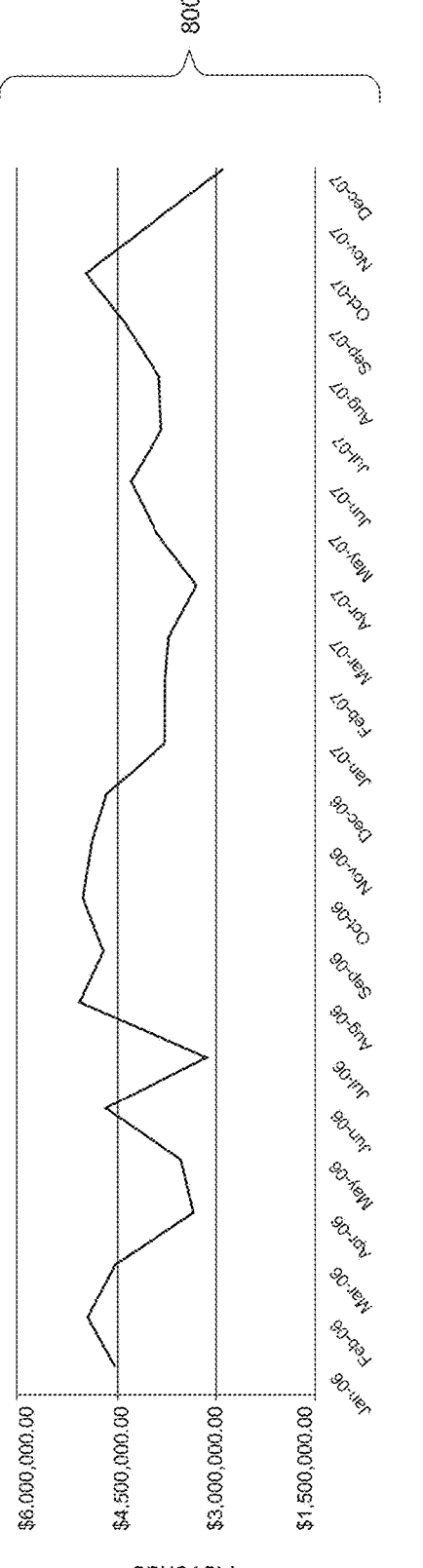

800

802

Revenue by Month

The chart measures Revenue by YearMonth.

• Revenue was $98.7 million across all 24 periods.

• Values ranged from $2.9 million (Dec-07) to $5 million (Aug-06), averaging $4.1 million.

• As mentioned previously, Revenue fell 35.92% over the course of the series from $4.5 million to $2.9 million. The largest single decrease, which was a 33.35% drop from $4.6 million to $3.1 million (-$1.6 million), occured between Jun-06 and Jul-06.

• The largest single increase immediately followed the biggest single decrease, when it rose 61.79% from $3.1 million to $5 million between Jul-06 and Aug-06.

• Revenue showed the longest span of consisten growth over three periods from Jul-07 to Oct-07, rising by 29.51%.

• The largest net decline was from Aug-06 to Dec-07, when Revenue decreased by $2.1 million (42.85%). The three periods from Oct-06 to Jan-07 when Revenue fell by 24.69% significantly impacted this net decline.

• Revenue fluctuated over the course of the series with 59.09% of data points moving in an opposite direction from the previous point.

Figure 8C:
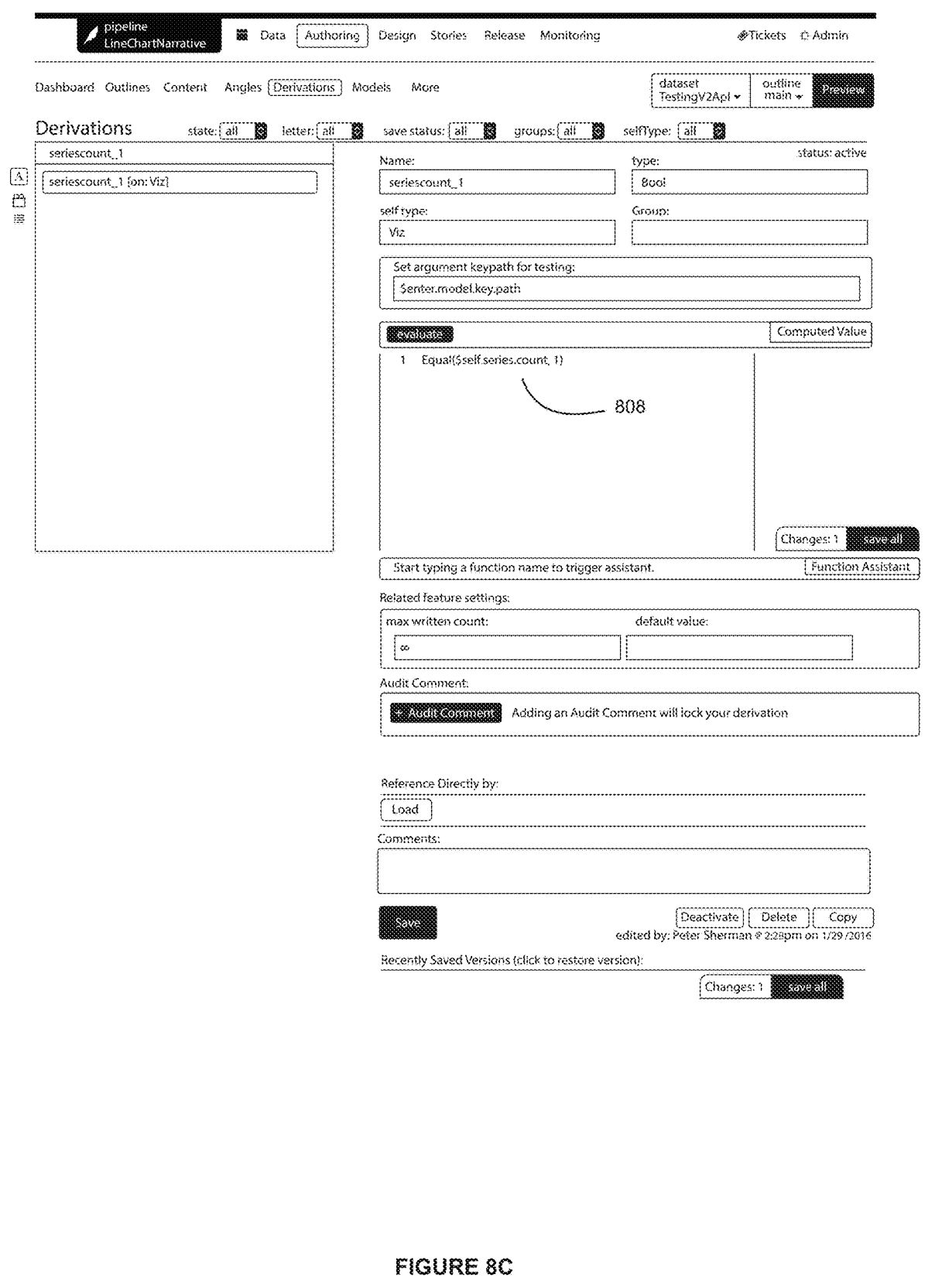

FIGURE 8A pipeline
LineChartNarrative

Data | Authoring | Design | Stories | Release | Monitoring | Tickets | Admin

Dashboard | Outlines | Content | Angles | Derivations | Models | More dataset
TestingV2Api ▾ outline
main ▾

Preview

Derivations state: [all ▦]  letter: [all ▦]  save status: [all ▦]  groups: [all ▦]  selfType: [all ▦]

seriescount_1 seriescount_1 [on: Viz]

Name:                                              type:                        status: active seriescount_1                                      Bool self type:                                         Group:

Viz

Set argument keypath for testing:

$enter.model.key.path evaluate                                                          Computed Value 1    Equal($self.series.count, 1)

808

Changes: 1    save all

Start typing a function name to trigger assistant.              Function Assistant Related feature settings:

max written count:                                 default value:

∞

Audit Comment:

+ Audit Comment    Adding an Audit Comment will lock your derivation

Reference Directly by:

Load

Comments:

Save              Deactivate | Delete | Copy edited by: Peter Sherman @ 2:28pm on 1/29/2016

Recently Saved Versions (click to restore version):

Changes: 1    save all

Figure 8D:
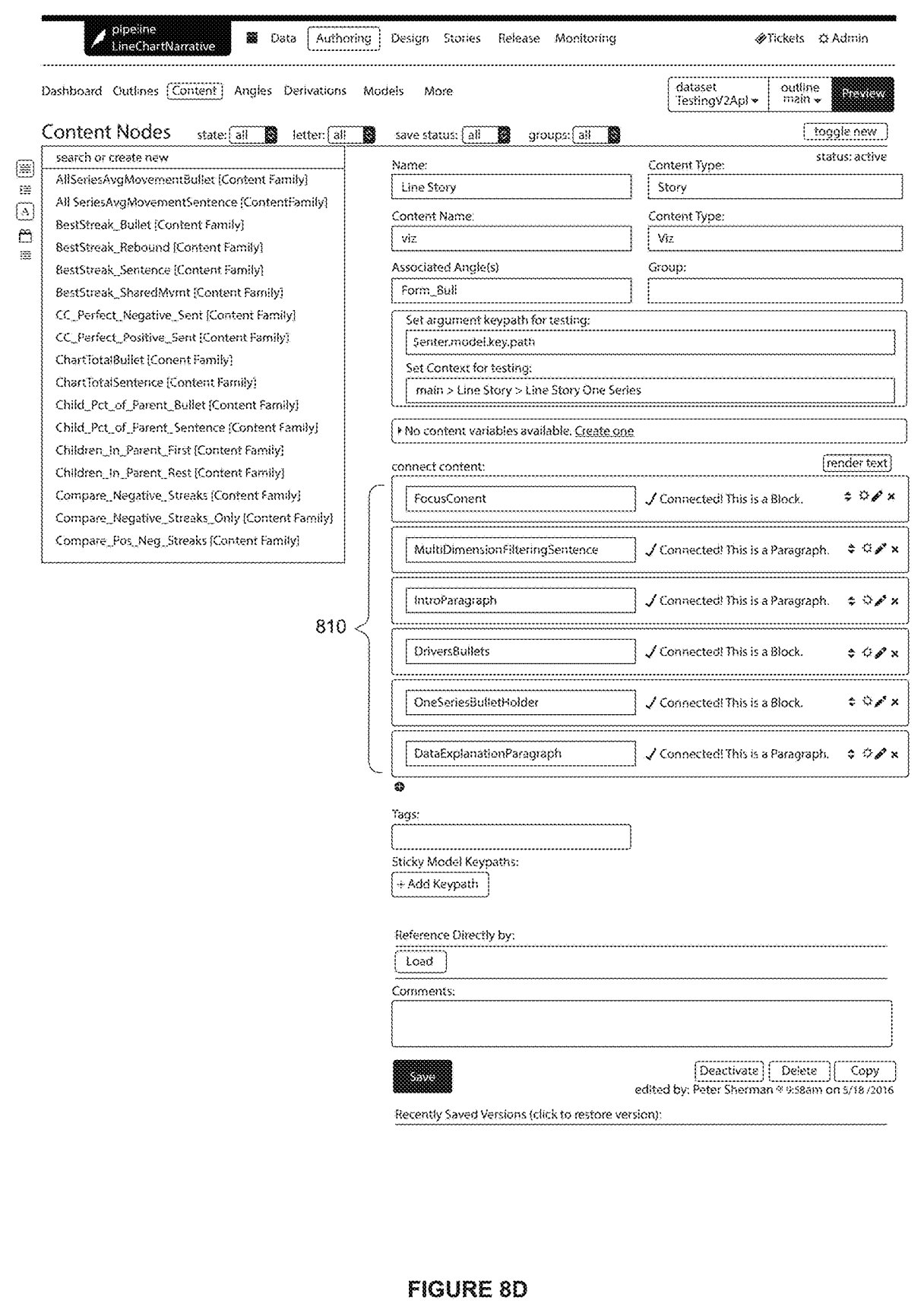

FIGURE 8C pipeline
LineChartNarrative

■ Data | Authoring | Design   Stories   Release   Monitoring       ✐Tickets   ⚙ Admin Dashboard  Outlines  [Content]  Angles  Derivations  Models  More dataset
TestingV2Api ▾      outline
main ▾      Preview

Content Nodes   state: [all ■]   letter: [all ■]   save status: [all ■]   groups: [all ■]                                    [toggle new]

status: active search or create new

AllSeriesAvgMovementBullet [Content Family]
All SeriesAvgMovementSentence [ContentFamily]
BestStreak_Bullet [Content Family]
BestStreak_Rebound [Content Family]
BestStreak_Sentence [Content Family]
BestStreak_SharedMvmt [Content Family]
CC_Perfect_Negative_Sent [Content Family]
CC_Perfect_Positive_Sent [Content Family]
ChartTotalBullet [Conent Family]
ChartTotalSentence [Content Family]
Child_Pct_of_Parent_Bullet [Content Family]
Child_Pct_of_Parent_Sentence [Content Family]
Children_In_Parent_First [Content Family]
Children_In_Parent_Rest [Content Family]
Compare_Negative_Streaks [Content Family]
Compare_Negative_Streaks_Only [Content Family]
Compare_Pos_Neg_Streaks [Content Family]

Name:                                         Content Type:
[Line Story]                                  [Story]

Content Name:                                 Content Type:
[viz]                                         [Viz]

Associated Angle(s)                           Group:
[Form_Bull]                                   [                    ]

Set argument keypath for testing:
[$enter.model.key.path]

Set Context for testing:
[main > Line Story > Line Story One Series]

▸ No content variables available. Create one connect content:                                                   [render text]

810 {

[FocusConent]                    ✓ Connected! This is a Block.        ⇕ ⚙ ✎ ✕

[MultiDimensionFilteringSentence]   ✓ Connected! This is a Paragraph.   ⇕ ⚙ ✎ ✕

[IntroParagraph]                 ✓ Connected! This is a Paragraph.    ⇕ ⚙ ✎ ✕

[DriversBullets]                 ✓ Connected! This is a Block.        ⇕ ⚙ ✎ ✕

[OneSeriesBulletHolder]          ✓ Connected! This is a Block.        ⇕ ⚙ ✎ ✕

[DataExplanationParagraph]       ✓ Connected! This is a Paragraph.    ⇕ ⚙ ✎ ✕

⊕

Tags:
[                    ]

Sticky Model Keypaths:
[+ Add Keypath]

Reference Directly by:
[Load]

Comments:
[                                              ]

[Save]                          [Deactivate] [Delete] [Copy]
                   edited by: Peter Sherman @ 9:58am on 5/18/2016

Recently Saved Versions (click to restore version):

Figure 8E:
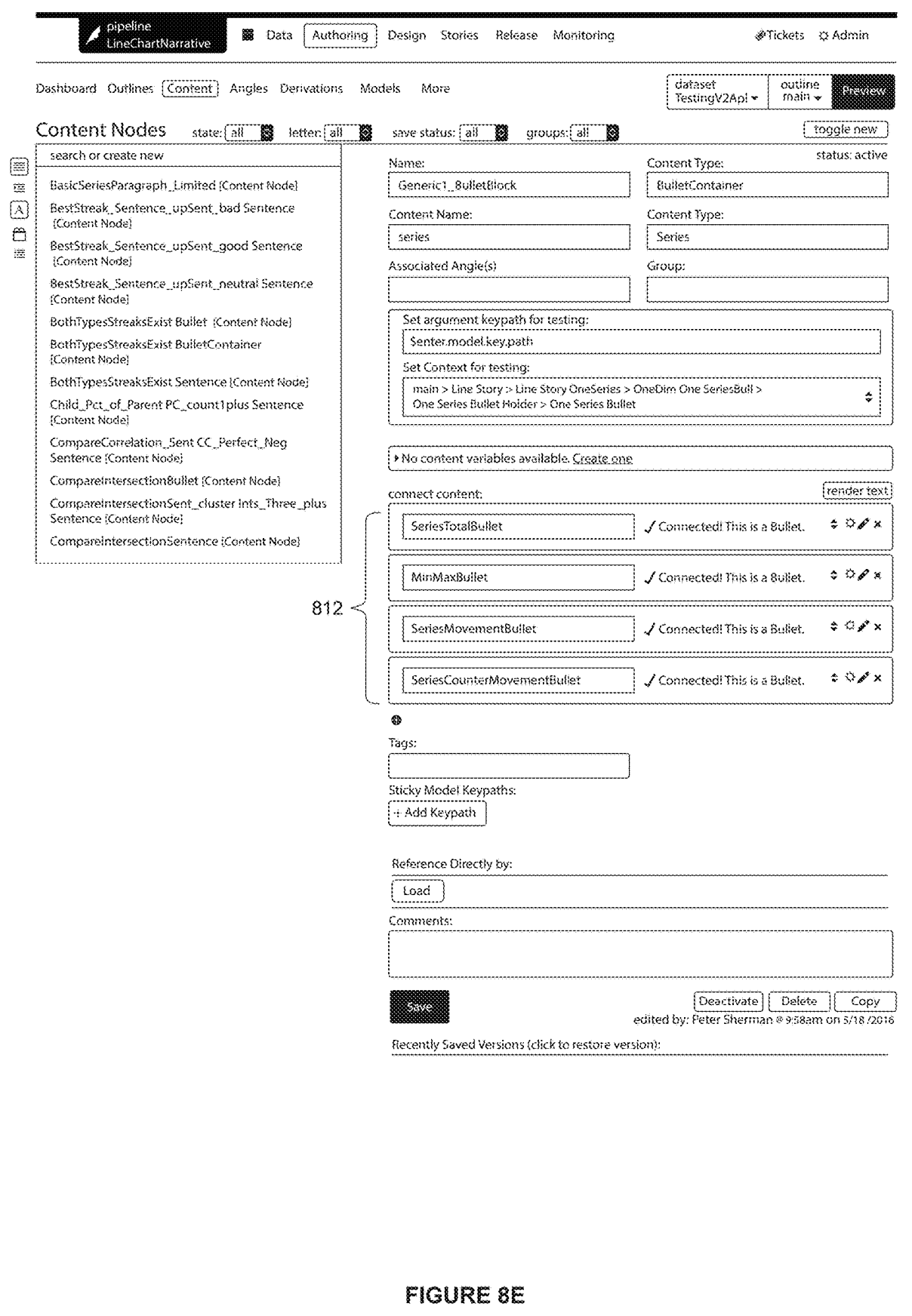

FIGURE 8D pipeline
LineChartNarrative          ▦ Data  | Authoring | Design  Stories  Release  Monitoring          ⚑Tickets  ⚙ Admin Dashboard  Outlines  | Content |  Angles  Derivations  Models  More                          dataset: TestingV2Api ▾  | outline: main ▾ | Preview

Content Nodes    state: [ all ▦ ]  letter: [ all ▦ ]  save status: [ all ▦ ]  groups: [ all ▦ ]                          [ toggle new ]

| search or create new | Name: | Content Type: | status: active |
| --- | --- | --- | --- | search or create new

BasicSeriesParagraph_Limited [Content Node]

BestStreak_Sentence_upSent_bad Sentence [Content Node]

BestStreak_Sentence_upSent_good Sentence [Content Node]

BestStreak_Sentence_upSent_neutral Sentence [Content Node]

BothTypesStreaksExist Bullet [Content Node]

BothTypesStreaksExist BulletContainer [Content Node]

BothTypesStreaksExist Sentence [Content Node]

Child_Pct_of_Parent PC_count1plus Sentence [Content Node]

CompareCorrelation_Sent CC_Perfect_Neg Sentence [Content Node]

CompareIntersectionBullet [Content Node]

CompareIntersectionSent_cluster Ints_Three_plus Sentence [Content Node]

CompareIntersectionSentence [Content Node]

Name:
Generic1_BulletBlock

Content Type:
BulletContainer

Content Name:
series

Content Type:
Series

Associated Angle(s)

Group:

Set argument keypath for testing:
$enter.model.key.path

Set Context for testing:
main > Line Story > Line Story OneSeries > OneDim One SeriesBull >
One Series Bullet Holder > One Series Bullet ▸ No content variables available. Create one connect content:                                                   [ render text ]

812 ⎨

SeriesTotalBullet                    ✓ Connected! This is a Bullet.    ⇕ ⟳ ✎ ×

MinMaxBullet                         ✓ Connected! This is a Bullet.    ⇕ ⟳ ✎ ×

SeriesMovementBullet                 ✓ Connected! This is a Bullet.    ⇕ ⟳ ✎ ×

SeriesCounterMovementBullet          ✓ Connected! This is a Bullet.    ⇕ ⟳ ✎ ×

⊕

Tags:

Sticky Model Keypaths:
[ + Add Keypath ]

Reference Directly by:
[ Load ]

Comments:

[ Save ]                              [ Deactivate ]  [ Delete ]  [ Copy ]
                                      edited by: Peter Sherman @ 9:58am on 5/18/2016

Recently Saved Versions (click to restore version):

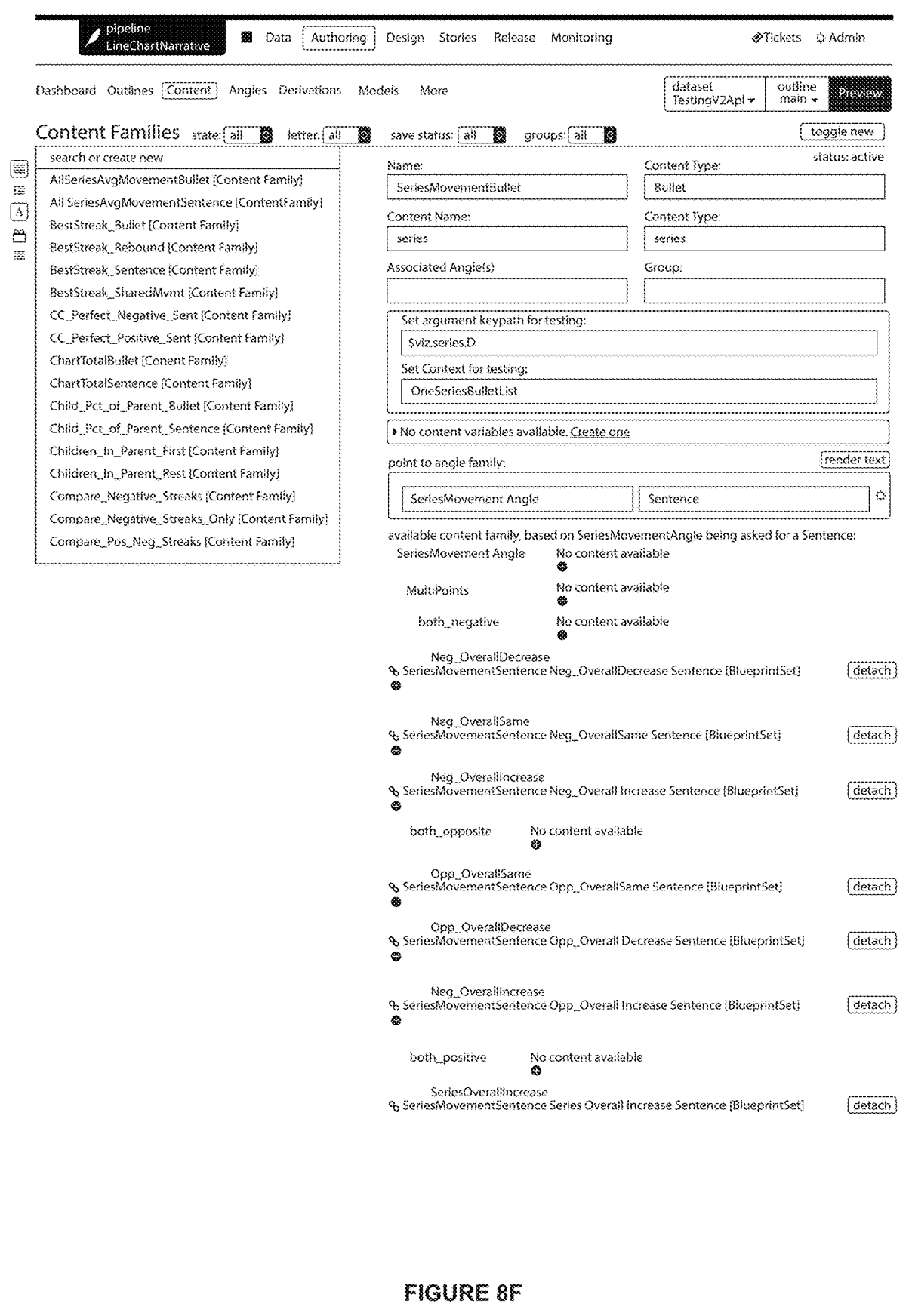

FIGURE 8E pipeline
LineChartNarrative

⬚ Data | Authoring | Design | Stories | Release | Monitoring                    ⬦Tickets | ⟳ Admin Dashboard | Outlines | Content | Angles | Derivations | Models | More

| dataset TestingV2Apl ▾ | outline main ▾ | Preview |

Content Families    state: [all ⬚]    letter: [all ⬚]    save status: [all ⬚]    groups: [all ⬚]        [toggle new]

search or create new

AllSeriesAvgMovementBullet [Content Family]
All SeriesAvgMovementSentence [ContentFamily]
BestStreak_Bullet [Content Family]
BestStreak_Rebound [Content Family]
BestStreak_Sentence [Content Family]
BestStreak_SharedMvmt [Content Family]
CC_Perfect_Negative_Sent [Content Family]
CC_Perfect_Positive_Sent [Content Family]
ChartTotalBullet [Conent Family]
ChartTotalSentence [Content Family]
Child_Pct_of_Parent_Bullet [Content Family]
Child_Pct_of_Parent_Sentence [Content Family]
Children_In_Parent_First [Content Family]
Children_In_Parent_Rest [Content Family]
Compare_Negative_Streaks [Content Family]
Compare_Negative_Streaks_Only [Content Family]
Compare_Pos_Neg_Streaks [Content Family]

status: active

Name:
[ SeriesMovementBullet ]

Content Type:
[ Bullet ]

Content Name:
[ series ]

Content Type:
[ series ]

Associated Angle(s)
[ ]

Group:
[ ]

Set argument keypath for testing:
[ $viz.series.D ]

Set Context for testing:
[ OneSeriesBulletList ]

▸ No content variables available. Create one point to angle family:                    [render text]

[ SeriesMovement Angle ] [ Sentence ] ⟳ available content family, based on SeriesMovementAngle being asked for a Sentence:

SeriesMovement Angle        No content available
                            ⊕

MultiPoints                 No content available
                            ⊕ both_negative              No content available
                            ⊕

Neg_OverallDecrease
⅊ SeriesMovementSentence Neg_OverallDecrease Sentence [BlueprintSet]    [detach]
⊕

Neg_OverallSame
⅊ SeriesMovementSentence Neg_OverallSame Sentence [BlueprintSet]    [detach]
⊕

Neg_OverallIncrease
⅊ SeriesMovementSentence Neg_Overall Increase Sentence [BlueprintSet]    [detach]
⊕ both_opposite          No content available
                           ⊕

Opp_OverallSame
⅊ SeriesMovementSentence Opp_OverallSame Sentence [BlueprintSet]    [detach]
⊕

Opp_OverallDecrease
⅊ SeriesMovementSentence Opp_Overall Decrease Sentence [BlueprintSet]    [detach]
⊕

Neg_OverallIncrease
⅊ SeriesMovementSentence Opp_Overall Increase Sentence [BlueprintSet]    [detach]
⊕ both_positive          No content available
                           ⊕

SeriesOverallIncrease
⅊ SeriesMovementSentence Series Overall Increase Sentence [BlueprintSet]    [detach]

FIGURE 8F

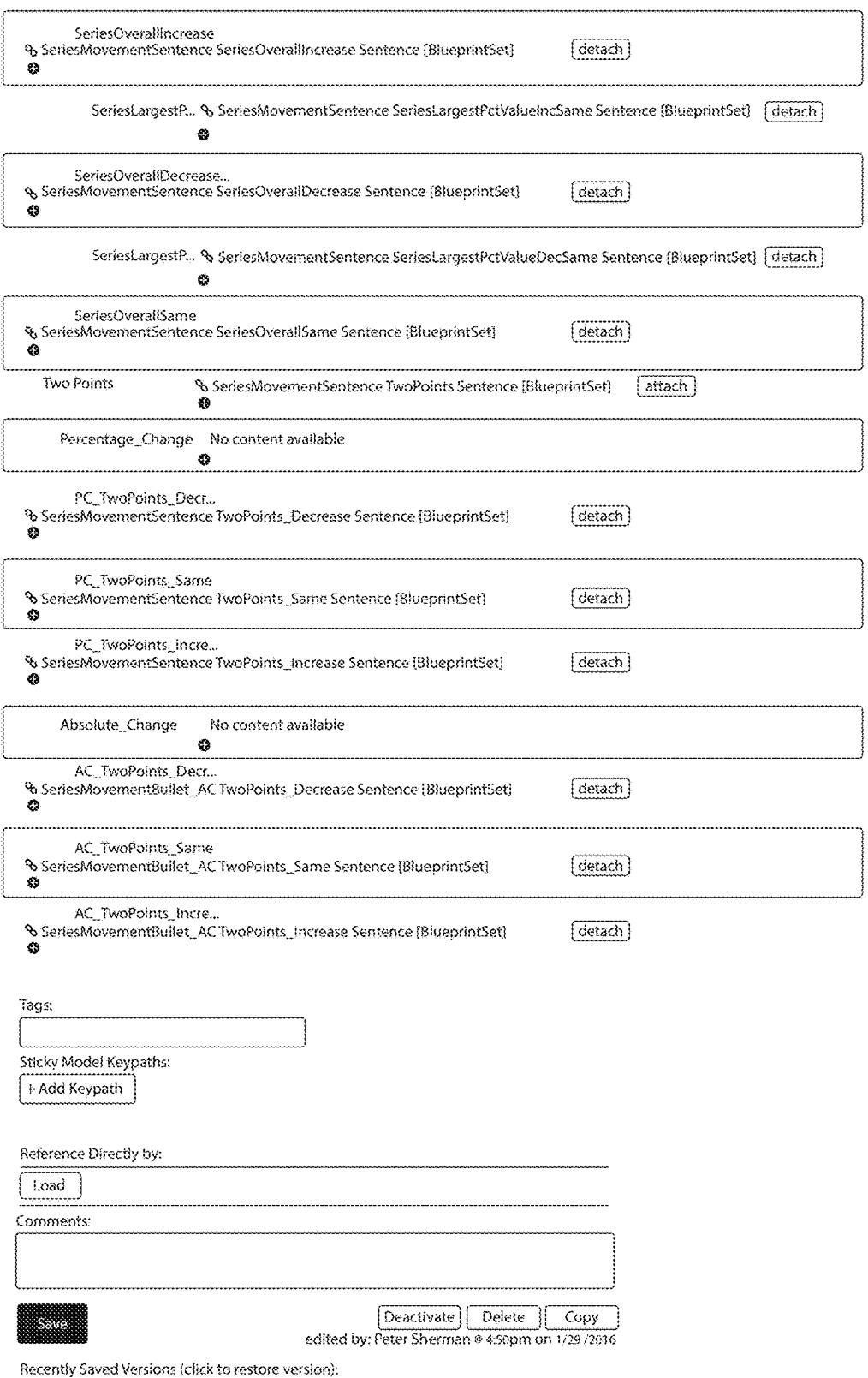

SeriesOverallIncrease
⸗ SeriesMovementSentence SeriesOverallIncrease Sentence [BlueprintSet]     [detach]
⊗

SeriesLargestP... ⸗ SeriesMovementSentence SeriesLargestPctValueIncSame Sentence [BlueprintSet]     [detach]
⊗

SeriesOverallDecrease...
⸗ SeriesMovementSentence SeriesOverallDecrease Sentence [BlueprintSet]     [detach]
⊗

SeriesLargestP... ⸗ SeriesMovementSentence SeriesLargestPctValueDecSame Sentence [BlueprintSet]     [detach]
⊗

SeriesOverallSame
⸗ SeriesMovementSentence SeriesOverallSame Sentence [BlueprintSet]     [detach]
⊗

Two Points     ⸗ SeriesMovementSentence TwoPoints Sentence [BlueprintSet]     [attach]
⊗

Percentage_Change     No content available
⊗

PC_TwoPoints_Decr...
⸗ SeriesMovementSentence TwoPoints_Decrease Sentence [BlueprintSet]     [detach]
⊗

PC_TwoPoints_Same
⸗ SeriesMovementSentence TwoPoints_Same Sentence [BlueprintSet]     [detach]
⊗

PC_TwoPoints_incre...
⸗ SeriesMovementSentence TwoPoints_Increase Sentence [BlueprintSet]     [detach]
⊗

Absolute_Change     No content available
⊗

AC_TwoPoints_Decr...
⸗ SeriesMovementBullet_AC TwoPoints_Decrease Sentence [BlueprintSet]     [detach]
⊗

AC_TwoPoints_Same
⸗ SeriesMovementBullet_AC TwoPoints_Same Sentence [BlueprintSet]     [detach]
⊗

AC_TwoPoints_Incre...
⸗ SeriesMovementBullet_AC TwoPoints_Increase Sentence [BlueprintSet]     [detach]
⊗

Tags:
[                                    ]
Sticky Model Keypaths:
[+ Add Keypath]

Reference Directly by:
[Load]

Comments:
[                                                      ]

[Save]                         [Deactivate] [Delete] [Copy]
                    edited by: Peter Sherman @ 4:50pm on 1/29 /2016
Recently Saved Versions (click to restore version):

Figure 8I:
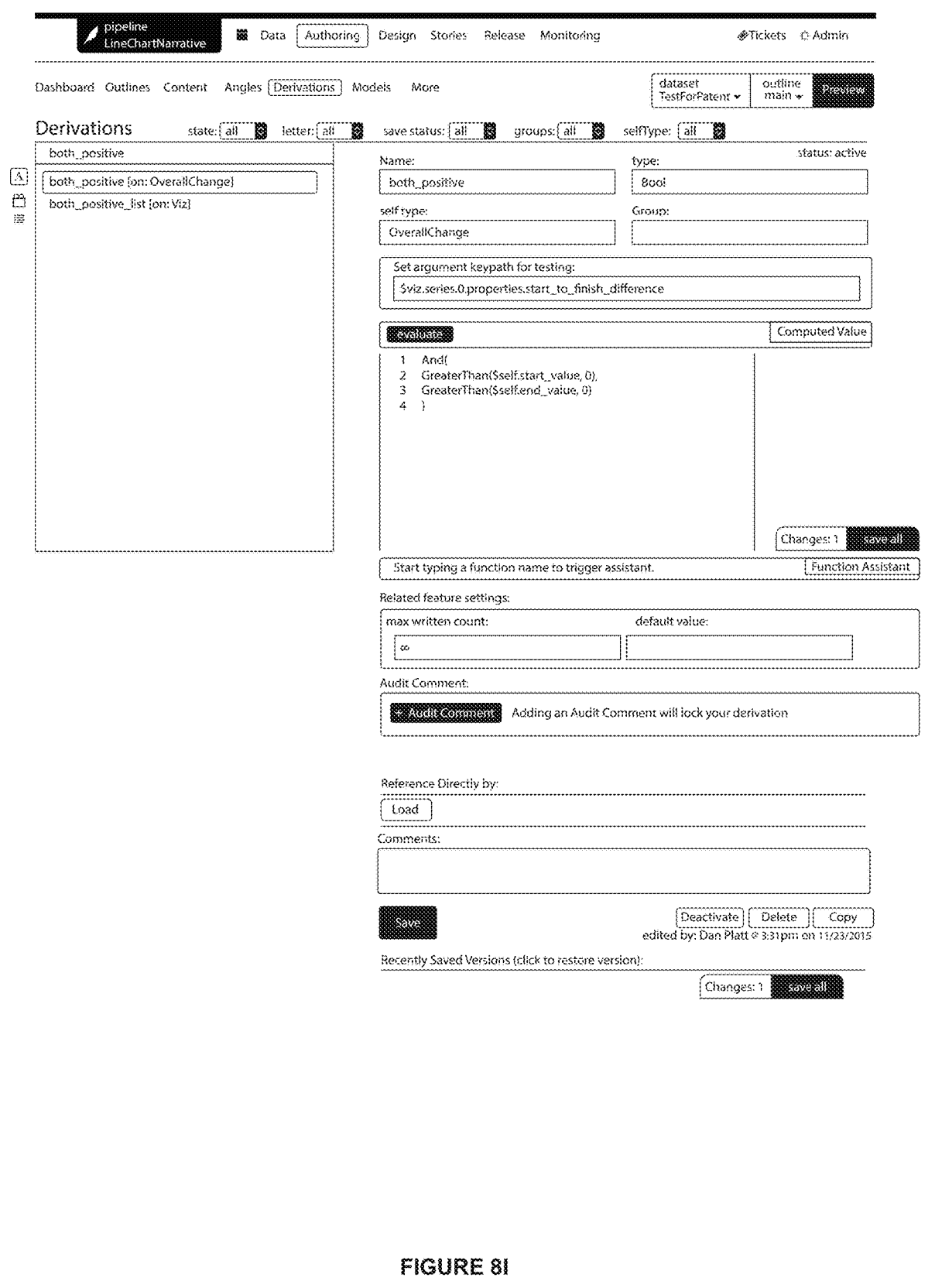

FIGURE 8G pipeline
LineChartNarrative

Data   Authoring   Design   Stories   Release   Monitoring          Tickets   Admin Dashboard   Outlines   Content   Angles   Derivations   Models   More dataset
TestForPatent ▾ outline
main ▾

Derivations          state: all   letter: all   save status: all   groups: all   selfType: all both_positive both_positive [on: OverallChange]

both_positive_list [on: Viz]

Name:                                                          type:                    status: active both_positive                                                  Bool self type:                                                     Group:

OverallChange

Set argument keypath for testing:

$viz.series.0.properties.start_to_finish_difference evaluate                                                       Computed Value

```
1   And(
2     GreaterThan($self.start_value, 0),
3     GreaterThan($self.end_value, 0)
4   )
```

Changes: 1   save all

Start typing a function name to trigger assistant.          Function Assistant

Related feature settings:

max written count:                      default value:

∞

Audit Comment:

+ Audit Comment     Adding an Audit Comment will lock your derivation

Reference Directly by:

Load

Comments:

Save                                    Deactivate   Delete   Copy edited by: Dan Platt @ 3:31pm on 11/23/2015

Recently Saved Versions (click to restore version):

Changes: 1   save all

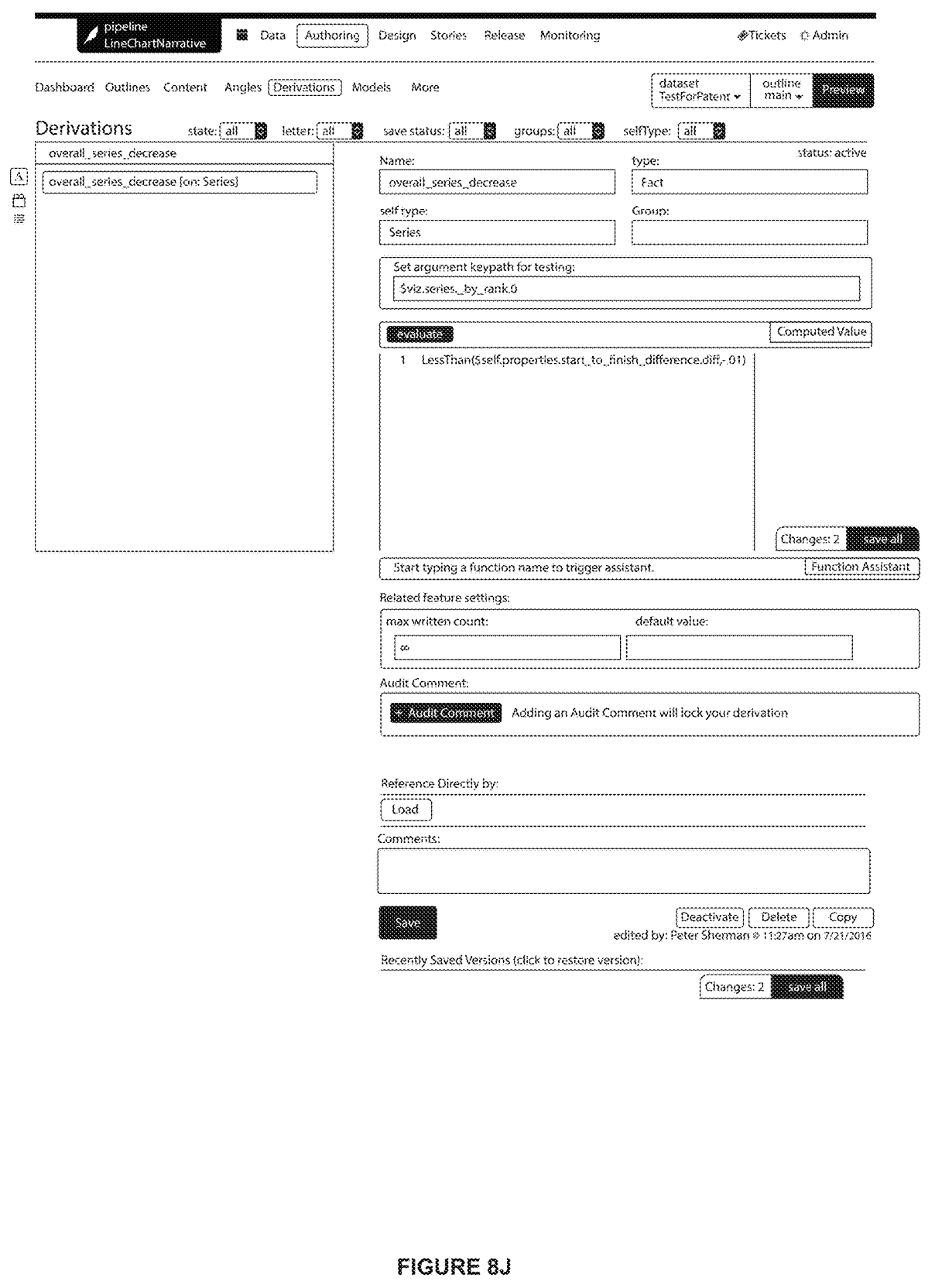

FIGURE 8I pipeline
LineChartNarrative

Data  Authoring  Design  Stories  Release  Monitoring    Tickets  Admin

Dashboard  Outlines  Content  Angles  Derivations  Models  More dataset
TestForPatent ▾ outline
main ▾

Preview

Derivations state: all    letter: all    save status: all    groups: all    selfType: all overall_series_decrease overall_series_decrease [on: Series]

Name:                                              type:                    status: active overall_series_decrease                            Fact self type:                                         Group:

Series

Set argument keypath for testing:

$viz.series._by_rank.0 evaluate                                           Computed Value

1    LessThan($self.properties.start_to_finish_difference.diff,-.01)

Changes: 2    save all

Start typing a function name to trigger assistant.    Function Assistant

Related feature settings:

max written count:                    default value:

∞

Audit Comment:

+ Audit Comment    Adding an Audit Comment will lock your derivation

Reference Directly by:

Load

Comments:

Save                          Deactivate    Delete    Copy
                              edited by: Peter Sherman @ 11:27am on 7/21/2016

Recently Saved Versions (click to restore version):

Changes: 2    save all

FIGURE 8J

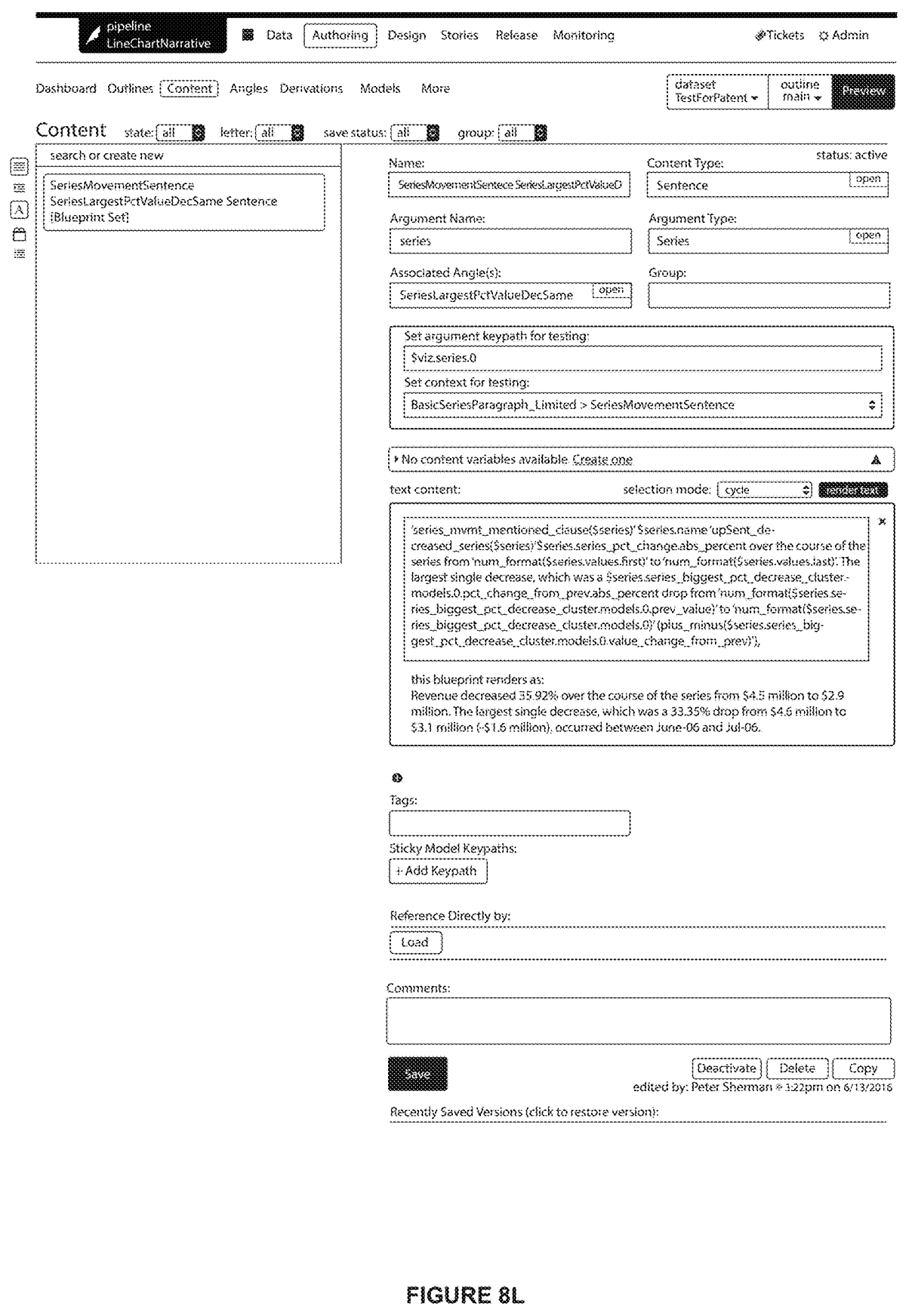

FIGURE 8K pipeline
LineChartNarrative

▓ Data [ Authoring ] Design   Stories   Release   Monitoring                    ✐Tickets   ☼ Admin Dashboard   Outlines  [ Content ]  Angles   Derivations   Models   More dataset
TestForPatent ▾ outline
main ▾

Preview

Content state: [ all ▓ ]   letter: [ all ▓ ]   save status: [ all ▓ ]   group: [ all ▓ ]

search or create new

SeriesMovementSentence
SeriesLargestPctValueDecSame Sentence
[Blueprint Set]

Name:                                                          Content Type:                        status: active

[ SeriesMovementSentece SeriesLargestPctValueD ]   [ Sentence                    open ]

Argument Name:                                                Argument Type:

[ series ]                                                    [ Series                      open ]

Associated Angle(s):                                          Group:

[ SeriesLargestPctValueDecSame    open ]                      [                                   ]

Set argument keypath for testing:

[ $viz.series.0 ]

Set context for testing:

[ BasicSeriesParagraph_Limited > SeriesMovementSentence        ↕ ]

▸ No content variables available. Create one                                              ⚠ text content:                            selection mode: [ cycle    ↕ ]  render text 'series_mvmt_mentioned_clause($series)' $series.name 'upSent_de-
creased_series($series)' $series.series_pct_change.abs_percent over the course of the
series from 'num_format($series.values.first)' to 'num_format($series.values.last)'. The
largest single decrease, which was a $series.series_biggest_pct_decrease_cluster.-
models.0.pct_change_from_prev.abs_percent drop from 'num_format($series.se-
ries_biggest_pct_decrease_cluster.models.0.prev_value)' to 'num_format($series.se-
ries_biggest_pct_decrease_cluster.models.0)' (plus_minus($series.series_big-
gest_pct_decrease_cluster.models.0.value_change_from_prev)'), this blueprint renders as:
Revenue decreased 35.92% over the course of the series from $4.5 million to $2.9
million. The largest single decrease, which was a 33.35% drop from $4.6 million to
$3.1 million (-$1.6 million), occurred between June-06 and Jul-06.

⊕

Tags:

[                                                                    ]

Sticky Model Keypaths:

[ + Add Keypath ]

Reference Directly by:

[ Load ]

Comments:

[                                                                                          ]

[ Save ]                                         [ Deactivate ] [ Delete ] [ Copy ]
                                        edited by: Peter Sherman ⊛ 1:22pm on 6/13/2016

Recently Saved Versions (click to restore version):

FIGURE 8L

{"qSize":{"qcx":2,"qcy":24},"qDimensionInfo":[{"qFallbackTitle":"YearMonth","qApprMaxGlyphCount":
6,"qCardinal":24,"qSortIndicator":"A","qGroupFallbackTitles":["YearMonth"],"qGroupPos":0,"qStateC
ounts":{"qLocked":0,"qSelected":0,"qOption":24,"qDeselected":0,"qAlternative":0,"qExcluded":0,"qS
electedExcluded":0,"qLockedExcluded":0},"qTags":["$numeric","$integer","$timestamp","$date"],"qDi
mensionType":"N","qGrouping":"N","qNumFormat":{"qType":"U","qnDec":0,"qUseThou":0},"qIsAutoFormat
":true,"qGroupFieldDefs":["YearMonth"],"title":"YearMonth","autoSort":true,"cId":"nqBGAUb","other
sLabel":"Others"}],"qMeasureInfo":[{"qFallbackTitle":"Northeast
Revenue","qApprMaxGlyphCount":10,"qCardinal":0,"qSortIndicator":"D","qNumFormat":{"qType":"R","qn
Dec":0,"qUseThou":0,"qFmt":"###########","qDec":".","qThou":","},"qMin":76949.82,"qMax":725309
.4200000003,"qIsAutoFormat":true,"qAttrExprInfo":[],"autoSort":true,"cId":"mSLFFy","numFormatFrom
Template":true}],"qEffectiveInterColumnSortOrder":[0,1],"qGrandTotalRow":[{"qText":"7225219.81","
qNum":7225219.810000019,"qElemNumber":-
1,"qState":"X","qIsTotalCell":true}],"qDataPages":[{"qMatrix":[[{"qText":"Jan-
06","qNum":38718,"qElemNumber":13,"qState":"O"},{"qText":"158618.1","qNum":158618.09999999998,"qE
lemNumber":0,"qState":"L"}],[{"qText":"Feb-
06","qNum":38749,"qElemNumber":11,"qState":"O"},{"qText":"191975.01","qNum":191975.0099999999,"qE
lemNumber":0,"qState":"L"}],[{"qText":"Mar-
06","qNum":38777,"qElemNumber":12,"qState":"O"},{"qText":"603965.26","qNum":603965.2599999998,"qE
lemNumber":0,"qState":"L"}],[{"qText":"Apr-
06","qNum":38808,"qElemNumber":15,"qState":"O"},{"qText":"76949.82","qNum":76949.82,"qElemNumber"
:0,"qState":"L"}],[{"qText":"May-
06","qNum":38838,"qElemNumber":16,"qState":"O"},{"qText":"197981.93","qNum":197981.93,"qElemNumbe
r":0,"qState":"L"}],[{"qText":"Jun-
06","qNum":38869,"qElemNumber":7,"qState":"O"},{"qText":"133058.78","qNum":133058.78000000003,"qE
lemNumber":0,"qState":"L"}],[{"qText":"Jul-
06","qNum":38899,"qElemNumber":10,"qState":"O"},{"qText":"77195.93","qNum":77195.92999999998,"qEl
emNumber":0,"qState":"L"}],[{"qText":"Aug-
06","qNum":38930,"qElemNumber":6,"qState":"O"},{"qText":"202320.01","qNum":202320.0099999999,"qEl
emNumber":0,"qState":"L"}],[{"qText":"Sep-
06","qNum":38961,"qElemNumber":4,"qState":"O"},{"qText":"611451.78","qNum":611451.7799999998,"qEl
emNumber":0,"qState":"L"}],[{"qText":"Oct-
06","qNum":38991,"qElemNumber":8,"qState":"O"},{"qText":"167828.07","qNum":167828.06999999995,"qE
lemNumber":0,"qState":"L"}],[{"qText":"Nov-
06","qNum":39022,"qElemNumber":5,"qState":"O"},{"qText":"693860.66","qNum":693860.6600000006,"qEl
emNumber":0,"qState":"L"}],[{"qText":"Dec-
06","qNum":39052,"qElemNumber":14,"qState":"O"},{"qText":"148994.03","qNum":148994.0299999999,"qE
lemNumber":0,"qState":"L"}],[{"qText":"Jan-
07","qNum":39083,"qElemNumber":2,"qState":"O"},{"qText":"243917.93","qNum":243917.9300000001,"qEl
emNumber":0,"qState":"L"}],[{"qText":"Feb-
07","qNum":39114,"qElemNumber":17,"qState":"O"},{"qText":"179717.18","qNum":179717.18,"qElemNumbe
r":0,"qState":"L"}],[{"qText":"Mar-
07","qNum":39142,"qElemNumber":23,"qState":"O"},{"qText":"677579.99","qNum":677579.9900000002,"qE
lemNumber":0,"qState":"L"}],[{"qText":"Apr-
07","qNum":39173,"qElemNumber":0,"qState":"O"},{"qText":"226345.88","qNum":226345.88,"qElemNumber
":0,"qState":"L"}],[{"qText":"May-
07","qNum":39203,"qElemNumber":18,"qState":"O"},{"qText":"321832.08","qNum":321832.08,"qElemNumbe
r":0,"qState":"L"}],[{"qText":"Jun-
07","qNum":39234,"qElemNumber":1,"qState":"O"},{"qText":"93950.79","qNum":93950.79000000001,"qEle
mNumber":0,"qState":"L"}],[{"qText":"Jul-
07","qNum":39264,"qElemNumber":21,"qState":"O"},{"qText":"232852.48","qNum":232852.48000000007,"q
ElemNumber":0,"qState":"L"}],[{"qText":"Aug-
07","qNum":39295,"qElemNumber":19,"qState":"O"},{"qText":"191465.12","qNum":191465.12,"qElemNumbe
r":0,"qState":"L"}],[{"qText":"Sep-
07","qNum":39326,"qElemNumber":3,"qState":"O"},{"qText":"725309.42","qNum":725309.4200000003,"qEl
emNumber":0,"qState":"L"}],[{"qText":"Oct-

Figure 9B

07","qNum":39356,"qElemNumber":22,"qState":"O"},{"qText":"249483.77","qNum":249483.77000000002,"q
ElemNumber":0,"qState":"L"}],[{"qText":"Nov-
07","qNum":39387,"qElemNumber":20,"qState":"O"},{"qText":"705726.68","qNum":705726.6800000002,"qE
lemNumber":0,"qState":"L"}],[{"qText":"Dec-
07","qNum":39417,"qElemNumber":9,"qState":"O"},{"qText":"112839.11","qNum":112839.11000000003,"qE
lemNumber":0,"qState":"L"}]],"qTails":[{"qUp":0,"qDown":0}],"qArea":{"qLeft":0,"qTop":0,"qWidth":
2,"qHeight":24}}],"qPivotDataPages":[],"qStackedDataPages":[],"qMode":"S","qNoOfLeftDims":-
1,"qSelectionObjectDef":{},"nfqConfig":{"language":{"dimensions":{"nqBGAUb":{"variations":[{"sing
ular":"period","plural":"periods"}]}},"measures":{"mSLPFy":{"variations":[]}}},"characterizations
":{"dimensions":{"nqBGAUb":{"cId":"nqBGAUb","index":0}},"measures":{"mSLPFy":{"cId":"mSLPFy","ind
ex":0,"aggregationPrediction":"sum","aggregation":"sum","percentagePrediction":"non-
percentage","percentage":"non-
percentage","upSentiment":"good"}}},"analytics":{"segments":{"id":"segments","index":0,"enabled":
true,"requiresMulti":false,"label":"Segments"},"trendline":{"id":"trendline","index":1,"enabled":
true,"requiresMulti":false,"label":"Trendline"},"volatility":{"id":"volatility","index":2,"enable
d":true,"requiresMulti":true,"label":"Volatility"},"correlation":{"id":"correlation","index":3,"e
nabled":true,"requiresMulti":true,"label":"Correlation"}},"relationships":{"hasRelationships":fal
se,"relations":[]},"focus":{},"sourceChartId":"arQZv","previousSourceChartId":"arQZv","settingPro
perties":false}}"

Figure 9C

{"selections":{"measure_selected":true},"focus":{},"relationship_configuration":{},"authoring_con
figuration":{"format":"bullets","verbosity":5},"dimension":{"id":"nqBGAUb","name":"YearMonth","va
lues":[38718,38749,38777,38808,38838,38869,38899,38930,38961,38991,39022,39052],"index":0,"labels
":[{"singular":"period","plural":"periods"}],"text_values":["Jan-06","Feb-06","Mar-06","Apr-
06","May-06","Jun-06","Jul-06","Aug-06","Sep-06","Oct-06","Nov-06","Dec-
06"],"number_format":{"number_decimal":0,"type":null,"use_thousand":false},"is_time":false,"is_co
ntinuous":true},"series":[{"id":"mSLPFy","name":"Northeast
Revenue","values":[158618.09999999998,191975.0099999999,603965.2599999998,76949.82,197981.93,1330
58.78000000003,77195.92999999998,202320.0099999999,611451.7799999998,167828.06999999995,693860.66
00000006,148994.0299999999],"text_values":["158618.1","191975.01","603965.26","76949.82","197981.
93","133058.78","77195.93","202320.01","611451.78","167828.07","693860.66","148994.03"],"number_f
ormat":{"decimal_char":".","number_decimal":0,"format":"############","thousand_char":",","type
":"real","use_thousand":false},
"index":0,"aggregationPrediction":"sum","aggregation":"sum","percentagePrediction":"non-
percentage","percentage":"non-
percentage","upSentiment":"good","labels":[]}],"analytics_configuration":{"segments":{"id":"segme
nts","index":0,"enabled":true,"requiresMulti":false,"label":"Segments"},"trendline":{"id":"trendl
ine","index":1,"enabled":true,"requiresMulti":false,"label":"Trendline"},"volatility":{"id":"vola
tility","index":2,"enabled":false,"requiresMulti":true,"label":"Volatility"},"correlation":{"id":
"correlation","index":3,"enabled":false,"requiresMulti":true,"label":"Correlation}

Figure 9D

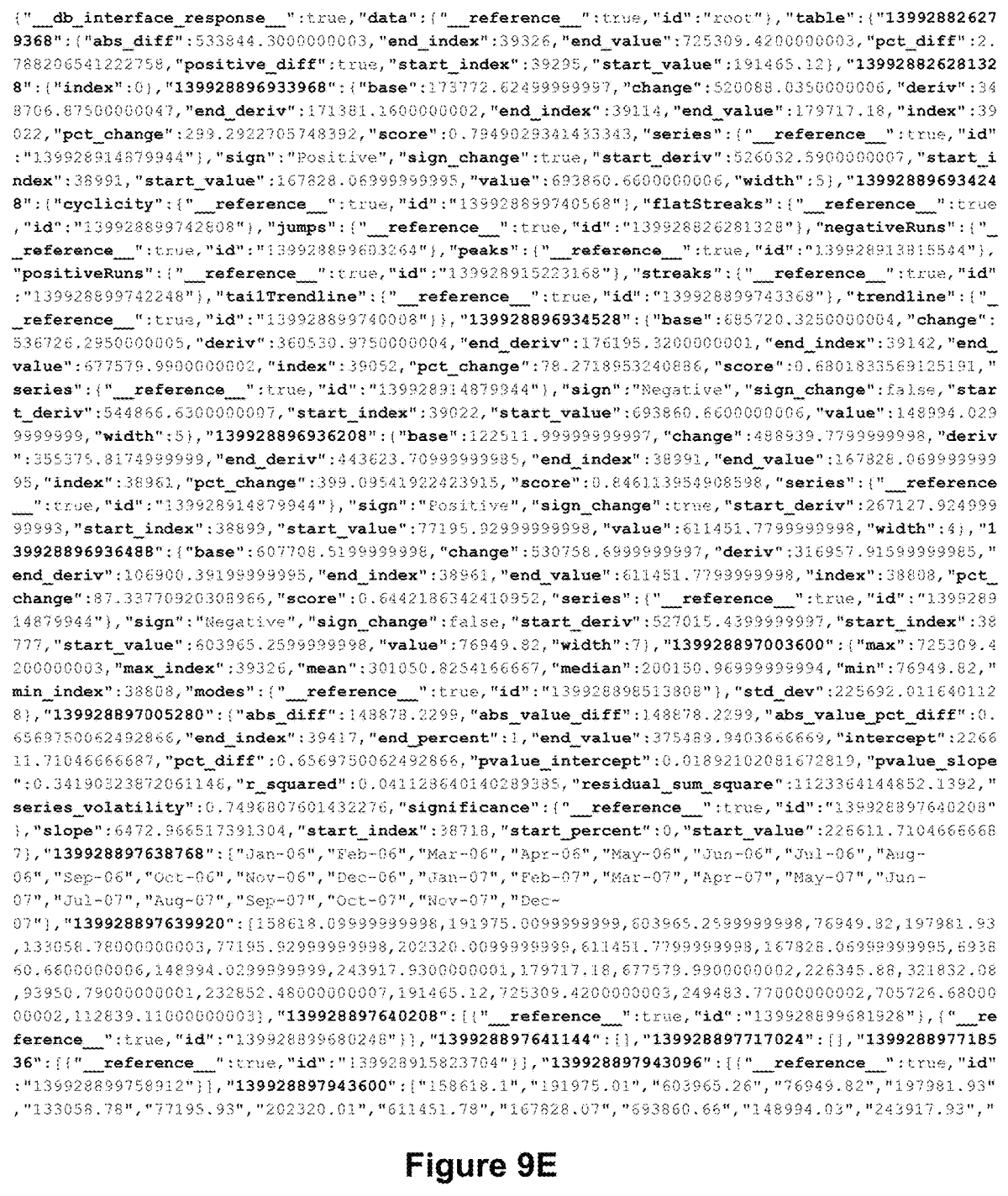

{"__db_interface_response__":true,"data":{"__reference__":true,"id":"root"},"table":{"13392882627
9368":{"abs_diff":533844.3000000003,"end_index":39326,"end_value":725309.4200000003,"pct_diff":2.
788206541222758,"positive_diff":true,"start_index":39295,"start_value":191465.12},"13392882628132
8":{"index":0},"139928896933968":{"base":173772.62499999997,"change":520088.0350000006,"deriv":34
8706.87500000047,"end_deriv":171381.1600000002,"end_index":39114,"end_value":179717.18,"index":39
022,"pct_change":299.2922705748392,"score":0.7949029341433343,"series":{"__reference__":true,"id"
:"139928914879944"},"sign":"Positive","sign_change":true,"start_deriv":526032.5900000007,"start_i
ndex":38991,"start_value":167828.06999999995,"value":693860.6600000006,"width":5},"13392889693424
8":{"cyclicity":{"__reference__":true,"id":"139928899740568"},"flatStreaks":{"__reference__":true
,"id":"139928899742808"},"jumps":{"__reference__":true,"id":"139928826281328"},"negativeRuns":{"_
_reference__":true,"id":"139928899603264"},"peaks":{"__reference__":true,"id":"139928913815544"},
"positiveRuns":{"__reference__":true,"id":"139928915223168"},"streaks":{"__reference__":true,"id"
:"139928899742248"},"tailTrendline":{"__reference__":true,"id":"139928899743368"},"trendline":{"_
_reference__":true,"id":"139928899740008"}},"139928896934528":{"base":685720.3250000004,"change":
536726.2950000005,"deriv":360530.9750000004,"end_deriv":176195.3200000001,"end_index":39142,"end_
value":677579.9900000002,"index":39052,"pct_change":78.2718953240886,"score":0.6801833569125191,"
series":{"__reference__":true,"id":"139928914879944"},"sign":"Negative","sign_change":false,"star
t_deriv":544866.6300000007,"start_index":39022,"start_value":693860.6600000006,"value":148994.029
9999999,"width":5},"139928896936208":{"base":122511.99999999997,"change":488939.7799999998,"deriv
":355375.8174999999,"end_deriv":443623.70999999985,"end_index":38991,"end_value":167828.069999999
95,"index":38961,"pct_change":399.09541922423915,"score":0.846113954908598,"series":{"__reference
__":true,"id":"139928914879944"},"sign":"Positive","sign_change":true,"start_deriv":267127.924999
99993,"start_index":38899,"start_value":77195.92999999998,"value":611451.7799999998,"width":4},"1
39928896936488":{"base":607708.5199999998,"change":530758.6999999997,"deriv":316957.91599999985,"
end_deriv":106900.39199999995,"end_index":38961,"end_value":611451.7799999998,"index":38808,"pct_
change":87.33770920308966,"score":0.6442186342410952,"series":{"__reference__":true,"id":"1399289
14879944"},"sign":"Negative","sign_change":false,"start_deriv":527015.4399999997,"start_index":38
777,"start_value":603965.2599999998,"value":76949.82,"width":7},"139928897003600":{"max":725309.4
200000003,"max_index":39326,"mean":301050.8254166667,"median":200150.96999999994,"min":76949.82,"
min_index":38808,"modes":{"__reference__":true,"id":"139928898513808"},"std_dev":225692.011640112
8},"139928897005280":{"abs_diff":148878.2299,"abs_value_diff":148878.2299,"abs_value_pct_diff":0.
6569750062492866,"end_index":39417,"end_percent":1,"end_value":375489.9403666669,"intercept":2266
11.71046666687,"pct_diff":0.6569750062492866,"pvalue_intercept":0.01892102081672819,"pvalue_slope
":0.3419032387206114€,"r_squared":0.04112864014028938€,"residual_sum_square":1123364144852.1392,"
series_volatility":0.7496807601432276,"significance":{"__reference__":true,"id":"139928897640208"
},"slope":6472.966517391304,"start_index":38718,"start_percent":0,"start_value":226611.7104666668
7},"139928897638768":{"Jan-06","Feb-06","Mar-06","Apr-06","May-06","Jun-06","Jul-06","Aug-
06","Sep-06","Oct-06","Nov-06","Dec-06","Jan-07","Feb-07","Mar-07","Apr-07","May-07","Jun-
07","Jul-07","Aug-07","Sep-07","Oct-07","Nov-07","Dec-
07"},"139928897639920":{158618.09999999998,191975.8099999999,603965.2599999998,76949.82,197981.93
,133058.78000000003,77195.92999999998,202320.0099999999,611451.7799999998,167828.06999999995,6938
60.6600000006,148994.0299999999,243917.9300000001,179717.18,677579.9900000002,226345.88,321832.08
,93950.79000000001,232852.48000000007,191465.12,725309.4200000003,249483.77000000002,705726.68000
00002,112839.11000000003},"139928897640208":[{"__reference__":true,"id":"139928899681928"},{"__re
ference__":true,"id":"139928899680248"}],"139928897641144":[],"139928897717024":[],"139928897718
536":[{"__reference__":true,"id":"139928915823704"}],"139928897943096":[{"__reference__":true,"id"
:"139928899758912"}],"139928897943600":["158618.1","191975.01","603965.26","76949.82","197981.93"
,"133058.78","77195.93","202320.01","611451.78","167828.07","693860.66","148994.03","243917.93","

Figure 9E

Figure 9F:
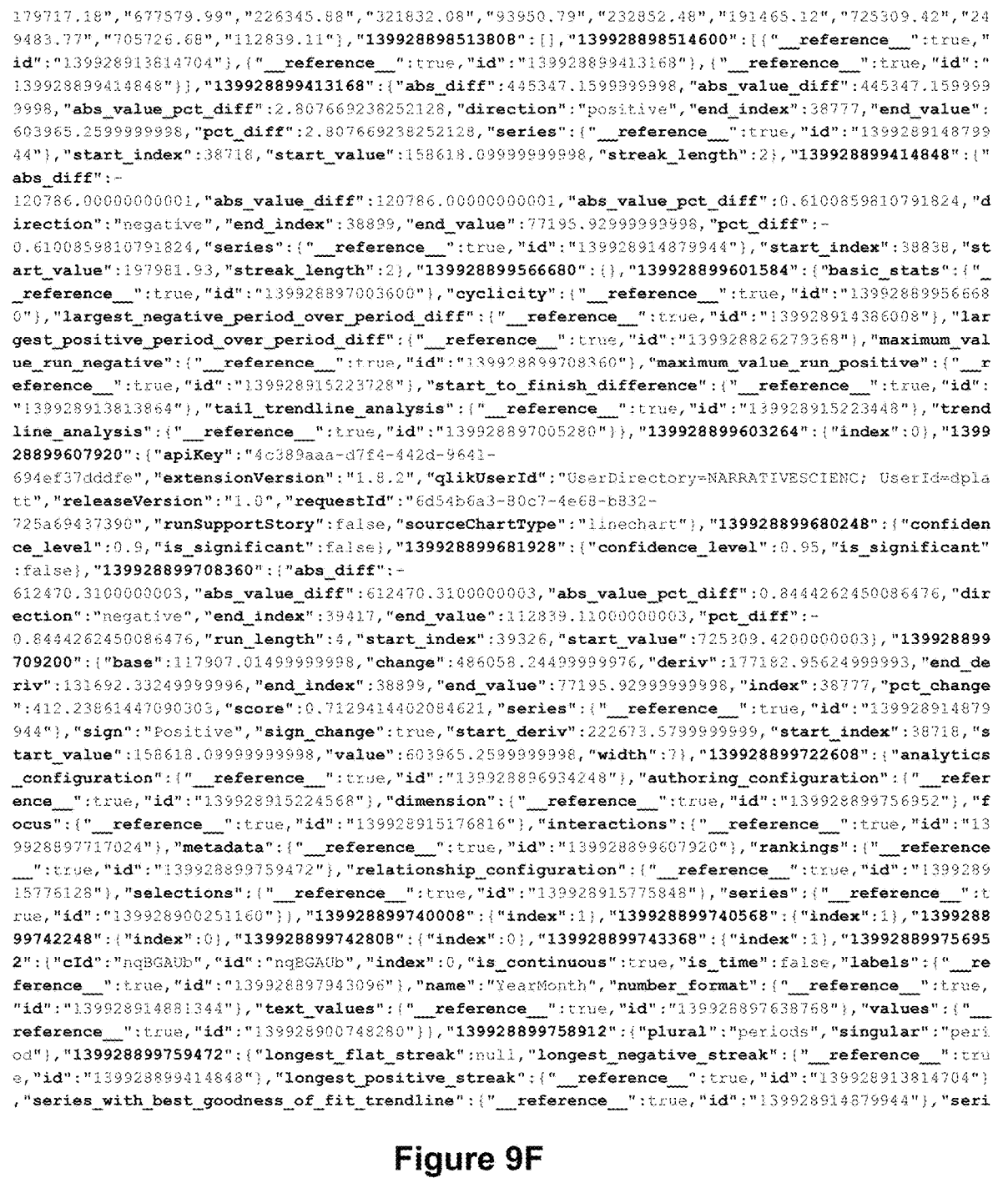

179717.18","677579.99","226345.88","321832.08","93950.79","232852.48","191465.12","725309.42","24
9483.77","705726.68","112839.11"],"139928898513808":[],"139928898514600":[{"__reference__":true,"
id":"139928913814704"},{"__reference__":true,"id":"139928899413168"},{"__reference__":true,"id":"
139928899414848"}],"139928899413168":{"abs_diff":445347.1599999998,"abs_value_diff":445347.159999
9998,"abs_value_pct_diff":2.807669238252128,"direction":"positive","end_index":38777,"end_value":
603965.2599999998,"pct_diff":2.807669238252128,"series":{"__reference__":true,"id":"1399289148799
44"},"start_index":38718,"start_value":158618.09999999998,"streak_length":2},"139928899414848":{"
abs_diff":-
120786.00000000001,"abs_value_diff":120786.00000000001,"abs_value_pct_diff":0.6100859810791824,"d
irection":"negative","end_index":38899,"end_value":77195.92999999998,"pct_diff":-
0.6100859810791824,"series":{"__reference__":true,"id":"139928914879944"},"start_index":38838,"st
art_value":197981.93,"streak_length":2},"139928899566680":{},"139928899601584":{"basic_stats":{"_
_reference__":true,"id":"139928897003600"},"cyclicity":{"__reference__":true,"id":"13992889956668
0"},"largest_negative_period_over_period_diff":{"__reference__":true,"id":"139928914386008"},"lar
gest_positive_period_over_period_diff":{"__reference__":true,"id":"139928826279368"},"maximum_val
ue_run_negative":{"__reference__":true,"id":"139928899708360"},"maximum_value_run_positive":{"__r
eference__":true,"id":"139928915223728"},"start_to_finish_difference":{"__reference__":true,"id":
"139928913813864"},"tail_trendline_analysis":{"__reference__":true,"id":"139928915223448"},"trend
line_analysis":{"__reference__":true,"id":"139928897005280"}},"139928899603264":{"index":0},"1399
28899607920":{"apiKey":"4c389aaa-d7f4-442d-9641-
694ef37dddfe","extensionVersion":"1.8.2","qlikUserId":"UserDirectory=NARRATIVESCIENC; UserId=dpla
tt","releaseVersion":"1.0","requestId":"6d54b6a3-80c7-4e68-b832-
725a69437390","runSupportStory":false,"sourceChartType":"linechart"},"139928899680248":{"confiden
ce_level":0.9,"is_significant":false},"139928899681928":{"confidence_level":0.95,"is_significant"
:false},"139928899708360":{"abs_diff":-
612470.3100000003,"abs_value_diff":612470.3100000003,"abs_value_pct_diff":0.8444262450086476,"dir
ection":"negative","end_index":39417,"end_value":112839.11000000003,"pct_diff":-
0.8444262450086476,"run_length":4,"start_index":39326,"start_value":725309.4200000003},"139928899
709200":{"base":117907.01499999998,"change":486058.24499999976,"deriv":177182.95624999993,"end_de
riv":131692.33249999996,"end_index":38899,"end_value":77195.92999999998,"index":38777,"pct_change
":412.23861447090303,"score":0.712941440208462l,"series":{"__reference__":true,"id":"139928914879
944"},"sign":"Positive","sign_change":true,"start_deriv":222673.5799999999,"start_index":38718,"s
tart_value":158618.09999999998,"value":603965.2599999998,"width":7},"139928899722608":{"analytics
_configuration":{"__reference__":true,"id":"139928896934248"},"authoring_configuration":{"__refer
ence__":true,"id":"139928915224568"},"dimension":{"__reference__":true,"id":"139928899756952"},"f
ocus":{"__reference__":true,"id":"139928915176816"},"interactions":{"__reference__":true,"id":"13
9928897717024"},"metadata":{"__reference__":true,"id":"139928899607920"},"rankings":{"__reference
__":true,"id":"139928899759472"},"relationship_configuration":{"__reference__":true,"id":"1399289
15776128"},"selections":{"__reference__":true,"id":"139928915775848"},"series":{"__reference__":t
rue,"id":"139928900251160"}},"139928899740008":{"index":1},"139928899740568":{"index":1},"1399288
99742248":{"index":0},"139928899742808":{"index":0},"139928899743368":{"index":1},"13992889975695
2":{"cId":"nqBGAUb","id":"nqBGAUb","index":0,"is_continuous":true,"is_time":false,"labels":{"__re
ference__":true,"id":"139928897943096"},"name":"YearMonth","number_format":{"__reference__":true,
"id":"139928914881344"},"text_values":{"__reference__":true,"id":"139928897638768"},"values":{"__
reference__":true,"id":"139928900748280"}},"139928899758912":{"plural":"periods","singular":"peri
od"},"139928899759472":{"longest_flat_streak":null,"longest_negative_streak":{"__reference__":tru
e,"id":"139928899414848"},"longest_positive_streak":{"__reference__":true,"id":"139928913814704"}
,"series_with_best_goodness_of_fit_trendline":{"__reference__":true,"id":"139928914879944"},"seri

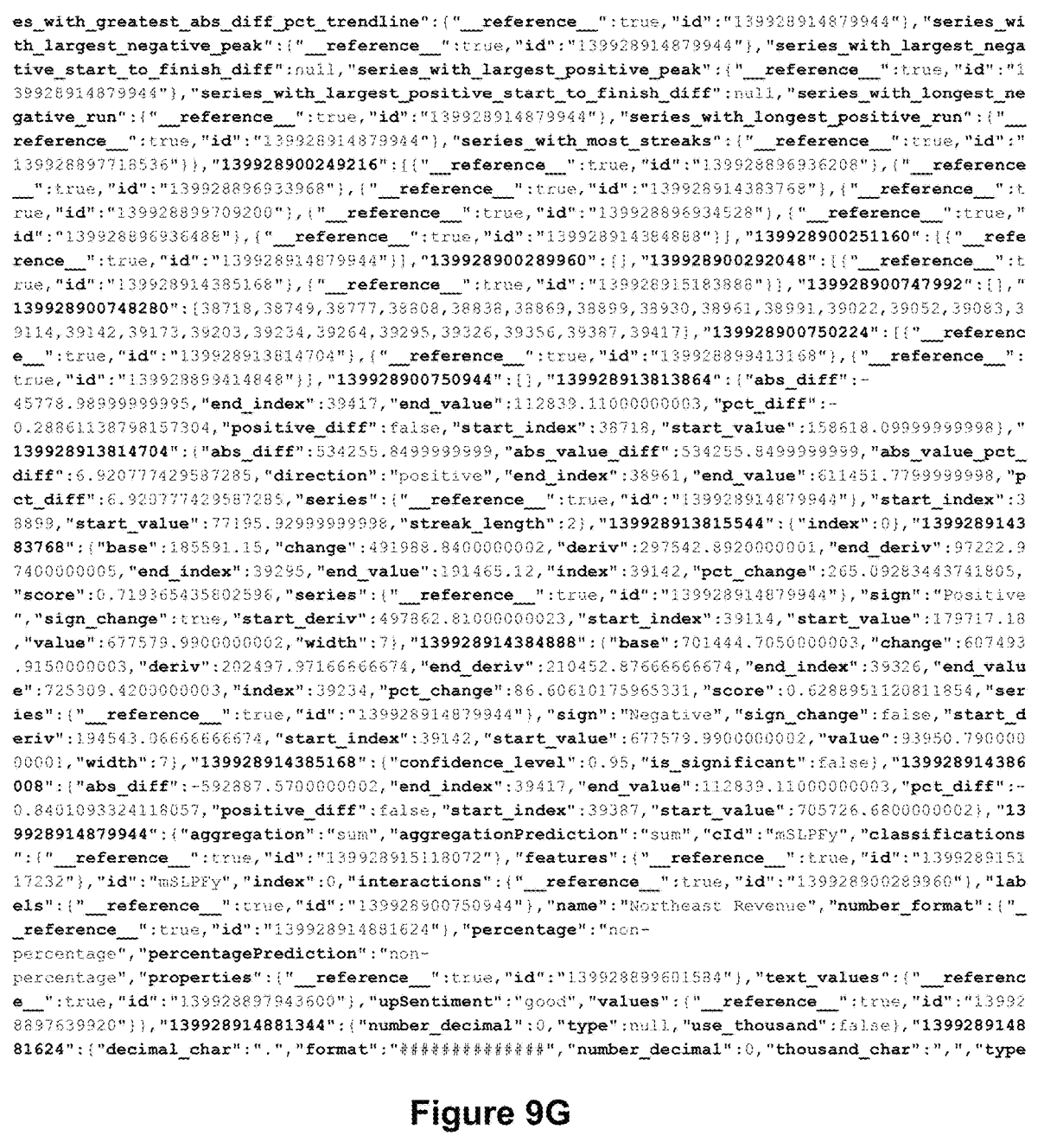

Figure 9F es_with_greatest_abs_diff_pct_trendline":{"__reference__":true,"id":"139928914879944"},"series_wi
th_largest_negative_peak":{"__reference__":true,"id":"139928914879944"},"series_with_largest_nega
tive_start_to_finish_diff":null,"series_with_largest_positive_peak":{"__reference__":true,"id":"1
39928914879944"},"series_with_largest_positive_start_to_finish_diff":null,"series_with_longest_ne
gative_run":{"__reference__":true,"id":"139928914879944"},"series_with_longest_positive_run":{"__
reference__":true,"id":"139928914879944"},"series_with_most_streaks":{"__reference__":true,"id":"
139928897718536"}},"139928900249216":[{"__reference__":true,"id":"139928896936208"},{"__reference
__":true,"id":"139928896933968"},{"__reference__":true,"id":"139928914383768"},{"__reference__":t
rue,"id":"139928899709200"},{"__reference__":true,"id":"139928896934528"},{"__reference__":true,"
id":"139928896936488"},{"__reference__":true,"id":"139928914384888"}],"139928900251160":[{"__refe
rence__":true,"id":"139928914879944"}],"139928900289960":[],"139928900292048":[{"__reference__":t
rue,"id":"139928914385168"},{"__reference__":true,"id":"139928915183888"}],"139928900747992":[],"
139928900748280":[38718,38749,38777,38808,38838,38869,38899,38930,38961,38991,39022,39052,39083,3
9114,39142,39173,39203,39234,39264,39295,39326,39356,39387,39417],"139928900750224":[{"__referenc
e__":true,"id":"139928913814704"},{"__reference__":true,"id":"139928899413168"},{"__reference__":
true,"id":"139928899414848"}],"139928900750944":[],"139928913813864":{"abs_diff":-
45778.98999999995,"end_index":39417,"end_value":112839.11000000003,"pct_diff":-
0.28861138798157304,"positive_diff":false,"start_index":38718,"start_value":158618.09999999998},"
139928913814704":{"abs_diff":534255.8499999999,"abs_value_diff":534255.8499999999,"abs_value_pct_
diff":6.920777429587285,"direction":"positive","end_index":38961,"end_value":611451.7799999998,"p
ct_diff":6.920777429587285,"series":{"__reference__":true,"id":"139928914879944"},"start_index":3
8899,"start_value":77195.92999999998,"streak_length":2},"139928913815544":{"index":0},"1399289143
83768":{"base":185591.15,"change":491988.8400000002,"deriv":297542.8920000001,"end_deriv":97222.9
7400000005,"end_index":39295,"end_value":191465.12,"index":39142,"pct_change":265.09283443741805,
"score":0.719365435802596,"series":{"__reference__":true,"id":"139928914879944"},"sign":"Positive
","sign_change":true,"start_deriv":497862.81000000023,"start_index":39114,"start_value":179717.18
,"value":677579.9900000002,"width":7},"139928914384888":{"base":701444.7050000003,"change":607493
.9150000003,"deriv":202497.97166666674,"end_deriv":210452.87666666674,"end_index":39326,"end_valu
e":725309.4200000003,"index":39234,"pct_change":86.60610175965331,"score":0.6288951120811854,"ser
ies":{"__reference__":true,"id":"139928914879944"},"sign":"Negative","sign_change":false,"start_d
eriv":194543.06666666674,"start_index":39142,"start_value":677579.9900000002,"value":93950.790000
00001,"width":7},"139928914385168":{"confidence_level":0.95,"is_significant":false},"139928914386
008":{"abs_diff":-592887.5700000002,"end_index":39417,"end_value":112839.11000000003,"pct_diff":-
0.8401093324118057,"positive_diff":false,"start_index":39387,"start_value":705726.6800000002},"13
9928914879944":{"aggregation":"sum","aggregationPrediction":"sum","cId":"mSLPFy","classifications
":{"__reference__":true,"id":"139928915118072"},"features":{"__reference__":true,"id":"1399289151
17232"},"id":"mSLPFy","index":0,"interactions":{"__reference__":true,"id":"139928900289960"},"lab
els":{"__reference__":true,"id":"139928900750944"},"name":"Northeast Revenue","number_format":{"_
_reference__":true,"id":"139928914881624"},"percentage":"non-
percentage","percentagePrediction":"non-
percentage","properties":{"__reference__":true,"id":"139928899601584"},"text_values":{"__referenc
e__":true,"id":"139928897943600"},"upSentiment":"good","values":{"__reference__":true,"id":"13992
8897639920"}},"139928914881344":{"number_decimal":0,"type":null,"use_thousand":false},"1399289148
81624":{"decimal_char":".","format":"############","number_decimal":0,"thousand_char":",","type

Figure 9G

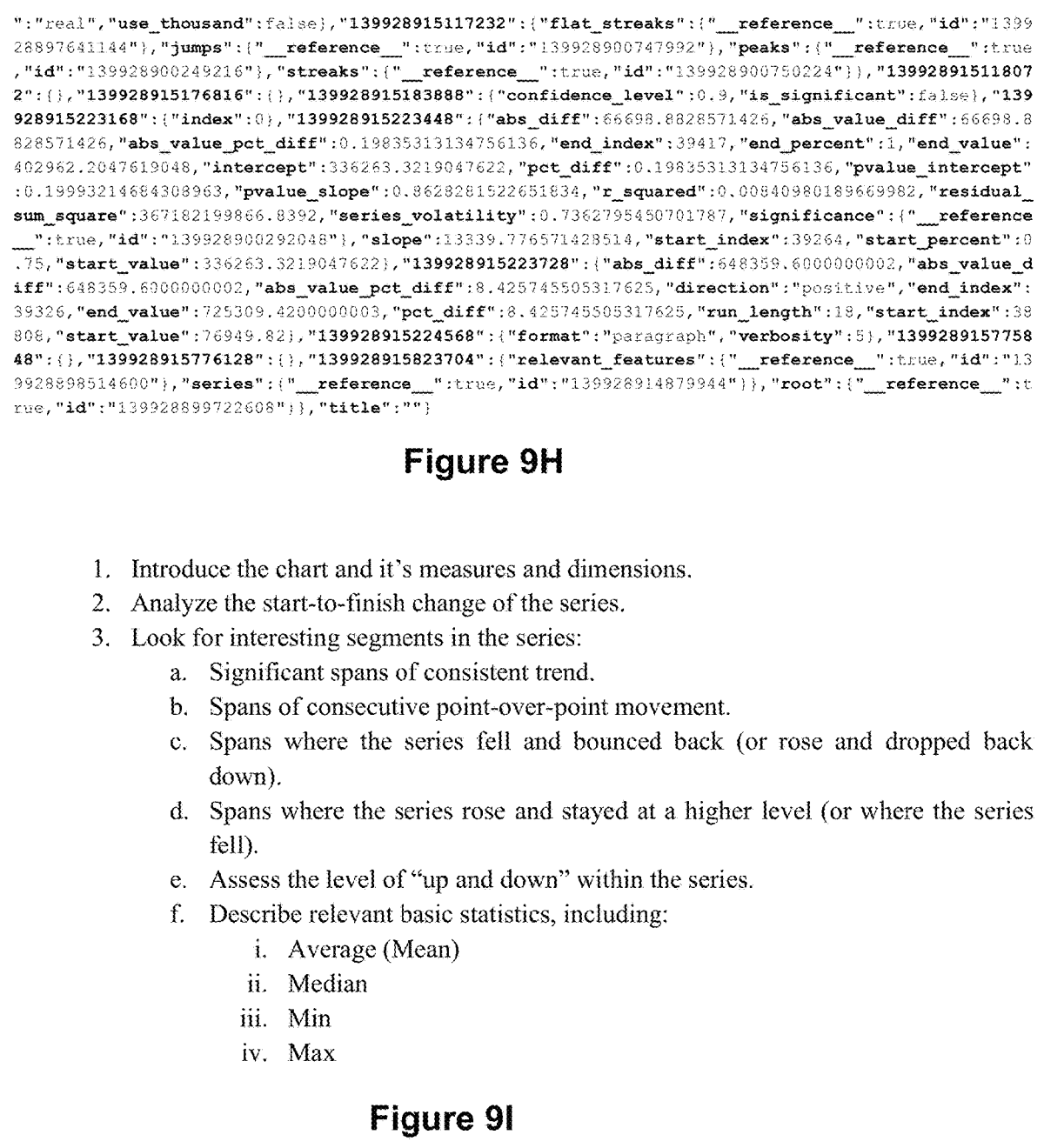

":"real","use_thousand":false},"139928915117232":{"flat_streaks":{"__reference__":true,"id":"1399
28897641144"},"jumps":{"__reference__":true,"id":"139928900747992"},"peaks":{"__reference__":true
,"id":"139928900249216"},"streaks":{"__reference__":true,"id":"139928900750224"}},"13992891511807
2":{},"139928915176816":{},"139928915183888":{"confidence_level":0.9,"is_significant":false},"139
928915223168":{"index":0},"139928915223448":{"abs_diff":66698.8828571426,"abs_value_diff":66698.8
828571426,"abs_value_pct_diff":0.19835313134756136,"end_index":39417,"end_percent":1,"end_value":
402962.2047619048,"intercept":336263.3219047622,"pct_diff":0.19835313134756136,"pvalue_intercept"
:0.19993214684308963,"pvalue_slope":0.8628281522651834,"r_squared":0.00840980189669982,"residual_
sum_square":367182199866.8392,"series_volatility":0.7362795450701787,"significance":{"__reference
__":true,"id":"139928900292048"},"slope":13339.776571428514,"start_index":39264,"start_percent":0
.75,"start_value":336263.3219047622},"139928915223728":{"abs_diff":648359.6000000002,"abs_value_d
iff":648359.6000000002,"abs_value_pct_diff":8.425745505317625,"direction":"positive","end_index":
39326,"end_value":725309.4200000003,"pct_diff":8.425745505317625,"run_length":18,"start_index":38
808,"start_value":76949.82},"139928915224568":{"format":"paragraph","verbosity":5},"1399289157758
48":{},"139928915776128":{},"139928915823704":{"relevant_features":{"__reference__":true,"id":"13
9928898514600"},"series":{"__reference__":true,"id":"139928914879944"}},"root":{"__reference__":t
rue,"id":"139928899722608"}},"title":""}

Figure 9H

1. Introduce the chart and it's measures and dimensions.
2. Analyze the start-to-finish change of the series.
3. Look for interesting segments in the series:
   a. Significant spans of consistent trend.
   b. Spans of consecutive point-over-point movement.
   c. Spans where the series fell and bounced back (or rose and dropped back down).
   d. Spans where the series rose and stayed at a higher level (or where the series fell).
   e. Assess the level of "up and down" within the series.
   f. Describe relevant basic statistics, including:
      i. Average (Mean)
      ii. Median
      iii. Min
      iv. Max

Figure 9I point to angle family:

| Configurable_Content | Sentence |
|---|---| available content family, based on Configurable_Content being asked for a Sentence:

Configurable_Content          *No content available*

CC_Trendline          Configurable_SentBlock CC_Trendline Sentence (Content Node)          detach

CC_Volatility          Configurable_SentBlock CC_Volatility Sentence (Content Node)          detach

CC_Jump          Configurable_SentBlock CC_Jump Sentence (Content Node)          detach

CC_Peak          Configurable_SentBlock CC_Peak Sentence (Content Node)          detach

CC_RunStreak          Configurable_SentBlock CC_RunStreak Sentence (Content Node)          detach

CC_Correlation          Configurable_SentBlock CC_Correlation Sentence (Content Node)          detach

CC_Intersection          Configurable_SentBlock CC_Intersection Sentence (Content Node)          detach

CC_Cyclicity          Configurable_SentBlock CC_Cyclicity Sentence (Content Node)          detach

Figure 9K

```
<ns_story name="main" writeid="write_101151" qid="52e040934216dbb70000000a"
id="55c388b0b9bcf55063af21f8" context-locale="en_US">     <ns_story name="Line Story"
writeid="write_2275091" qid="56abca7915346cf800000237" id="56abcaa8e5039e6b59a63fdc" context-
locale="">        <ns_story name="Line Story OneSeries" writeid="write_1656226"
qid="56abcbb0b7a83bc4ff0001ac" id="56abcbf19ee1580489401ded" context-locale="">
<ns_story name="OneDim OneSeries Para" writeid="write_4053074" qid="56abcc9fb7a83bc4ff0001c0"
id="56abccbf541f1b55d85a6999" context-locale="">          <ns_block name="FocusContent"
writeid="write_9440467" qid="572c9fde25664edbfd000097" id="572c9fde25664edbfd000096" context-
locale=""/>          <ns_paragraph name="MultiDimensionFilteringSentence"
writeid="write_7086443" qid="566eee4d8c00af73ff0003cd" id="566eee664e39950eaf42e712" context-
locale=""/>            <ns_paragraph name="IntroParagraph" writeid="write_1204486"
qid="56abd528b7a83bc4ff000203" id="56abd549e5039e47b4a63fd6" context-locale="">
<ns_sentence name="IntroParagraph Dimensions Sentence" writeid="write_331960"
qid="56abd53db7a83bc4ff000205" id="56abd54be5039e0ef2a63fde"
blueprintid="56abd58d2bf61a980000018d" context-locale="">Taking this selection into account, the
chart measures Northeast Revenue by YearMonth.</ns_sentence>          </ns_paragraph>
<ns_block name="OneSeriesParagraphHolder" writeid="write_217135" qid="56b13e56ae399ac1ff000191"
id="56b13e73e5039e549ea63fcc" context-locale="">               <ns_paragraph
name="OneSeriesSetup" writeid="write_4271758" qid="56bce04a286ad41200000098"
id="56bce05bedac057a7229b9df" context-locale=""/>               <ns_paragraph
name="OneSeriesParagraph_config" writeid="write_5886602" qid="56d86cc5465991640000009b"
id="56d86cd82fae5229a32bf4a9" context-locale="">            <ns_sentence
name="Generic1_SentBlock" writeid="write_3424053" qid="56d86dd446599164000000a0"
id="56d86dfc1a2baf5a0fa17a01" context-locale="">Northeast Revenue was 3,264,199 across all 12
<span data-dimension-id="YxPYD" data-tense="plural" class="entity-
label">periods</span>. Northeast Revenue fell 6.07% over the course of the series from
158,618 to 148,994. The largest single decrease on a percentage basis, which was a 87.26% drop
from 603,965 to 76,949.82, occurred between Mar-06 and Apr-06. However, the largest single
decline on an absolute basis, which was a decline of 544,867 from 693,861 to 148,994, occurred
between Nov-06 and Dec-06. </ns_sentence>            <ns_sentence
name="Configurable_SentBlock" writeid="write_1865011" qid="56d86e2546599164000000b0"
id="56d86e351a2baf5acea179ff" context-locale="">Northeast Revenue had a significant positive peak
between Jul-06 and Oct-06, starting at 77,195.93, rising to 611,452 at Sep-06 and ending at
167,828. Contrasting with the overall decrease, the largest net improvement was from Apr-06 to
Nov-06, when Northeast Revenue rose by 616,911 (801.71%). The two <span data-dimension-
id="YxPYD" data-tense="plural" class="entity-label">periods</span> of consecutive growth
from Jul-06 to Sep-06 when Northeast Revenue increased by 692.08% significantly impacted this
net improvement. Northeast Revenue showed the longest span of consistent decline over two
<span data-dimension-id="YxPYD" data-tense="plural" class="entity-
label">periods</span> from May-06 to Jul-06, falling by 61.01%. </ns_sentence>
<ns_sentence name="Generic2_SentBlock" writeid="write_2370524" qid="56d993cf7d76244c00000098"
id="56d993dec98f680e1adba26c" context-locale="">Values for Northeast Revenue ranged from
76,949.82 (Apr-06) to 693,861 (Nov-06), averaging 272,017.</ns_sentence>
</ns_paragraph>          </ns_block>          <ns_paragraph
name="DataExplanationParagraph" writeid="write_8669073" qid="56abd301b7a83bc4ff0001fa"
id="56abd3652c4bd23e60f72cf5" context-locale=""/>          </ns_story>          </ns_story>
</ns_story> </ns_story>
```

Figure 9L

<p class="ns_paragraph">The chart measures Northeast Revenue by YearMonth.</p><p class="ns_paragraph"></p><p class="ns_paragraph"><ul class="ns_bullet"><li>Northeast Revenue was 7,225,220 across all 24 <span data-dimension-id="JpkmwZ" data-tense="plural" class="entity-label">periods</span>.</li><li>Values ranged from 76,950 (Apr-06) to 725,309 (Sep-07), averaging 301,051.</li><li>Northeast Revenue fell 28.86% over the course of the series from 158,618 to 112,839. The largest single decrease on a percentage basis, which was a 87.26% drop from 603,965 to 76,950, occurred between Mar-06 and Apr-06. However, the largest single decline on an absolute basis, which was a decline of 592,888 from 705,727 to 112,839, occurred between Nov-07 and Dec-07.</li><li>The largest net decline was from Sep-07 to Dec-07, when Northeast Revenue fell by 612,470 (84.44%). Northeast Revenue showed the longest span of consistent decline over two <span data-dimension-id="JpkmwZ" data-tense="plural" class="entity-label">periods</span> from May-06 to Jul-06, falling by 61.01%.</li><li>Northeast Revenue had a significant positive peak between Jul-06 and Oct-06, starting at 77,196, rising to 611,452 at Sep-06 and ending at 167,828.</li><li>Northeast Revenue fluctuated over the course of the series with 86.36% of data points moving in an opposite direction from the previous point.</li></ul></p>

Figure 9M

The chart measures Northeast Revenue by YearMonth.

- Northeast Revenue was 7,225,220 across all 24 periods.
- Northeast Revenue fell 28.86% over the course of the series from 158,618 to 112,839. The largest single decrease on a percentage basis, which was a 87.26% drop from 603,965 to 76,950, occurred between Mar-06 and Apr-06. However, the largest single decline on an absolute basis, which was a decline of 592,888 from 705,727 to 112,839, occurred between Nov-07 and Dec-07.
- The largest net decline was from Sep-07 to Dec-07, when Northeast Revenue fell by 612,470 (84.44%). Northeast Revenue showed the longest span of consistent decline over two periods from May-06 to Jul-06, falling by 61.01%.
- Northeast Revenue had a significant positive peak between Jul-06 and Oct-06, starting at 77,196, rising to 611,452 at Sep-06 and ending at 167,828.
- Northeast Revenue fluctuated over the course of the series with 86.36% of data points moving in an opposite direction from the previous point.
- Values for Northeast Revenue ranged from 76,950 (Apr-06) to 725,309 (Sep-07), averaging 301,051.

powered by Narrative Science

Figure 9N

APPLIED ARTIFICIAL INTELLIGENCE TECHNOLOGY FOR AUTOMATICALLY GENERATING NARRATIVES FROM VISUALIZATION DATA

CROSS-REFERENCE AND PRIORITY CLAIM TO RELATED PATENT APPLICATIONS

This patent application is a continuation of U.S. patent application Ser. No. 17/561,375, filed Dec. 23, 2021, and entitled "Applied Artificial Intelligence Technology for Using Narrative Analytics for Automatically Generating Narratives from Visualization Data", now U.S. Pat. No. 12,153,618, which claims priority to U.S. patent application Ser. No. 15/253,385, filed Aug. 31, 2016, and entitled "Applied Artificial Intelligence Technology for Using Narrative Analytics to Automatically Generate Narratives from Visualization Data", now U.S. Pat. No. 11,238,090, which claims priority to U.S. provisional patent application Ser. No. 62/249,813, filed Nov. 2, 2015, and entitled "Automatic Generation of Narratives to Accompany Visualizations", the entire disclosures of each of which are incorporated herein by reference.

U.S. patent application Ser. No. 17/561,375 is also a continuation of U.S. patent application Ser. No. 15/414,027, filed Jan. 24, 2017, and entitled "Applied Artificial Intelligence Technology for Using Narrative Analytics to Automatically Generate Narratives from Bar Charts", now U.S. Pat. No. 11,222,184, which is a continuation of U.S. patent application Ser. No. 15/253,385, filed Aug. 31, 2016, and entitled "Applied Artificial Intelligence Technology for Using Narrative Analytics to Automatically Generate Narratives from Visualization Data", now U.S. Pat. No. 11,238, 090, which claims priority to U.S. provisional patent application Ser. No. 62/249,813, filed Nov. 2, 2015, and entitled "Automatic Generation of Narratives to Accompany Visualizations", the entire disclosures of each of which are incorporated herein by reference.

U.S. patent application Ser. No. 17/561,375 is also a continuation of U.S. patent application Ser. No. 15/414,089, filed Jan. 24, 2017, and entitled "Applied Artificial Intelligence Technology for Using Narrative Analytics to Automatically Generate Narratives from Line Charts", now U.S. Pat. No. 11,232,268, which is a continuation of U.S. patent application Ser. No. 15/253,385, filed Aug. 31, 2016, and entitled "Applied Artificial Intelligence Technology for Using Narrative Analytics to Automatically Generate Narratives from Visualization Data", now U.S. Pat. No. 11,238, 090, which claims priority to U.S. provisional patent application Ser. No. 62/249,813, filed Nov. 2, 2015, and entitled "Automatic Generation of Narratives to Accompany Visualizations", the entire disclosures of each of which are incorporated herein by reference.

This patent application is related to (1) U.S. patent application Ser. No. 16/235,649, filed Dec. 28, 2018, and entitled "Applied Artificial Intelligence Technology for Using Narrative Analytics to Automatically Generate Narratives from Multiple Visualizations", now U.S. Pat. No. 11,170,038, and (2) U.S. patent application Ser. No. 16/235, 696, filed Dec. 28, 2018, and entitled "Applied Artificial Intelligence Technology for Using Narrative Analytics to Interactively Generate Narratives from Visualization Data", now U.S. Pat. No. 11,188,588, the entire disclosures of each of which are incorporated herein by reference.

INTRODUCTION

Visualizations such as charts and graphs are useful tools for communicating information about a data set. Examples of different types of visualizations that are widely used include line charts, bar charts, pie charts, scatterplot charts, etc. Visualization has been the predominant approach, both commercially and in terms of academic research, to the challenge of making data and data analytics meaningful to people.

For example, FIG. 1A depicts a bar chart that identifies total car sales for a number of different countries in a given year. The y-axis identifies the volume of total car sales, and the x-axis identifies different countries. Thus, the height of a given bar identifies the total number of car sales (indicated by the height of the bar on the y-axis) for a given country (indicated by the placement of the bar along the x-axis next to an adjoining country label). With FIG. 1A, information is conveyed to a user solely through the visualization itself.

As another example, FIG. 1B depicts a line chart that identifies total car production over a time. The y-axis identifies the volume of total car production, and the x-axis identifies the relevant time span in years. A line connects the data points so that a user can see how total car production may have risen or fallen during the subject time span. As with the visualization of FIG. 1A, FIG. 1B only conveys information to the user solely through the visualization itself.

Underlying the visualizations shown by FIGS. 1A and 1B are data sets that provide the basis for the respective bar chart and line chart. For example, the bar chart of FIG. 1A is generated from an underlying data set that identifies data pairs of {Country, Total Car Sales Value} for each country within a set of countries {Country 1, Country 2, . . . }. Similarly, the line chart of FIG. 1B is generated from an underlying data set that identifies data pairs of {Year, Total Car Production Value} for each year within a set of years {Year 1, Year 2, . . . }.

Many data visualization software programs have arisen in the art that are designed to create a wide array of visualizations from underlying data sets such as these. Examples of visualization software applications that are known in the art include the Qlik visualization platform and the Tableau visualization platform. While the inventors recognize that existing visualization platforms provide powerful tools for generating visualizations of data sets, the inventors also believe the visualizations themselves are unable to communicate many interesting or important aspects of the underlying data to users because of the inherently limited nature of communicating information via charts and graphs. Visualization platforms are typically limited to creating rudimentary legends and identifications of significant data points such as maximum/minimum points on a plot in an effort to better convey the information depicted via the visualization.

The conventional approach for significantly enhancing the effectiveness of communication provided by a visualization is to pair the visualization with a caption or the like. These captions may summarize or explain important aspects of the accompanying visualization. However, conventionally, the generation of captions has relied on humans interpreting the visualization itself and manually writing the caption based on their understanding of the subject visualization. This not only places significant burdens on the people creating data visualizations and captions, but the quality of the resulting captions themselves is fundamentally limited by the experience and knowledge of the writer. Hence, conventional approaches to generating visualizations and explaining the meaning of such visualizations are not scalable to cost-effective widespread deployment.

Furthermore, while some attempts have been made at using software to auto-generate captions for use with visualizations, the inventors believe that these approaches fail to provide sufficiently significant, deep, or meaningful explanation about the information conveyed by the visualization. For example, published PCT patent application WO 2014/035403 discloses a method and apparatus for annotating a graphical output where a raw data set is both processed to create a graph about that data set and processed using natural language generation (NLG) techniques to create a text annotation about that data set, and where the annotated text can be displayed in conjunction with the created graph. However, this publication fails to contemplate using the nature of the graph itself to influence how NLG is applied to select and organize information to be conveyed in the annotated text.

The inventors thus believe a significant need exists in the art for technology that is capable of automatically generating narrative text that explains, in natural language, the information conveyed in a visualization of a data set. Such automatically generated narrative text could then accompany the visualization and alleviate people from both the time requirements and mental burdens of closely analyzing data visualizations and manually writing narrative text about such visualizations.

Toward this end, the inventors note that the assignee of the subject patent application has previously developed and commercialized pioneering technology that automatically generates narrative stories from data, of which a commercial embodiment is the QUILL™ narrative generation platform from Narrative Science Inc. of Chicago, IL. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, and 9,396,168 and U.S. patent application Ser. No. 14/211,444 (entitled "Method and System for Configuring Automatic Generation of Narratives from Data", filed Mar. 14, 2014), Ser. No. 14/521,264 (entitled "Automatic Generation of Narratives from Data Using Communication Goals and Narrative Analytics, filed Oct. 22, 2014), Ser. No. 14/570,834 (entitled "Automatic Generation of Narratives from Data Using Communication Goals and Narrative Analytics, filed Dec. 15, 2014), Ser. No. 14/570,858 (entitled "Automatic Generation of Narratives from Data Using Communication Goals and Narrative Analytics, filed Dec. 15, 2014), Ser. No. 14/626,966 (entitled "Automatic Generation of Narratives from Data Using Communication Goals and Narrative Analytics, filed Feb. 20, 2015), and Ser. No. 14/626,980 (entitled "Automatic Generation of Narratives from Data Using Communication Goals and Narrative Analytics, filed Feb. 20, 2015), the entire disclosures of each of which is incorporated herein by reference.

Thus, according to one aspect of providing a technical solution to the above-described need in the art, the inventors disclose that a narrative generation platform such as the technology described in the above-referenced and incorporated patents and patent applications can be integrated with a visualization platform via an application programming interface (API). Through this API, the visualization platform can pass visualization data to the narrative generation platform. The narrative generation platform can then apply its artificial intelligence-driven natural language generation (NLG) software technology to this visualization data to automatically generate narrative text about the visualization data. Furthermore, the narrative generation platform can then pass the narrative text back to the visualization platform through the API in a format that permits the visualization platform to include the narrative text for display along with the visualization itself. The inventors also note that the visualization platform can be designed to include its own artificial intelligence-driven natural language generation (NLG) software technology for automatically generating narrative text about the visualization data, in which case the need for an API through which visualization data is passed to an external narrative generation platform can be obviated. Likewise, a narrative generation platform can be designed to include visualization software for generating visualizations from data sets, in which case the need for an API through which separate visualization and narrative generation platforms communicate can be obviated.

As a further technical solution to the above-described need in the art, the inventors also disclose that new data structures and artificial intelligence (AI) logic can be used by the narrative generation software to map different types of visualizations to different types of story configurations that will drive how narrative text is generated by the narrative generation software. The inventors have recognized that different types of visualizations typically communicate different stories to users, as explained below. However, the inventors were not aware of any existing technology able to interpret visualization data to determine an appropriate manner by which to explain that visualization data, much less translate such an interpretation so that it could be used by narrative generation software for generating narrative text that explains the visualization data in accordance with the determined manner. To solve this problem, in an example embodiment, the inventors devised a data structure that associates visualization data with a story configuration for use by a narrative generation system. The narrative generation system can then use this data structure to map a given instance of visualization data to the appropriate story configuration for use by the narrative generation system to generate narrative text that explains the subject visualization in a desired manner. In other example embodiments, visualization data can be mapped to any of a number of specific special-purpose narrative generation systems as discussed below. A data structure is a physical manifestation of information organized within a computing system. Examples of data structures may include data files, records, tables, arrays, trees, objects, and the like. Thus, by way of example, the inventive data structure may take the form of a table that maps a visualization type determined from a set of visualization data to a story configuration. By way of another example, the inventive data structure may take the form of a set of rules that map a set of visualization data to a story configuration. The narrative generation system can then store different story configurations that are associated by the data structure with different types of visualizations, and the narrative generation system can refer to this data structure for a given visualization to decide how to best explain that visualization via narrative text.

Further still, the inventors also disclose another inventive data structure for use within the narrative generation system that maps data and metadata from a visualization to specific parameters of an associated story configuration so that the narrative generation system is able to select which components of the visualization data are applied to specific components of the narrative analytics associated with the determined story configuration.

These and other features and advantages of the present invention will be described hereinafter to those having ordinary skill in the art.

BRIEF DESCRIPTION OF THE DRAWINGS

FIG. 2B depicts an example visualization parameter data structure.

FIG. 3 depicts an example process flow for automatically generating narratives from visualization data.

FIGS. 6A-C depict the example visualizations of FIGS. 1A, 1B, and 2C, respectively, paired with narrative text automatically generated using the process flow of FIG. 3.

FIG. 7B depicts an example data structure that embodies narrative text about the visualization of FIG. 7A generated using the process flow of FIG. 3.

FIG. 7C depicts the visualization of FIG. 7A augmented with a display of the narrative text shown by FIG. 7B.

FIG. 8A depicts an example visualization of revenue by month that is augmented with a display of narrative text automatically generated using the process flow of FIG. 3.

FIGS. 8B-L depict example graphical user interface (GUI) screens that show how a user can compose a story configuration using the data architecture of FIG. 4 for use with the example embodiments of FIGS. 2A and 3.

FIGS. 9B and 9C depict an example data structure for the visualization data that underlies the visualization of FIG. 9A.

FIG. 9D depicts a transformed version of the data structure of FIGS. 9B-C for use by a narrative generation platform.

FIGS. 9E-H depict an example data structure generated by the narrative analytics of a narrative generation platform from the data structure of FIG. 9D.

FIG. 9I depicts a story outline defined by a story configuration used to generate narrative text about the visualization of FIG. 9A.

FIGS. 9J and 9K show portions of an example GUI used to construct, inspect, and modify the story configuration corresponding to the outline of FIG. 9I.

FIG. 9L shows an example XML representation of a narrative text produced for the story configuration corresponding to the outline of FIG. 9I.

FIG. 9M depicts an example HTML representation that embodies the produced for the story configuration corresponding to the outline of FIG. 9I.

FIG. 9N depicts an example of how the data structure of FIG. 9M can be rendered for display on a computer.

DETAILED DESCRIPTION OF EXAMPLE EMBODIMENTS

Figure 2A:
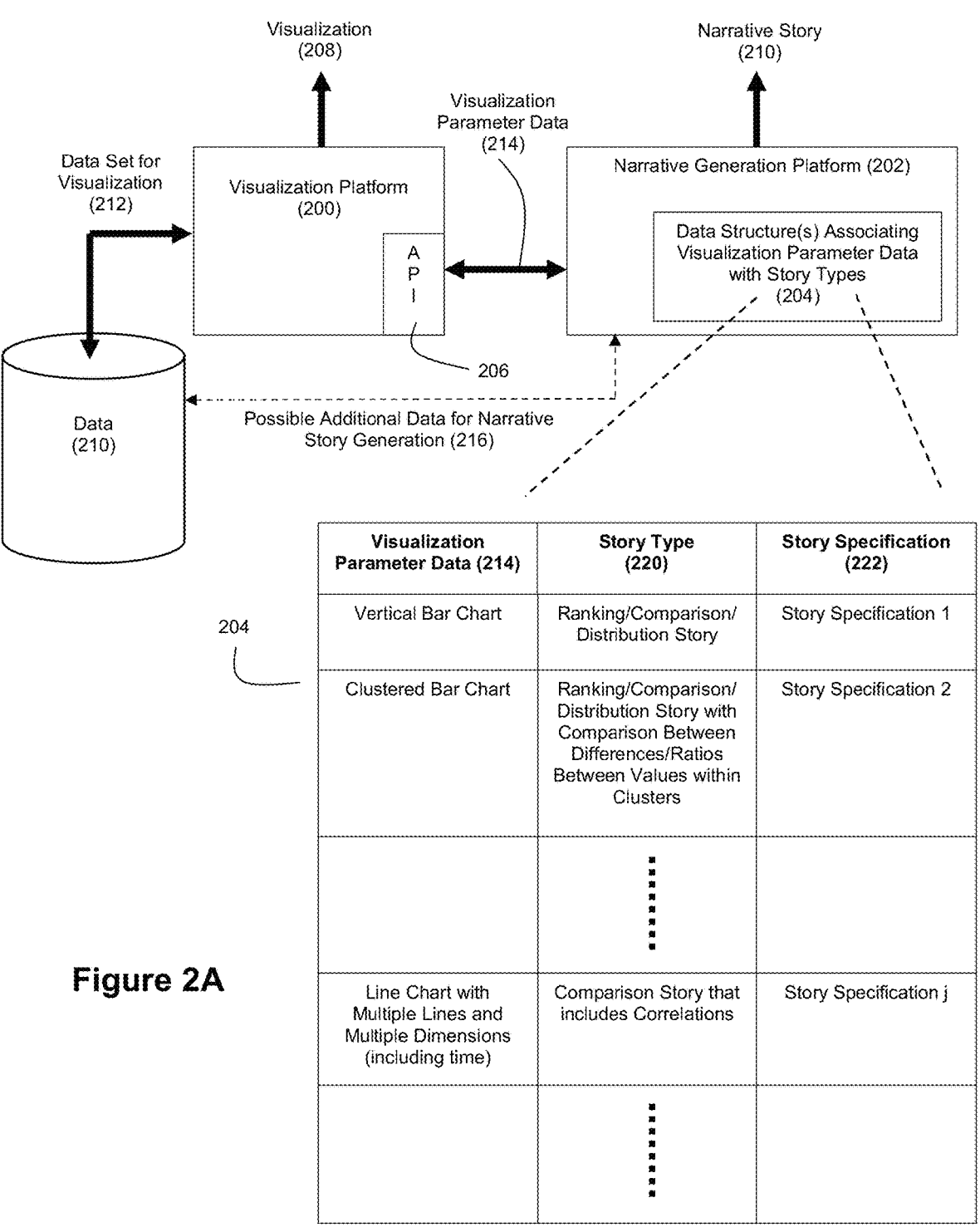
FIG. 2A depicts an example system showing how a visualization platform can integrated with a narrative generation platform to automatically generate narratives about visualization data.

FIG. 2A depicts an example embodiment of a system that includes a visualization platform 200 integrated with a narrative generation platform 202 in order to support an automated generation of narrative texts about visualization data relating to a visualization generated by the visualization platform 200. An API 206 can be used to integrate the visualization platform 200 with the narrative generation platform 202, although as mentioned above, it should be understood that (1) the visualization platform 200 itself could include narrative analytics and narrative generation software that enable to the visualization platform to itself generate narratives as described herein, and/or (2) the narrative generation platform 202 itself could include visualization software to enable the narrative generation platform to generate visualizations such that the need for the API is obviated. Also, in the example embodiment of FIG. 2A, the visualization platform 200 and narrative generation platform 202 can communicate with each other over a network via the API 206, although it should be understood that these platforms could be integrated on the same computer such that communication over a network is not needed.

Examples of a visualization platform 200 suitable for use with the system of FIG. 2A include the Qlik visualization platform and the Tableau visualization platform. Examples of a narrative generation platform 202 suitable for use with the system of FIG. 2A include the narrative generation platforms described in the above-referenced and incorporated patents and patent applications, of which the QUILL™ narrative generation platform from Narrative Science Inc. of Chicago, IL is an example commercial embodiment.

The visualization platform 200 may include links to the narrative generation platform 202 as an extension or plug-in to the visualization platform software, and through these plug-in links the narrative generation operations described herein can be invoked.

The visualization platform 200 generates a visualization 208 from a visualization data set 212 using widely known techniques. Typically, a user instructs the visualization platform 200 to access a data source 200 so that a data set 212 can be processed to create a user-defined chart that displays the data set 212 in a meaningful way. Examples of chart types supported by a visualization platform 200 may include line charts, bar charts (vertical, horizontal, clustered, stacked, etc.), pie charts, scatterplots, etc. The data set 212 typically includes various data elements and corresponding data values that are to be plotted in some fashion via a chart produced by the visualization platform 200. It should be understood that the data set 212 may be some subset of the total data stored in data source 210. For example, data source 210 may include sales data for a company across the entire United States. However, the data set 212 used for a given visualization might just include the sales data for the company with respect to a particular state or set of states (e.g., the Midwest). Similarly, the sales data in data source 210 may be total sales data aggregated from all of the company's product lines, while the data set 212 used for visualization might be only sales data for a single product line. Accordingly, it should be understood that the data source 210 may include data in addition to the data set 212 used for a visualization.

When creating a visualization from a data set 212, the visualization platform 200 operates to augment the data set 212 with additional data and metadata that describe the nature of the resulting visualization. This results in the creation of visualization parameter data 214. FIG. 2B shows an example visualization parameter data structure 214. This example relates to the visualization of FIG. 1B. The visualization parameter data structure 214 includes not only specific data values for the data elements presented on the line chart of FIG. 1B but also metadata about those data values and/or the visualization itself. For example, the data and metadata may include an identification of a chart type (e.g., a line chart), a name for the measure being plotted (e.g., total car production), a data array of values for the measure, names for the chart dimensions (e.g., years), among other forms of data and metadata. It should be understood that this data and metadata can be organized in the data structure 214 in any of a number of formats. FIG. 2B is merely an example for the purposes of illustration. The visualization parameter data structure 214 can be communicated to the narrative generation platform 202 via API 206.

The narrative generation platform 202 can then leverage one or more data structures 204 that map visualization parameter data to a story configuration used by the narrative generation platform. While the narrative generation platform 202 in the example embodiments discussed in greater detail herein is a highly flexible platform capable of generating multiple types of narrative stories using a common platform that operates on parameterized story configurations (examples of which are described in several of the above-referenced and incorporated patents and patent applications), it should be understood that the narrative generation platform 202 need not necessarily employ such a modular and flexible approach to narrative generation. For example, the narrative generation platform may include a number of separate software programs that are coded to generate specific types of stories, and a processor can use the data structure(s) 204 to decide which of these specific software programs will be used to generate a story with respect to a given visualization parameter data structure 214. In such an embodiment, multiple APIs 206 may be employed by the visualization platform 200 where a plug-in will invoke a different API depending on which specific narrative generation software application should be used As another example, a narrative generation system can employ a large set of different narrative analytics operations, each tied to rules that govern when those narrative analytics and other operations necessary to generate a narrative, each tied to rules that govern when those operations are to be used with respect to which story types. Thus, whenever anywhere in the course of the system's operations a choice depends on "story type"—e.g., whether or not to use this particular analytic, whether or not to use this particular characterization of its result, this language, etc.—rather than making these choices up front or "en masse" as it were, as in the first two approaches, at every such choice inside the system, the developer adds as an additional conjunct that one (or more) story type(s) has/have been indicated. That being said, the inventors believe that the use of a highly modular and parameterized narrative generation platform as described herein in combination with visualization parameter data will be particularly flexible and extensible as a solution to generating narrative text that explains a visualization in greater detail.

FIG. 2A shows an example of a data structure 204 that may be used to associate visualization parameter data 214 with story types 220. It should be understood that such a data structure can be retained in memory, and such memory may be part of the narrative generation platform 202. However, it should be understood that such memory may also be located elsewhere. The identified story types 220 can be associated with story configurations, which are parameterized data structures used by the narrative generation platform to generate the associated story type from the given visualization parameter data 214. Such a story configuration can take the form of the story specifications 222 described in several of the above-referenced and incorporated patents and patent applications. For example, the story configuration for each story type 220 can comprise an outline of one or more content block data structures, and one or more of the content block data structures may comprise one or more angle data structures or other components as discussed in the above-referenced and incorporated patent applications. It should be understood that the story specifications 222 in turn will have their own parameterized data requirements, and these data requirements can be fed by visualization parameter data 214 obtained from the visualization platform 200 to thereby configure the story specifications 222 for use by the narrative generation platform 202 to automatically generate a narrative story 210 to accompany a visualization 208. Furthermore, the narrative generation platform 200 may also optionally be configured to access the data source 210 for the visualization data set 212 to obtain additional data 216 that might be used by components of the identified story specification 222.

One of the first tasks for appropriately designing data structure 204 is determining what types of stories to tell for which types of visualizations. Different story types, whether represented explicitly in the narrative system or not, address different communication or narrative goals—e.g., answer different kinds of questions, make different kinds of points, and are organized differently. These different communication or narrative goals, in turn, will use and determine different types of data analytics, different types of narrative characterizations of (e.g., angles on) the data—including both the input data and any derived data or features resulting from the analytics—and, finally, different input data needs. The resulting facts, characterizations, and interpretations are then organized for presentation differently, again as specifically appropriate to the story type. A story type, in sum, specifies or comprises a set of data needs, analytics, relevant (user) information needs or points, characterization rules or angles, and organizational forms satisfying one or more communication goals—whether or not those goals are explicitly represented—that, taken together, comprise a configuration for, or adaptation of, a narrative generation system. This configuration or adaptation in turn enables the system to generate narratives of the appropriate type—i.e., answering the appropriate questions, making the relevant points, providing the appropriate information and characterizations, and organized appropriately in order to meet the user's needs.

Thus the first challenge in configuring or adapting any narrative generation platform 202, such as QUILL, when linked to or integrated with a visualization platform 200, in order to produce appropriate and relevant narratives to accompany a given visualization (or class of visualizations) generated by that visualization platform, is this: determining what type of story the system should tell to accompany that specific visualization or class of visualizations. As discussed above, this story type comprises or specifies a configuration of specific computational mechanisms and data and information types that determine what questions the story will answer, what points and interpretations of the data it may offer, and how it will be organized. The result should be a story that makes sense to the user in conjunction with the visualization, and helps the user to understand better the most important conclusions to be drawn from the data underlying that visualization.

Any technical solution to this core challenge should address a number of subsidiary and more specific technical issues: First, what kinds of narratives (story types) are appropriate for given visualizations or classes of visualizations? Second, how are these to be represented and how utilized within a computer system so that the narratives can be generated? And third, how can the system determine the appropriate story type to apply?

The above-referenced and incorporated patents and patent applications address much of the second issue. For example, in one approach, a specific story type is expressed as a special-purpose narrative generation system aimed at producing stories of that specific type. In a more flexible approach, a specific story type is expressed, using some specification language, as a configuration for a configurable narrative generation platform or engine, which can then produce narratives of the appropriate type as specified by that configuration. However, as discussed above, the challenge still remains regarding how to intelligently link such narrative generation to visualization data so that the narrative generation platform can be used to generate narratives that tell the desired stories. These issues are the focus of the first and third technical challenges referenced in the paragraph above (and further elaborated below).

Another technical issue to be addressed in configuring or adapting a narrative generation platform to operate properly in any given context is this: What data are to be used in generating a story or set of stories? In the context of integrating a narrative generation platform with a visualization platform, one overall approach that can be taken to address this issue is that the data used to drive the narrative generation process, at least at its core, can be the same data that are used to drive the visualization that the narrative is intended to accompany. This overall approach however still leaves a number of subsidiary technical questions to be addressed, specifically, from where, and how, the data to be used in generating the story will be drawn, as well as what additional data might be utilized (and, again, where and how these data are to be drawn).

Yet another technical question that needs to be addressed in this context is, how are the available data used to fulfill the data requirements of the appropriate story type? Toward this end, disclosed herein are data structures that specify how available visualization data and metadata are mapped to parameters of the appropriate story configuration or an appropriate special-purpose narrative generation system as well as corresponding processes that use such data structures.

The following description explains how these technical challenges can be solved with reference to an example embodiment.

A. Determining Appropriate Story Type

In developing solutions to the challenge of how to determine the appropriate story type, a constraint that a practitioner may want to impose is that, from a usability perspective, as far as possible we don't want to burden the user of a combined visualization and narrative generation system with much, or if possible, any additional work at all in configuring or adapting the narrative generation platform, beyond what is necessary to configure the visualization platform itself. That is, configuring a visualization (or class of visualizations) within a visualization platform—specifying the nature of the visualization, selecting the data to be visualized, specifying the types or units of those data, determining the scope (temporal, geographic, categorical, etc.) over which the visualization will range, providing labels for axes, data, or other elements of the visualization, etc.—should simultaneously serve, to the fullest extent possible, to determine the appropriate configuration or adaptation of the narrative generation engine in order to produce an appropriate narrative or narratives to accompany the specific visualization or class of visualizations.

Keeping this in mind, a mechanism needs to be developed that is able to determine the appropriate type of story to tell to accompany the visualization based on attributes of the visualization itself as specified by the user. More specifically, the nature of the visualization chosen, and/or of the data chosen to drive that visualization, as well as other parameters supplied by the user of the visualization platform in the course of configuring or utilizing it, should be used to specify the story type or types of appropriate narratives to accompany that visualization. This approach is based on the observation that, in choosing a particular visualization, and in parameterizing it in certain ways, the user aims to convey certain information that he or she believes the user needs to understand. Has the user specified a bar chart? A stacked bar chart? A pie chart? A line chart (i.e., graph) with a single line? One with multiple lines? Using certain kinds of data or metadata, e.g., certain labels? These and similar choices can be taken as indicators of the user's information needs, as understood by the creator of the visualization (which might be the user him- or herself). Our approach, therefore, is to develop a mechanism that is able to utilize such choices to determine appropriate story types to meet those corresponding needs.

At its core, the mechanism we propose to determine appropriate story types (and hence appropriate configurations or adaptations of the story generation system) utilizes a mapping from types of visualizations, and/or their parameterizations in terms of the data utilized and (perhaps) other specifications, to appropriate types of stories, and their parameterizations. In this way, the mechanism can utilize user specifications of the visualization system to determine, at least in part, the configuration or adaptation of the narrative generation engine to which it is linked that will produce stories appropriate to the visualizations produced by the visualization system.

That is, for an example embodiment that generates narratives to accompany visualizations within the setting of a visualization platform, an example embodiment of the technology disclosed herein uses the type of visualization chosen, and/or how it is specialized or parameterized, to determine the appropriate story type to accompany that visualization.

In another example embodiment, a system can ask the user directly to specify the type of story he or she wants. This approach is potentially more flexible, but, even assuming the user makes the right choices, will require additional user effort. Additionally, if the user makes the wrong choice, it may result in a confusing mismatch between the type of "story" the visualization attempts to tell, and the type of story that the accompanying narrative actually does tell.

In general, in what follows we will describe the less frictional approach in which the nature of the visualization is determined as much as possible directly from information provided by the visualization system itself. That is, the nature of the visualization, and of how it is specified and parameterized, is used to determine the story type. The user isn't, him- or herself, required to figure out what story type goes with what kind of visualization.

Developing a mapping as described above involves first developing a specific model, for each possible visualization type and/or its parameterizations and other related information, of what the appropriate story types to accompany visualizations are. Addressing this challenge requires enumerating visualization types and/or types of their parameterizations and other related information—e.g., the nature of the data and metadata used to parameterize the visualizations—and then specifying the mapping from those types to particular story types, including specifically the nature of the important points to be made and the analytics to be performed in order to make those points.

This approach can be described in terms of an example. The simplest case is probably a bar chart displaying, over multiple entities, one measurable attribute or dimension—for example, a simple bar chart indicating automobile production over a given interval of time in a number of different countries (see FIG. 1A).

What kind of story or stories should accompany this visualization? In general, a bar chart of this sort seems to invite stories that focus on the distribution, ranking, and comparison of the values displayed in the bar chart. More specifically, these stories can be of a type that:

1. Describes the distribution of values for the measured attribute or dimension (in this case, automobile production) in aggregate terms—e.g., range (i.e., [max, min]), mean, median, how smooth or "clumpy" the distribution of values is, and natural clusters of values (if any), etc.
2. Ranks the different entities (in this case, countries) according to this dimension.
3. Talks about and compares specific entities—e.g., where the leader stands with respect to the others—and/or describes specific clusters (e.g., the "broad middle," if it exists) and perhaps exemplary entities within these clusters.

For example, depending on the facts of the matter, the story might characterize the distribution as smooth, or it might describe one or two outliers as well as one or more groupings (clusters) of similar values. If the user or metadata specify particular entities of interest, either in the initial parameterization the visualization initially or through subsequent interaction, then how those particular entities compare with the set as a whole and with each other should also be specifically computed and discussed. FIG. 6A presents a representative example of narrative text 600 that describes the bar chart of FIG. 1A in accordance with this kind of story type. As explained below, the narrative generation platform 202 is configured to automatically generate this narrative text 600 from the visualization parameter data 214 for the bar chart of FIG. 1A.

More concisely and specifically, the choice of a simple bar chart by the user (or whoever has configured the visualization system), expressing a single attribute for multiple entities, with no further information or assumptions about those entities, implies that the story type should express the communication goals of "characterize distribution" and/or "assess component elements with respect to a set"; should use such analytics as "rank", "compare", "mean", "median", "max", "min", "cluster", etc., in order to fulfill these communication goals; should characterize the results both in aggregate terms (e.g., a tight distribution, one or a few major players plus many smaller entities, smooth and evenly distributed, clustered, etc.), and by picking out and describing interesting exemplars (the leader and/or other outliers) with respect to the entire set; etc.

The above-mentioned elements (communication goals, analytics, types of characterizations, etc.) comprise or determine the appropriate configuration (or, in the case of single-purpose systems, adaptation) of the narrative generation process in order to appropriately generate narratives suitable to accompanying a visualization of this type.

In determining the appropriate narrative type, or in generating a narrative, the system may need to understand certain facts about the types of or relations among the entities, dimension, metrics, units, etc., that are parameters to the visualization (and so of the narrative generation process as well). This additional information might be provided by the visualization platform itself, or by the user, or the system may determine this information itself or even simply make certain assumptions about it. For example, if the system has no other information about the entities on the x-axis other than their names, their appearance on the x-axis of a bar chart such as this implies that they are distinct but similar entities without any further relationships, e.g., members of a peer set. (This can be important in order to select appropriate analytics, characterizations, and language for use in constructing the narrative.) However, these assumptions might occasionally be wrong (particularly if a user has chosen an inappropriate visualization model for the data and task at hand), in which case the story, while expressing true characterizations, might seem a bit off the mark.

Let's now look at a variation on this: a simple bar chart in which the "entities" are time intervals, e.g., years, or quarters. The time intervals will typically be ordered sequentially (e.g., it would be a bit weird to have 1997, then 2003, then 2001, etc.—but see below regarding vertical bar charts/histograms). For example, we might be looking at yearly automobile production in a single country over a decade. In such instances we will want to carry out most of the same analyses described above—ranking, finding the mean and media, characterizing the distribution in terms of smoothness, clustering, etc. But, in addition, we will also want to analyze and characterize the data temporally—i.e., in terms of peaks and low points; trends (first and second derivatives, as well as periods or streaks/runs of increasing, flat, and decreasing values); smoothness or noisiness; etc. In other words, it is appropriate to generate in this context a richer story that takes into account and leverages not only the fact that the visualization type is a bar chart, but also the fact that the independent variable (i.e., the entities or values on the x-axis) is temporal in nature (in fact, that a line chart might also have been appropriate, even though it wasn't used). In order to accomplish this, the system needs to recognize that the independent variable is continuous, even though the chart type isn't, and more specifically, that it specifies a time sequence. To support this, in turn, the system can be configured to determine that the labels on the x-axis on the bar chart refers to time periods, e.g., years, quarters, minutes, etc., or employ a method of interacting with the user to make such a determination. (This process is described in more detail in the next section.)

Note that the additional types of analysis and description relevant in this case (peaks, trends, etc.) also applies to any continuous variable used along the x-axis, whether explicitly labeled as such or not. The variable could be for example, contiguous geographic regions or locations along some line (e.g., distance from a central point); or really anything that could sensibly be used to label the x-axis of a line chart or graph (see below). However, again, a bar chart emphasizes "distribution" and "comparison" as the salient points of the visualization more than a line chart would, and this can be taken into account in the configuration or adaptation of the narrative generation process to generate an appropriate narrative to accompany such a visualization, even when the data (and metadata) themselves support additional analytics and characterizations.

B. Determining the Data and Useful Metadata

Before turning to other types of visualizations (and associated parameterizations and information) and how they can be mapped to a story type that would appropriately complement them, let's turn to the second question of where the data used to generate the story will come from. In example embodiments, we propose two approaches. Under a first approach, it comes directly from the visualization platform itself, or from some other source (most likely, from the data source 210 that supplied the visualization system with the data in the first place). That is, in one approach, a narrative accompanying a visualization to be generated can be based on the data that parameterize that visualization—i.e., on the specific input data for that visualization, as supplied by the visualization system itself, or by the same system or systems that parameterize(s) the visualization system (whether automatically or based on user choice). It might also be possible, as mentioned, to base the narrative on the data that are used to supply the specific input data for the visualization (e.g., data set 212 or other data within data source 210 rather than visualization parameter data 214), which would typically be a much larger data set including other elements, or even from some other source entirely. (There might in some cases be advantages to doing that, e.g., if the additional data could be used to tell a richer story or to discern additional important distinctions.) Whatever the source, however, the data that drive the visualization (i.e., that are the inputs to the visualization) comprise the specific data of most interest to the user—this is why they were chosen to drive the visualization in the first place.

However, using these data as so specified, particularly if provided directly by the visualization platform itself (or by some other system that has already narrowed the set of data to be used by the visualization), may in general result in a narrative generation platform knowing less about the data than it might know if it were configured to draw data directly from more primary sources. That is, under a second approach, in drawing data directly from (relatively speaking) primary data sources, a narrative generation platform will typically be configured with, or be able itself to determine, metadata about those data, including the nature of the entities and/or circumstances being described, the natures of the attributes, features, and dimensions used to describe those entities or circumstances, units in which those, etc., much more than may be possible when drawing the data directly from a visualization platform. This might, in some cases and to some extent, limit how a story type might be chosen and/or tailored to accompany the particular visualization when drawing data directly from the visualization system. However, it's important to note as well that this isn't necessarily the case; in some cases, some or all of the relevant metadata may be preserved and even utilized by the visualization platform itself; or the narrative generation platform may recover these metadata by accessing the original data source directly, or by asking a user to supply certain information (via, e.g., a structured dialog), or by using some method to itself determine the metadata.

Thus, for example, consider the case of a bar (or for that matter a line) chart in which the values used as labels on the x-axis denote time intervals or increments, which is important for the reasons described above—it changes the nature of the story we might tell and the analytics we might apply. If we draw the data directly from the primary source, or if the visualization platform preserves the relevant metadata, the system might determine this through metadata about these values/labels (or the entries or names from which they are drawn) available from the visualization platform or some other data source. That is, the values/labels or the axis itself may be explicitly indicated as drawn from a known data type denoting a temporal measure. If not, then the system will have to "recover" this metadata. This can be accomplished either by asking the user directly through, e.g., a structured user interface dialog, or via a set (as complete as possible)

of special purpose recognizers for x-axis values/labels, or for labels on the axis itself as a whole. Thus, for example, if the values/labels on the x-axis are numbers or strings such as, e.g., "2015," "3Q97", "12 pm", etc., or the label on the axis as a whole is a string such as, e.g., "seconds", "time", etc., then it is possible to construct special-purpose recognizers that will enable our system to determine for itself that these values/labels denote time or time intervals, even if this is not explicitly indicated in any meta-data associated with values or labels.

The point of making such a determination, again, is that it enables the system to generate a richer and potentially more relevant narrative, utilizing analytics appropriate to temporal data, employing or embodying characterizations relevant to such data, and structured to convey the results naturally and appropriately. In sum, as described in the previous section, it enables the system to determine that a narrative type suited to temporal data is appropriate, and to utilize a configuration or adaptation that is aimed at generating such a narrative.

Similarly, it might be useful for the narrative generation system to produce stories that include an evaluative component where relevant. The system can be configured (or a specific adaptation can be selected) to do so. But first it must be able to determine that the dimension being used actually constitutes a measure of performance, such that increasing or decreasing values along that dimension (or away from some optimal point) constitute "better" or "worse" performance. This would enable the resulting stories to describe changes in the metric as "improvements", for example, rather than simply "increases". This kind of "semantic enrichment" can again be specified directly by the user (via a structured dialog or by some other means), or it can be something that the system infers from the nature of the data. For example, if the dimension or measure being specified is money, or its unit is a currency, then in general "up is good" and "more is better." (This isn't always the case, of course. If the nature of the visualization inherently "switches the sign" of the number—for example, if the graph measures losses or deficits or unit costs—then this wouldn't hold.) By the same token, if the dimension or measure is listed as "revenue" or "profit", it's even more likely that "up" is "good". Thus, in many cases it again seems possible by these means that the system can infer the appropriate normative evaluation reasonably well from metadata associated with the visualization. In other cases, however, the system will need to ask the user directly about this property of the dimension or measure from which the data are drawn—i.e., to provide, via some interface, a means for the user to instruct the system that, along the dimension in question, "up is good." To reiterate, the point of this determination is that it enables the system to select an appropriate narrative type that includes and appropriately organizes evaluative analytics and characterizations, and to therefore utilize a configuration or adaptation suitable for generating such a narrative.

C. Additional Mappings Between Visualization Types and Narratives

We now turn to describing a number of other visualization types and the mapping to the appropriate narratives to accompany them.

C.1: Vertical Bar Charts/Histograms:

These are bar charts ordered in value from highest to lowest, often with the chart oriented vertically (i.e., the bars running horizontally from a base on the left where the entities or independent variable are specified). In an example embodiment, stories aimed at accompanying these chart types will focus on ranking, comparison, and the distribution of values, including descriptions of outliers, most often at the high end. Accordingly, data structure 204 can be configured to map these types of visualizations to a story configuration or adaptation that will generate such stories.

C.2: Clustered Bar Charts:

These combine multiple methods for specifying the entities on the x-axis (independent variable), for example, auto production by years within countries; vehicle production by type within countries; by countries within regions; etc. An alternative of course is to utilize multiple charts, e.g., produce several bar charts of auto production by country, each describing different (typically successive) years—or the other way around (several charts describing auto production by year, each describing different countries). The multiple descriptions may involve hierarchical components (e.g., vehicle production by type within countries) or not (e.g., by years within countries). (If the former, a stacked bar chart may be a more specific applicable visualization; see below.) Clustered bar charts call for the same story types as regular bar charts (primarily focusing on distributions, rankings, and comparisons), across however both dimensions. More specifically, in addition to actual values, stories based on such charts should focus on distributions, rankings, and comparisons among the differences or ratios between values within clusters. For example, a story accompanying a clustered bar chart of vehicle production by type within different countries can be expected to discuss the different proportions of vehicle types produced within different countries—e.g., is the proportion of cars vs. trucks produced in the US the same or very different from what is the case in China? A story accompanying a clustered bar chart of vehicle production over some interval of years within different countries can be expected to discuss the differences in changes in production over time (both absolute and percentage-wise) among those countries—e.g., the growth rate in vehicle production in US vs. China. Thus, data structure 204 can be configured to map these types of visualizations to a story configuration or adaptation of the narrative generation platform that additionally comprises an analytic to compute these relevant differences, and then apply the distribution, ranking, and comparison analytics and relevant characterizations of the results to these differences as well as to the raw numbers; and to organize these additional results in a sensible manner for presentation in the resulting narrative.

C.3: Stacked Bar Charts:

These are very similar to clustered bar charts, but imply that the entities so represented are hierarchical components of a larger unit or category, e.g., vehicle types (cars, trucks) within the category of vehicles, etc. (These stacked bars would then be placed along each entity or value on the x-axis, such a country. The result is a chart of vehicle production by category for each country.) This makes the value of such components as a percentage of the total a salient feature to compute, and the distribution, ranking, and comparison of such percentages across the entities on the x-axis, salient. Thus for example an appropriate story for such a chart might compare truck production as a percentage of total vehicle production among the US, China, etc. The appropriate story type for this visualization type should therefore specify a configuration or adaptation of the narrative generation engine that includes this analytic (i.e., computes these percentages and their differences), appropriate ways of characterizing the results, and of organizing and presenting those results and characterizations in a narrative.

C.4: Line Charts/Graphs (Single):

Line charts imply that the x-axis dimension (or independent variable) denotes not individual entities, but continuous values, e.g., most commonly of time. This means that it is possible to interpolate values and select arbitrary intervals. As with bar charts over time, above, the appropriate story types should characterize the data in terms of peaks and low points; trends (first and second derivatives, including periods or streaks/runs of increasing, flat, and decreasing values); smoothness or noisiness; etc. If desired, they might also specify that the data should be clustered into intervals of similar behavior, and describe those. Such a story type should, again, select a configuration or adaptation comprising appropriate data analytics, characterization rules, and means for organizing and presenting the results appropriately in a narrative. FIG. 6B presents a representative example of narrative text 600 that describes the line chart of FIG. 1B in accordance with this kind of story type.

C.5: Line Charts/Graphs (Multiple Lines, Single Dimension):

These should typically invoke a story type similar to that of line charts, but in addition involve multiple entities, and hence it may be desirable for those story types to also include analytics and characterizations for determining and describing distribution, ranking, and comparison aspects over the basic attributes relevant to single line chart stories as above. The entities might be components and an aggregate (e.g., US auto production over time vs. world auto production) or siblings/peers (e.g., US auto production vs. China), or both. These call for somewhat different characterizations. The latter in particular call for both temporal stories as above, and comparison stories. Comparisons can be with respect both to absolute values and to changes (i.e., one or the other has risen or fallen, proportionately, more quickly over some interval of interest). Again the appropriate story type will select or denote a configuration or adaptation of the narrative generation process comprising the appropriate components to produce such a story. FIG. 6C shows an example of a multiple line chart or graph (single dimension) with accompanying narrative text 600 that describes the multiple line chart in accordance with this kind of story type.

C.6: Line Charts/Graphs (Multiple Lines, Multiple Dimensions):

This is a chart that shows multiple lines, typically over time, each line indicating a different value and often measured by a different scale, or even unit. For example, it might show US auto production over time along with profits of US auto companies. Typically in these instances an appropriate story will, in addition to including characterizations appropriate to single line charts, also indicate and characterize correlations: Do the values indicated by the lines tend to go up and down together? Does one lag the other? Are they inversely correlated? Not correlated at all? Etc.

It should be noted that in this as well as the prior cases discussed, the system may determine the appropriate story type based on the visualization type, where the visualization type can be any characterization of a visualization, whether based on the nature of the visualization itself, based on the nature of the data used to parameterize the visualization, and/or based on other metadata associated with the visualization.

C.7: Some Detailed Examples

We now discuss three examples—generating narratives to accompany a line chart with two lines; a clustered bar chart; and a scatterplot—in somewhat more detail.

Figure 2C:
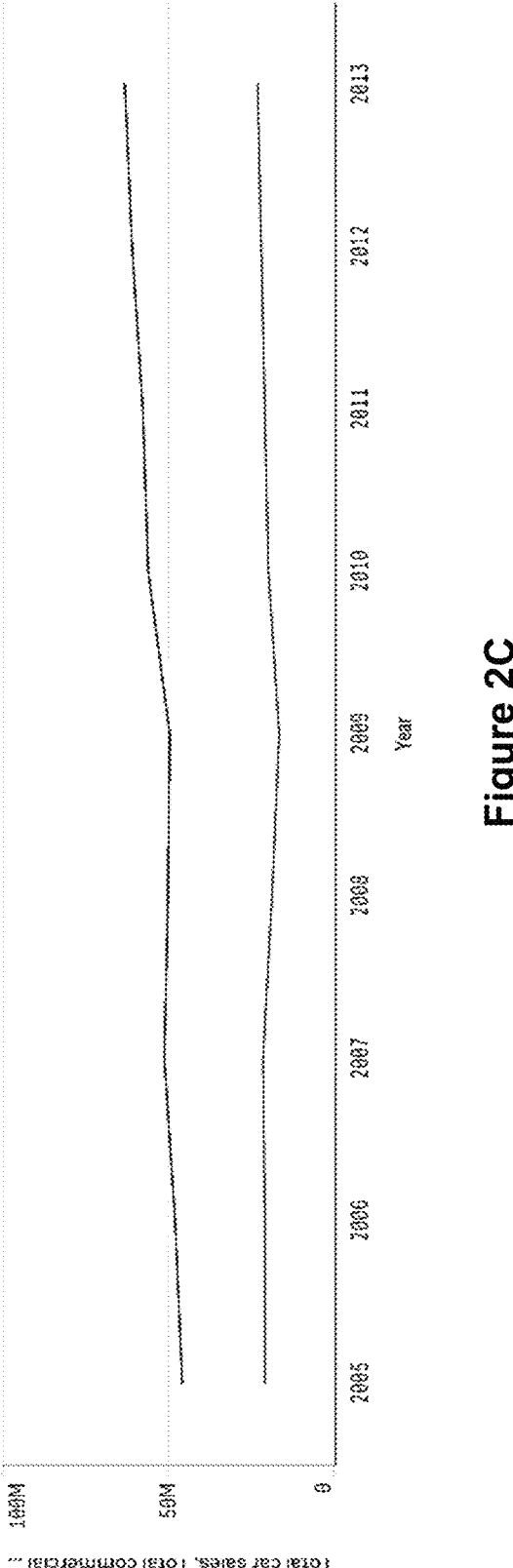
FIGS. 2C-F depict further examples of different visualizations generated from different sets of visualization data.
Figures 2D, 2E:
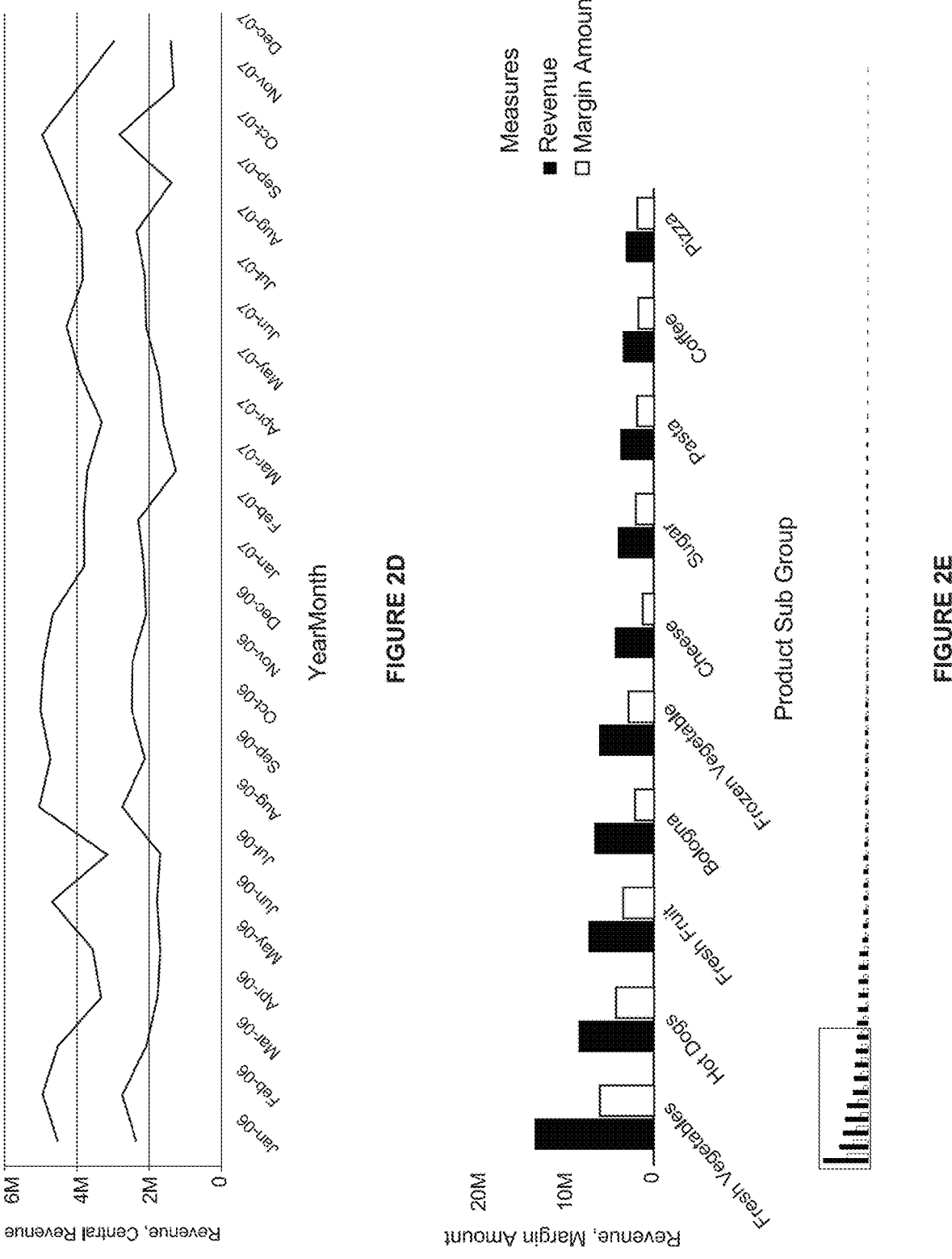

FIG. 2D depicts a line chart with two measures (or series). The story told in conjunction with this visualization can be classified as a "time series analysis" story. Because our system recognizes that a user who parameterizes a visualization system to present such a chart is interested in an analysis over a continuous dimension, it selects a story type that generates a narrative based upon analytics such as:

1. The overall linear trend of each series.
2. Interesting segments of each series, examples including:
    Spans of the series with periods of consecutive movement in one direction.
    "U- or V-shaped" spans of the series, where the line dropped for a time and returned to the original level (or the reverse).
    Spans of the series where the line jumped up (or down) a to a significant degree and then remained at its new level.
    Spans of the series with an interesting overall trend in one direction.
3. Interesting points of the series, such as largest point-over-point increase or decrease.
4. The overall volatility of the series.

In addition to analyses such as these, applicable to each individual series, the fact that the chart has been parameterized to include more than one series indicates that the narrative should also include discussion about how the series relate to each another. Examples of analytics and characterizations relevant to this aspect of the narrative include:

1. If there are two lines, the narrative will talk about the level of correlation between them.
2. If there are two lines, the narrative will discuss the amount of intersection.
3. When there are more than two lines, the narrative may discuss the pair (or other subset) of lines with the highest correlation.
4. When there are more than two lines, the narrative may discuss the pair (or other subset) of lines with the most intersections.
5. When there are multiple lines, the narrative may discuss the most (and least) volatile.
6. When there are multiple lines, the narrative may discuss the ones with the largest start-to-finish increase or decrease.

The narrative generation platform can also be configured in part via inferences based on the nature of the parameterizations (inputs) provided by the user in creating the visualization (or, these inferences may be drawn in real time as the narrative is generated) in order to generate an appropriate narrative. For example, if a user configures the visualization platform to plot a percentage value over a continuous dimension, the system recognizes that the values are percentages and will not talk about percent changes of these values (which would be percentages of percentages) as it ordinarily might, but rather for the sake of clarity, will talk about absolute changes in these percentages, and use terms like "percentage points" in the actual language it generates.

FIG. 2E depicts a bar chart utilizing two measures. The story generated in conjunction with this visualization can be described as an "entity composition" narrative. Since the user is plotting these metrics across a discrete dimension (entities within the category product subgroup), a desirable accompanying narrative would reflect analyses for each measure such as:

1. How concentrated is the distribution of the measure across the entities? Is it considered "top heavy," "bottom heavy," or "evenly distributed?"
2. Do the bars follow a normal distribution?

3. Are there interesting clusters of entities? When looking at the measures sorted by value, are there interesting groupings of entities with similar values?

In addition to potentially discussing these analyses about each individual series, the narrative makes comparisons between series when there are multiple measures being plotted. For example, the narrative will call out:

1. The measure with the most interesting groupings.
2. The measure that is the most top heavy, or bottom heavy.

The system again is also configured based on inferences (or to make such inferences) depending on parameters supplied by the user when configuring the visualization. For example, if a measure utilized in a chart reflects the average of some underlying metric along some dimension (e.g., over the members of some entity)—for example, "bars represent the average revenue for each product subgroup"—then the narrative will not talk about the total of the measure across that dimension, because it doesn't make much sense to talk about the "sum" of "averages." On the other hand, if the measure were total sales (within the product subgroup), then it would make sense to include a discussion of this within the narrative.

Figure 2F:
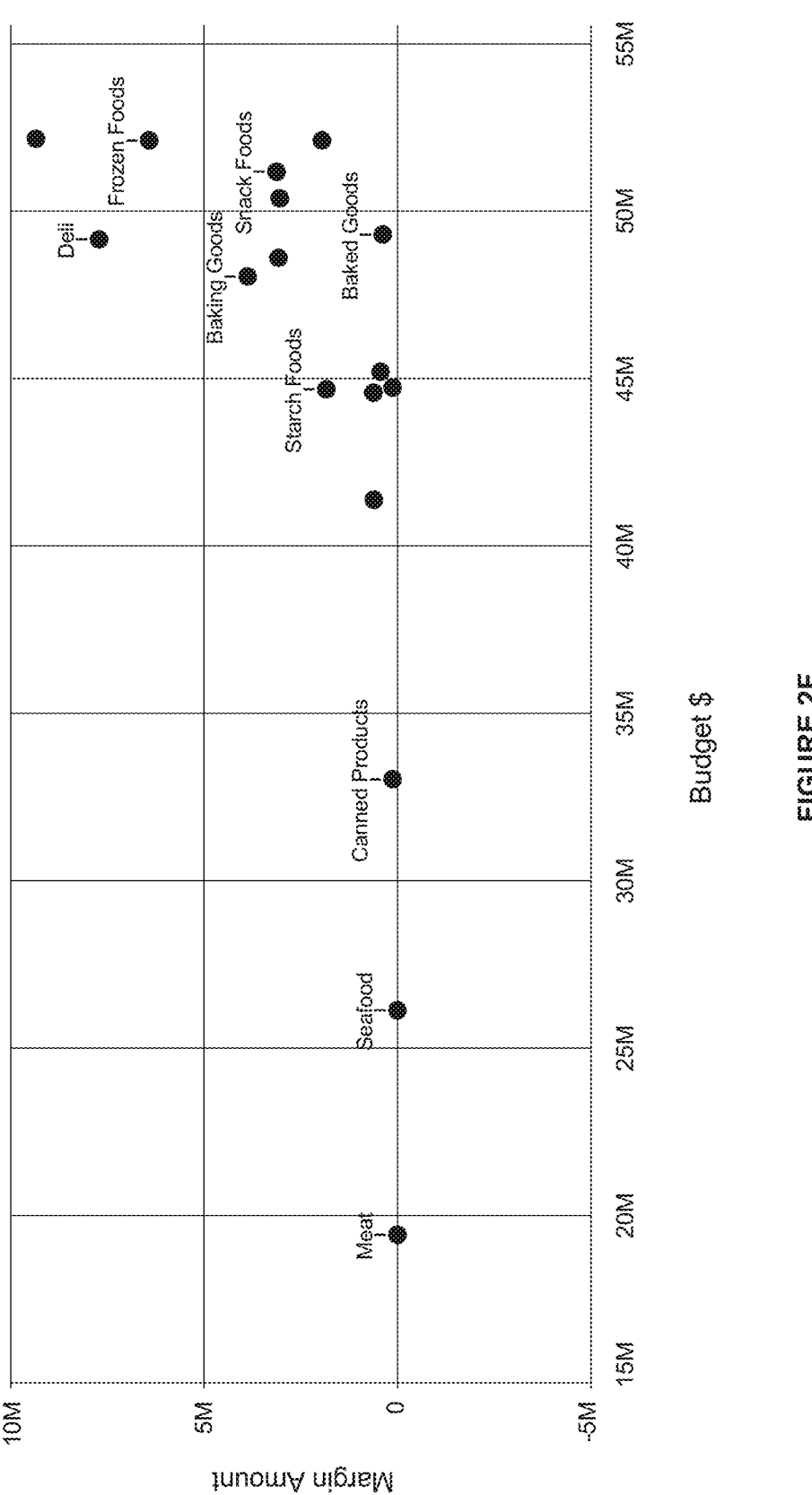

FIG. 2F depicts a scatterplot of one dimension (product) and two measures (margin and budget) on the axes. An appropriate narrative to generate in conjunction with this visualization has very different communication goals than those that might accompany a line or bar chart. The main purpose of this visualization is to support an analysis of the correlation between measures. The narrative generated by our system will therefore reflect analyses such as:

1. Are the measures positively or negatively correlated? If so, how much?
2. What are the outliers? If a line is being drawn through the plot, which dots are excessively far from that line of best fit?
3. Are there interesting clusters or groupings of entities? Can you draw several squares or rectangles around groups of dots?

We have also considered a number of other kinds of visualizations (e.g., spider charts) as well as line charts denoting some optimality frontier or trade-off.

D. Mapping and Narrative Generation—Configurable Narrative Generation Example

As exemplified above, it can be seen that practitioners can decide on what the communication goals of various different types of visualizations are and then use these communication goals to guide the narrative generation process. Toward this end, technology such as that described in the above-referenced and incorporated patent application Ser. Nos. 14/521,264, 14/570,834, 14/570,858, 14/626,966, and 14/626,980 (which, inter alia, describe how communication goals can be explicitly represented within a narrative generation system for use in specifying the narrative analytics used to generate narrative texts that satisfy such communication goals) can be leveraged to generate narratives about visualizations after the visualization has been mapped into one or more desired communication goals.

Thus, as described above, the additional technology in an example embodiment that we have developed in order to configure a narrative generation platform to produce narratives accompanying a visualization concerns, first, the decision to use the type of visualization or its parameterization, or both, as specified by or on behalf of a user, to determine as completely as possible the type of story to tell in order to accompany that visualization; and second, specific mappings between types of visualizations and their parameterizations on the one hand, and story types—more specifically, configurations of the narrative generation process corresponding to those story types (whether implicitly or explicitly) that specify or comprise the appropriate analytics and narrative characterizations (angles), plus the appropriate organization and presentation of the results of these processes—on the other. This removes the burden of choosing the appropriate story type from the user, with its concomitant additional friction and possibility of error. It's also worth noting that in many cases, for the same reason that it may be possible to determine the appropriate type of visualization from the nature of the data selected to parameterize that visualization, it will often be possible to map directly between types of data (entities or variables on the x-axis, and measures on the y-axis) and story types as well. For example if the x-axis is described by a continuous variable such as time, then the configurations described above for line graphs are potentially appropriate, regardless of whether the user has selected a line graph as the visualization type.

More specifically, what is being specified by the mapping from visualization type (and/or parameterizations of the visualization) to story type are: story configurations or outlines that delineate the appropriate story components (outline sections or content blocks) as outlined in the above-referenced and incorporated patents and patent applications, such components or content blocks in turn specifying the appropriate and relevant communication goals and narrative analytic models, including relevant analytics and appropriate narrative characterizations, for example in the form of appropriate angle families and angles, derivations, and blueprint sets, necessary to generate stories of the appropriate type. Once again, these elements are described in more detail in the above-referenced and incorporated patents and patent applications, but for convenience, salient aspects are these designs are discussed below in the context of generating narratives from visualizations.

Once the mapping is determined, the next step is to specify the values of the necessary parameters to the appropriate configuration. These include, specifically, the data themselves, but also the necessary metadata including dimensions and labels specified in the visualization as well as field names or other identifiers associated with the data. In our approach, the mapping between appropriate elements of the data and metadata, and the required parameters of the appropriate configuration, is specified along with the mapping from the visualization type (and parameterization) to the configuration itself. For example, if the visualization is a bar chart expressing some measurement or value for three entities, then the appropriate ranking and comparison story type (configuration) can be configured to generate a story about a set of three entities; and the names of those entities, as well as of the corresponding values, as well as the name of the dimension or attribute of which those values are measures or instances, and other appropriate metadata, are supplied as suitable arguments to the appropriate parameters of the configuration via a mapping between the data and metadata supplied by the visualization and the parameters of the appropriate configuration.

More concisely, the following steps describe an example embodiment for the overall process of generating stories to accompany visualizations as shown by FIG. 3.

At step 300, a processor employed by the narrative generation platform processes the visualization data (e.g., visualization parameter data 214; see FIG. 2B for example) to resolve the visualization to a visualization type that is mappable to a narrative story type. It should be understood that this resolved visualization type can be any characterization of a visualization, whether based on the nature of the visualization itself, based on the nature of the data used to parameterize the visualization, and/or based on other metadata associated with the visualization. The visualization parameter data 214 can be provided to the narrative generation platform in a format that allows the processor to parse this data and draw conclusions about the type of visualization being presented. For example, various tags or fields of the visualization parameter data can identify a chart type for the visualization, how many entities or subjects are included in the visualization, and/or whether any of the dimensions are temporal in nature, etc. (once again, see FIG. 2B as an example). For example, step 300 might determine that the visualization is a line chart (which could then be used by the system to reach a conclusion via step 302 that a story type is called for that analyzes and discusses streaks, peaks, troughs, volatility, etc.). As another example, step 300 might determine that the visualization includes a dependent variable (e.g., x-axis) data type that is a continuous metric (e.g., time) (which could then be used by the system to reach a conclusion via step 302 that a story type is called for that analyzes and discusses streaks, peaks, troughs, volatility, etc.). In other words, step 300 may arrive at its conclusion regarding a resolved visualization type via any of a number of aspects of the visualization parameter data. Step 300 may employ a series of rules or the like for evaluating the visualization parameter data 214 to determine its corresponding visualization type.

At step 302, the processor maps the resolved visualization type to a story type and associated story configuration using data structure 204 that associates visualization types to story types/story configurations. FIG. 2B shows an example of such a data structure 204.

Next, at step 304, the processor processes the mapped story configuration to determine the parameters needed for generating a narrative using the mapped story configuration. At this point, reference to an example story configuration architecture based on the above-referenced and incorporated patents and patent applications, including U.S. Pat. No. 8,630,844 and U.S. patent application Ser. Nos. 14/521,264, 14/570,834, 14/570,858, 14/626,966, and 14/626,980 as shown by FIG. 4 will be helpful.

Figure 4:
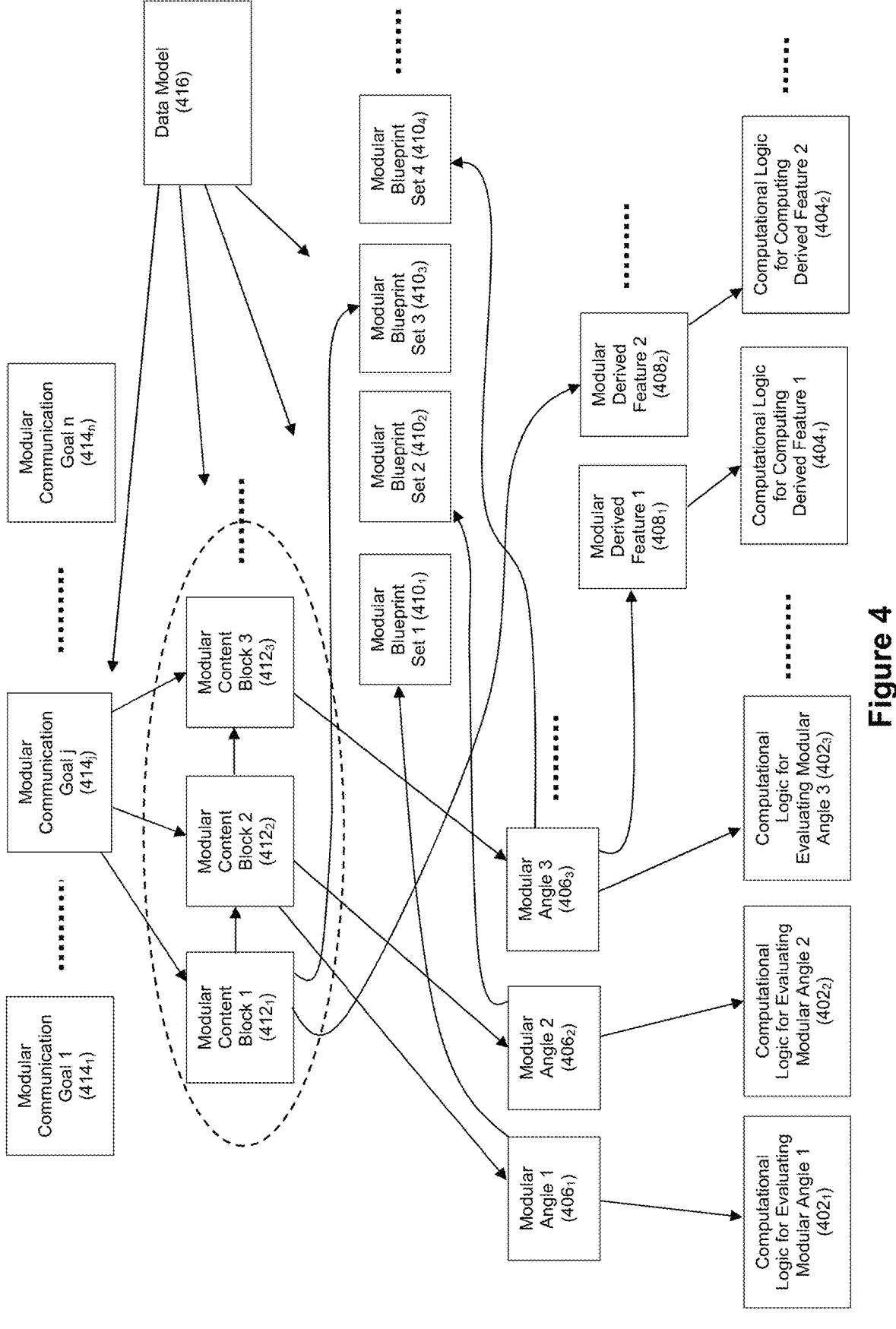
FIG. 4 depicts an example data architecture underlying an example narrative generation platform that supports configurable story specifications.

FIG. 4 depicts an example data architecture underlying an example narrative generation platform that supports configurable story specifications, which can be referred to for our purposes as story configurations.

The data architecture of FIG. 4 may include a number of modular communication goal data structures 414 (e.g., $414_1, \ldots, 414_j, \ldots, 414_n$). Each communication goal data structure 414 can correspond to a communication goal such as "describe", "rank", "compare", explain", "evaluate", etc., and it may specify one or more content block data structures 412 (e.g., $412_1, 412_2, 412_3, \ldots$) which in turn define how the content of different sections of a narrative will be generated. In the example of FIG. 4, it can be seen that the communication goal data structure $414_j$ specifies three content block data structures $412_1, 412_2,$ and $412_3$.

For the sake of elaboration, communication goal data structure $414_j$ can correspond to a "describe" communication goal, and its three specified content block data structures $412_1, 412_2,$ and $412_3$ can correspond to, respectively, (1) a section of the narrative that summarizes the narrative subject at a high level (e.g., identify what the total amount of sales for a subject company in a given time period was), (2) a section of the narrative that describes a quality of the narrative subject (e.g., identify whether company sales were rising or falling during the time period), and (3) a section of the narrative that describes an interesting aspect of the narrative subject (e.g., identify which month had the highest sales).

Each content block data structure 412 in turn can specify how its section of the narrative is to be generated as described in the above-referenced and incorporated patent applications. Moreover, each content block data structure can be generalized via one or more parameters such that it can be readily re-used for different stories and story types. Thus, content block data structure $412_1$ which specifies analytics for identifying a total sales amount for a company in a given time period can specify parameters regarding the data elements to be used for the sales data from which total sales are computed. This content block data structure can also specify a derived feature data structure $408_2$, where this derived feature data structure specifies how total sales are computed (see computational logic $404_2$). Further still, this content block data structure can specify a blueprint set data structure $410_3$, where this blueprint set data structure specifies how the total sales are to be expressed in natural language text. Thus, through the generalization afforded by the parameters used with these data structures and computational logic structures, these structures can be re-used in several contexts (e.g., not only to describe a company's sales but also to describe a baseball player's home run production, etc.).

For example, the derived feature corresponding to derived feature data structure $408_2$ can correspond to an "aggregated total" derived feature whose name can be defined via a parameter passed to it from a content block or other source and whose value is computed via its link to computational logic $404_2$. Computational logic $404_2$ can itself use parameters to compute an aggregated total according to an expression such as "y=sum (x1, x2, x3 . . . )" where the variables y and x1, x2, . . . are defined through a specification by the derived feature data structure $408_2$ (which in turn may inherit these specifications from the content block data structure, etc.).

Similarly, the blueprint set data structure $410_3$ specified by content block data structure $412_1$ can specify a tokenized blueprint such as "The <token 1> by <token 2> for <token 3> was <token 4>.", where token 1 is a parameter that corresponds to the name of the derived feature for derived feature data structure $408_2$ (or a variation thereof) (e.g. "total sales"), token 2 is a parameter that corresponds to the name of the subject company (e.g., "ACME Corp."), token 3 is a parameter that corresponds to the subject time period (e.g., Q1 2014-Q3 2016), and token 4 is a parameter that corresponds to the computed value of derived feature data structure $408_2$.

Thus, an author who composes the story configuration for the "describe" communication goal is able to define the first content block for the narrative text by composing a content block data structure $412_1$ that specifies derived feature data structure $408_2$ and blueprint set data structure $410_3$ while also specifying the data model that will be used for the parameters required by these specified components of the content block.

The content block data structures can also specify analytics that can be used to interpret or characterize the subject data. As discussed in the above-referenced and incorporated patent applications, a mechanism for accomplishing such characterization is an angle data structure 406. Each angle data structure can correspond to a characterization of data. For example, angle data structure $406_1$ can correspond to a characterization of "rising values over time" while angle data structure $406_2$ can correspond to a characterization of "falling values over time". Accordingly, an author may want to specify these angle data structures for content block data structure $412_2$ which is intended to define the analytics for a section of the narrative that describes whether the subject company's sales were rising or falling over the subject time period. Angle data structures $406_1$ and $406_2$ may specify one or more derived features (not shown by FIG. 4 for reasons of illustrative convenience), where these specified derived features generally represent a slope for the subject data values. Angle data structure $406_1$, which corresponds to the rising values characterization, may include specified applicability conditions for evaluating whether the slope-indicative derived feature has a positive value that exceeds some threshold, while angle data structure $406_2$, which corresponds to the falling values characterization, may include specified applicability conditions for evaluating whether the slope-indicative derived feature has a negative value that exceeds some threshold.

Each angle data structure can also specify associated computational logic 402 that are coded to evaluate whether the angle's applicability conditions are true (see computational logic structures $402_1$, $402_2$, $402_3$, . . . ). These computational logic structures can themselves use parameters for evaluating whether the specified applicability conditions are true so that they can inherit specifications from higher-level structures within the system. Thus, based on which of these angles' applicability conditions are found to be satisfied by the computational logic with respect to the subject data, the narrative generation platform can conclude which of the angle's corresponding characterizations accurately describes the subject data.

Further still, the content block data structure $412_2$ may associate these angle data structures $406_1$ and $406_2$ with blueprint set data structures $410_1$ and $410_2$ respectively. Thus, the blueprint set data structure $410_1$ specified by angle data structure $406_1$ can specify a tokenized blueprint such as "<Token 1> exhibited a rising trend during this time period.", where Token 1 is a parameter that corresponds to the name of the derived feature for derived feature data structure $408_2$ (or a variation thereof) (e.g. "Total sales"). Similarly, the blueprint set data structure $410_2$ specified by angle data structure $406_2$ can specify a tokenized blueprint such as "<Token 1> exhibited a falling trend during this time period." Also, it should be understood that this simple example is being used for illustration purposes. As explained in the above-referenced and incorporated patents and patent applications, more complex arrangements and specifications can be used.

As explained below and with reference to the above-referenced and incorporated patents and patent applications, the narrative generation platform can provide various GUI screens to its users to allow users to define components of this data architecture and compose story configurations through selection and definition of such components. The data structures that underlie these story configurations are described as modular because of their re-usability across different stories and story types based on how a user chooses to select and combine these components in different story configurations. Moreover, authors are able to compose story configurations without a need to write program code as the story configurations can be formed through selection and composition of the higher level data structures and their specifications rather than through manipulation of the computational logic-level code.

Thus, it can be seen that a story configuration can be defined by one or more specified communication goal data structures, where each communication goal data structure is in turn defined by one or more specified content block data structures, and where each content block data structure can be defined by virtually any combination of specified angle data structures, derived feature data structures, and blueprint data structures. This collection of specifications thus defines the data requirements of the story configuration in terms of the parameters needed for the specified components of the story configuration. Further still, it should be understood that the communication goals need not necessarily be explicitly represented within the system. For example, rather than using an explicit communication goal data structure to specify a collection of content blocks, a story configuration can also implicitly relate to a communication goal by simply specifying those same content blocks without use of an explicit communication goal data structure.

Returning to FIG. 3, the processor at step 304 assembles a list of the parameters that need to be tied to the data and metadata from the visualization in order for the narrative generation to operate. For example, with reference to the example of FIG. 4, the processor at step 304 would identify the various parameters needed for the blueprint sets, angles, and derived features specified by the content blocks of the relevant story configuration.

Next, at step 306, the processor determines the data and metadata from the visualization parameter data 214 that are to be used for each of the determined story parameters. The processor can use a parameter mapping data structure 320 to accomplish this operation. For example, the data structure 320 can be a table that maps various visualization parameters 322 (e.g., measure names, etc.) to each story configuration parameter 324 determined from step 304. For example, continuing the company sales example, data structure 320 may map the y-axis measure of the visualization data (e.g., "sales amount") to the parameter used in the story configuration for representing the raw data to be aggregated, which in turn allows the narrative generation platform to identify the data values for this measure in the visualization data that are to be used as the variables used by the story configuration for raw data of the mapped measure parameter. While FIG. 3 shows data structure 320 taking the form of a table, it should be understood that other structures such as mapping rules could be used.

Figure 5:
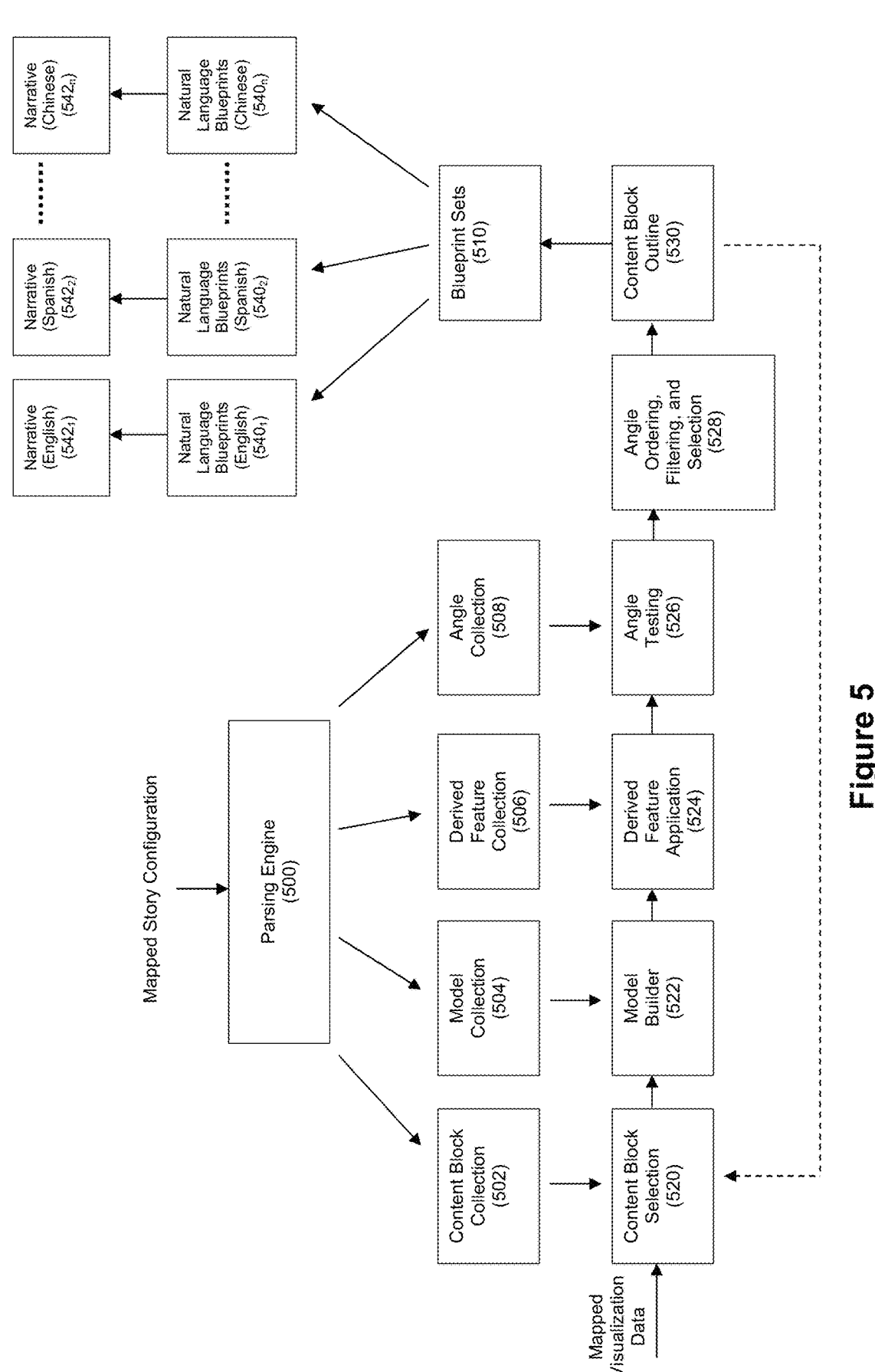
FIG. 5 depicts another example configuration and process flow for execution by a computer system to automatically generate a narrative from visualization data using the model described by FIG. 4.

Next, at step 308, the processor retrieves the mapped story configuration from memory, and the retrieved story configuration is supplied with the visualization data/metadata determined for the story configuration's parameters (step 310). The narrative generation platform can then generate the narrative story about the visualization using the story configuration and supplied visualization data/metadata using the techniques described in the above-referenced and incorporated patent applications (step 312). FIG. 5 shows an example configuration and process flow for execution by a computer system to automatically generate a narrative from visualization data using the model described by FIG. 4. This design serves as a domain-independent, general purpose narrative generation platform as discussed in the above-referenced and incorporated patents and patent applications.

Parsing engine 500 parses the mapped story configuration into its constituent components and generates executable machine code that serves as part of the narrative generation platform that processes input data to automatically generate narratives tailored to desired story type for the visualization. However, it should be understood that the narrative generation platform can employ an interpreter model in which the story configuration is incrementally used to select and execute code sequences.

The parsing engine 500 can build a content block collection 502 from the story configuration. If the story configuration includes only a single content block, the content block collection 502 in turn can comprise a single content block. However, if the story configuration comprises multiple content blocks, the content block collection 502 can be an ordered listing of these content blocks.

The parsing engine 500 can also build a model collection 504 based on the story configuration, where the model collection 504 serves to identify and constrain the data to be processed by the system (see step 304). Likewise, the parsing engine 500 can build a derived feature collection 506, an angle collection 508, and blueprint sets 510 based on the story configuration.

Processing logic instantiated as a result of the parsing engine 500 operating on the story configuration can then provide for content block selection 520. For example, when first processing the mapped visualization data/metadata, the processing logic can select the first content block of the story configuration in the content block collection 520. The processing logic can further build models for the data and compute any derived features that are necessary in view of the story specification (522 and 524). At 526, the processing logic tests the relevant angles for the subject content block in the angle collection 520. This operation can involve testing the specific data and derived features under consideration against the applicability conditions for the relevant angles. Based on which angle(s) is (are) deemed to accurately characterize the data and derived features, the processing logic can further order, filter, and select (528) one or more angles to be included in the narrative. As explained above and in the above-referenced and incorporated patents and patent applications, attributes of the subject content block and angle data structures can facilitate this decision-making.

Once the data has been modeled, the derived features have been computed, and one or more angles have been selected, the narrative generator instantiates a content block outline 530. The instantiated content block outline 530 can be a language-independent representation of the angles and features to be expressed for the section of the narrative represented by the subject content block, as described in the '844 patent.

If the story configuration comprises multiple content blocks, the execution can return to step 520 for the selection of the next content block for the story configuration. Otherwise, the content block outline 530 is ready to be converted into a natural language form via blueprint sets 510.

Each content block is linked to one or more blueprint sets 510, each containing parameterizable blueprints to express the angles and/or features determined within that content block in natural language, for example English $540_1$, Spanish $540_2$, and any other desired languages such as Chinese $540_n$, etc. When selected and parameterized, these result in generating the actual text of the narrative in the desired language(s) (see $542_1$, $544_2$, . . . $544_n$). Thus, the process flow of FIG. 3 describes how the narrative generation platform can use artificial intelligence technology to translate structured visualization data into a natural language narrative text which can then be returned to the visualization platform 200 (and the visualization platform may then render this narrative text accompanying display with the visualization). It should be understood that the order of steps shown by FIG. 3 may be varied somewhat if desired by a practitioner. For example, step 308 could be performed at any point after step 302 and before step 310. Also, it should be understood that the steps of FIG. 3 need not all be performed by the narrative generation platform 202. For example, step 300 or steps 300 and 302 can be performed by a plug-in executed by the visualization platform 200.

Figure 1A:
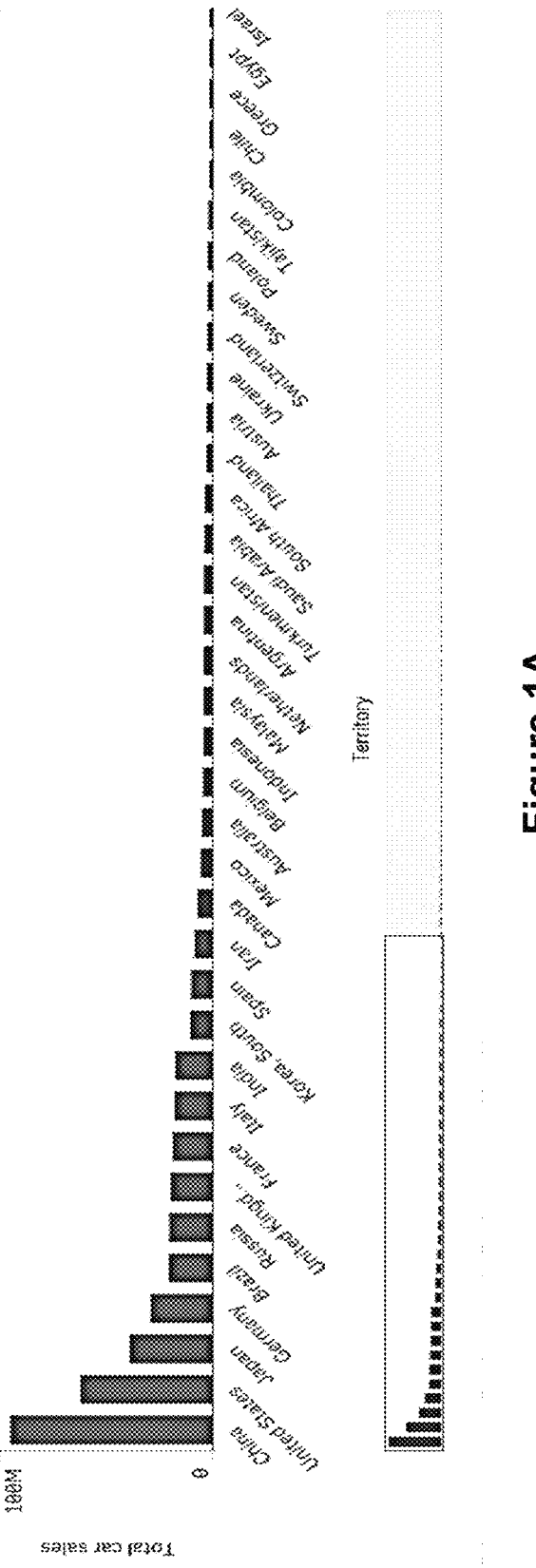
FIGS. 1A and 1B depict examples of different visualizations generated from a different sets of visualization data.
Figure 1B:
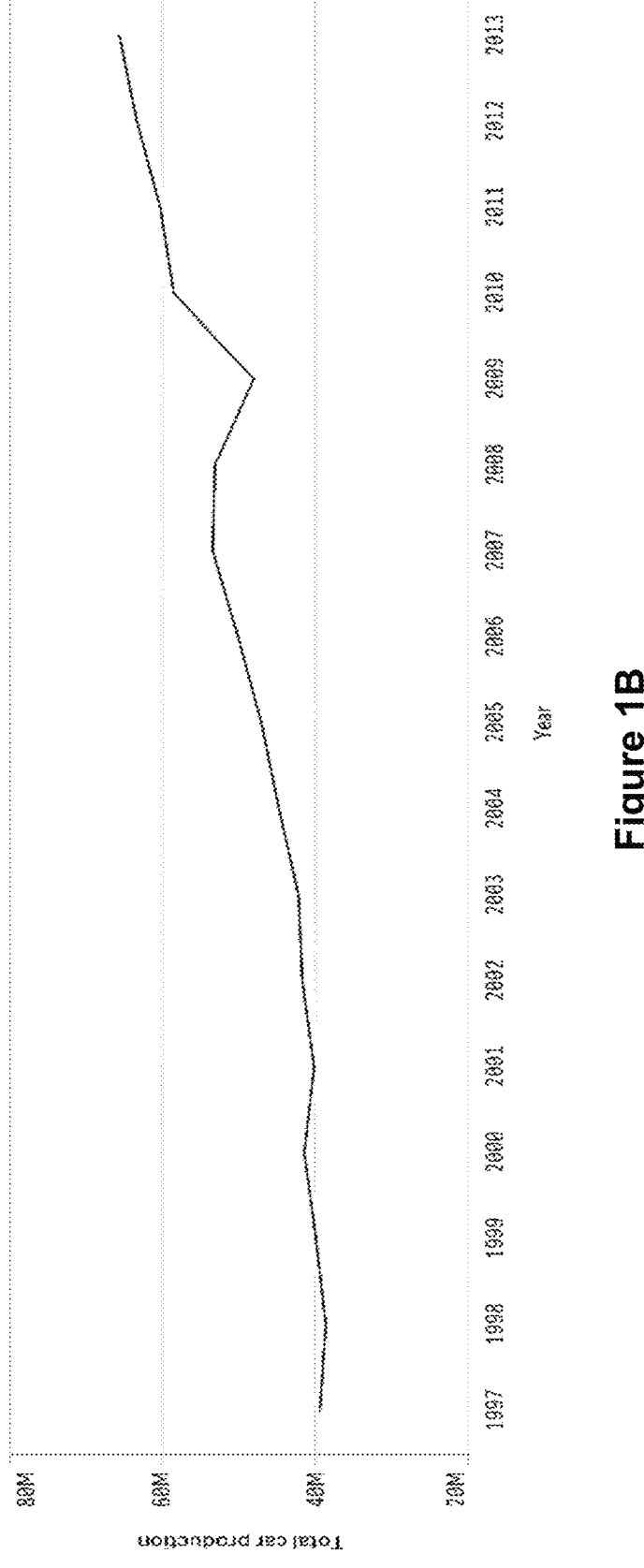

FIG. 6A shows an example pairing of the visualization of FIG. 1A with narrative text 600 that explains salient aspects of that visualization according to a story configuration operated on by the narrative generation platform of an example embodiment. FIG. 6B shows an example pairing of the visualization of FIG. 1B with narrative text 600 that explains salient aspects of that visualization according to a story configuration operated on by the narrative generation platform of an example embodiment. FIG. 6C shows an example pairing of the visualization of FIG. 2C with narrative text 600 that explains salient aspects of that visualization according to a story configuration operated on by the narrative generation platform of an example embodiment.

E. APIs, Input/Output, and Data Formats

An example embodiment of the system described herein accepts visualization data from a visualization platform in JSON format. With the example of FIG. 2A, the narrative generation platform 202 interacts with APIs of visualization platforms, and in one example embodiment, the narrative generation can be implemented in the form of an authoring service with an API end point, this data structure supports integrations as follows.

To generate a narrative, our example visualization service API uses:

1. Names of measures.
2. Names of dimensions.
3. For each dimension, a list of the dimension values.
4. For each measure, a list of the measure values.
5. Visualization type and parameterizations; as discussed above, from this, the system will determine what type of narrative is to be generated (including determination of appropriate analytics, e.g., continuous dimension analysis, discrete dimension analysis, correlation analysis, etc.).

These data are basically the same as those required to create a visualization. A small transform might be used to turn a given visualization platform's data representation into a data format our visualization API expects, but the required data would be the same.

In addition to these basic data, as discussed earlier, the resulting narratives can be enhanced or augmented based on the availability of additional metadata such as characterizations of the measures and dimensions. Again as previously discussed, these may either be inferred by the system, based on the parameterization of the visualization system, or they may be provided directly by the user. Some examples of these additional inputs have been described above, but may also include:

1. How should numbers be formatted.
2. What format would the user like to see narratives generated in (bullets or paragraphs).
3. How long/short should the narrative be.
4. What are the customized names of the dimension (e.g., refer to periods as "months").
5. Is "up" good or bad?
6. Are the values percentages?
7. Is one measure a portion of another measure?
8. What analytic packages should be enabled/disabled, and what is their rank in importance to the user?

These user inputs and customizations can be added to the visualization parameter data structure 214 passed to our visualization service API to generate a narrative.

While the example API currently accepts JSON as its data format, it should be understood that other formats may be used. For example, ETL tools or other applications exist that could take in other formats (such as tabular data) and transform it into the API schema. Via such an approach, a narrative could be written about, e.g., tabular source data, as well.

Turning now to the rendering of the resulting stories, and their presentation to the user(s), visualization platforms typically accept HTML back from our narrative generation platform and display that content within the platforms themselves. Often the mechanism to invoke our narrative system will be made available to the user as an extension to the platform, and presented to the user in its GUI as an object that can be dragged into a dashboard or other means of manipulating and viewing the source visualization. Once invoked, this object will execute the browser code to pull data from the source visualization, pass that data to our visualization service API, and then render the resulting content as HTML within that object.

Our system can also be responsible for taking additional input such as "story format: bullets or paragraphs," and wrapping the generated content in the appropriate HTML tags that will result in displaying the content as expected by the user.

Figure 7A:
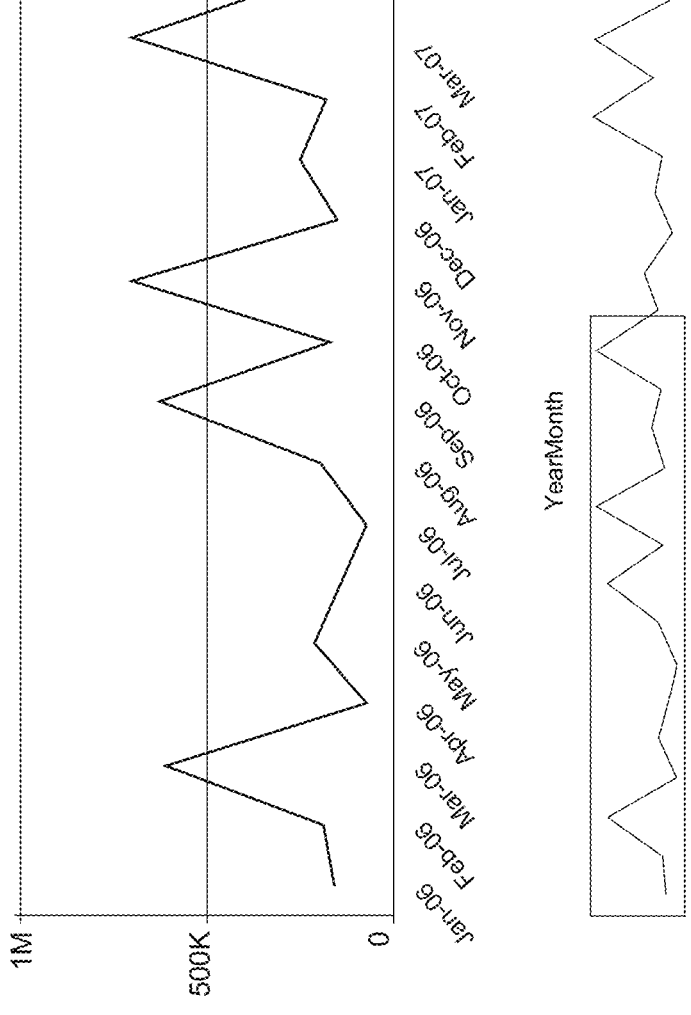
FIG. 7A depicts an example visualization generated from visualization data.

FIG. 7A shows an example visualization that is used to generate narrative text that is returned from the narrative generation platform 202 in HTML in the form shown by FIG. 7B. The HTML of FIG. 7B can be appropriately parsed when rendered in the graphical object representing our narrative system within the visualization system's browser interface. FIG. 7C shows an example of the resulting, complete narrative 700 as presented within an "object" on the dashboard of an exemplary visualization platform. To the left is the visualization as configured by the user; the highlighted box on the right contains the accompanying narrative 700 generated by the narrative generation platform 202.

F. Example Configuration and Application

In this section, we will describe how a portion of the content in an exemplary narrative is generated from data relating to a visualization using an example embodiment in the form of Narrative Science's Quill platform. We will focus first on how a configuration is determined and applied in computational terms, and then more broadly on how data are transformed to generate the resulting narrative.

Consider the line chart 800 depicted in FIG. 8A, measuring revenue by month, and its associated narrative 802. Let's focus on the third bullet from the top, and specifically the following sentences:

Revenue fell 35.92% over the course of the series from $4.5 million to $2.9 million. The largest single decrease, which was a 33.35% drop from $4.6 million to $3.1 million (−$1.6 million), occurred between June-06 and July-06.

Figure 8B:
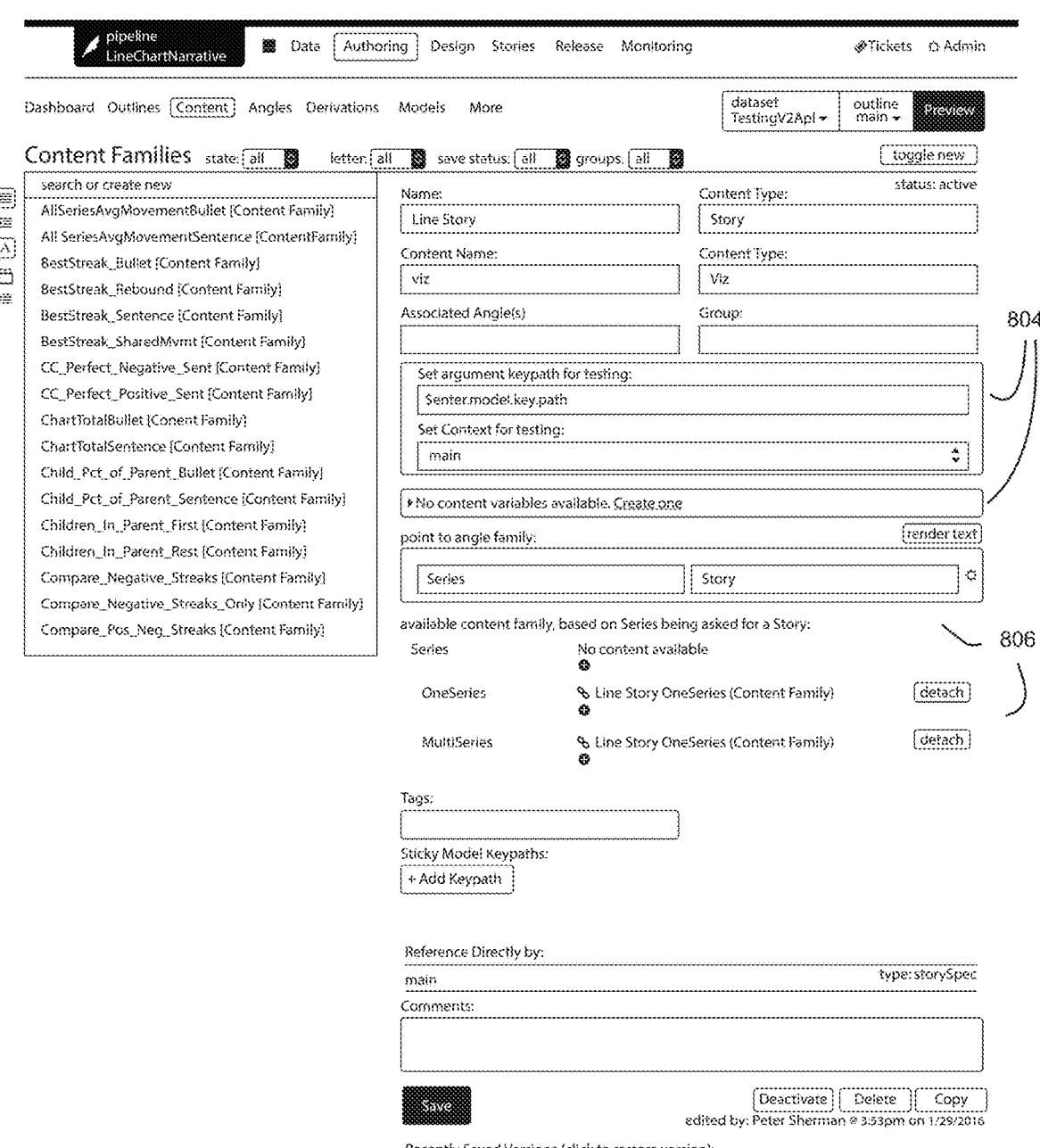

In the process of generating this narrative, the first check that occurs, after identifying this as a line chart, is determining whether the chart contains one series or multiple series. FIG. 8B shows the highest-level portion of the story configuration for line charts in Quill, presented via a GUI utilized to configure the system. On the left is a navigation bar for navigating to configuration elements. On the right is the top level of the configuration's story outline. There are two possible alternatives for narrative generation, depending on how many series are contained in the visualization. Portion 804 of the outline specifies where to find the relevant data; and portion 806 shows the two alternative sub-outlines, one for single series line charts, and the other for multi-series line charts.

At run time, when this configuration is being used to generate a narrative, a logic test is executed in order to actually decide which sub-outline to utilize. This test is depicted in the portion of the configuration shown by FIG. 8C, which represents a derivation in Quill that returns either 'True' or 'False'. In this case, the test is 'true' because the chart contains just one series. The example of FIG. 8C also shows the computational logic 808 that is linked with the subject derived feature.

Once the determination has been made to generate a narrative about just a single series, the story generation process invokes the appropriate portion of the configuration (a content block), which specifies in turn that the narrative is to be composed of several paragraphs that describe, assess, and explain the performance of a single series. FIG. 8D is a GUI that illustrates this content block, which in turn consists of other six other sub-outlines or content blocks 810 that specify the nature of the content elements (typically formulated as separate paragraphs) to be generated by Quill.

Driving down even further in the outline, the specific narrative content we are exploring that is associated with the initial example chart—corresponding to the sentences concerning revenue highlighted earlier—is specified within the "OneSeriesBulletHolder" content block. This component of the configuration defines in more detail the specific portion of the configuration concerning data related to individual series that is involved in generating the sentences above.

FIG. 8E reveals a deeper dive into the configuration pertaining to that series-specific content. This part of the narrative is concerned with basic aggregate statistics about the series—min, max, median, average—as well as the overall movement of the series. Each of the sub-outlines or content blocks specified in portion 812 defines how to generate content relevant to one of these aspects of the data. The example content we have highlighted at the top of this section concerns the overall movement of the series.

The specification includes tests aimed at ensuring that the characterization of the series in terms of its overall movement—i.e., the angle that is conveyed in the narrative—accurately reflects the underlying data. The selected characterization in turn will determine which of several 'blueprint sets' will be utilized in order to generate natural language that conveys the appropriate characterization. FIGS. 8F and 8G depict the corpus of possible blueprint sets, part of the overall configuration for this story type, that could be utilized in generating the part of the narrative aimed at conveying content about the series' overall movement.

As described above, in order to determine which of these blueprint sets will be utilized, the appropriate angle must be determined. This can be accomplished by utilizing a component of the configuration known as an angle family. This entails examining a set of cases, each specifying one possible angle included in the angle family, and each also comprising a Boolean test that determines whether or not that angle is applicable. Each of these angles is associated with specific content, which can be generated by the associated blueprint set. Any angle that is 'true', could potentially have content generated about it and included in the final narrative.

Figure 8H:
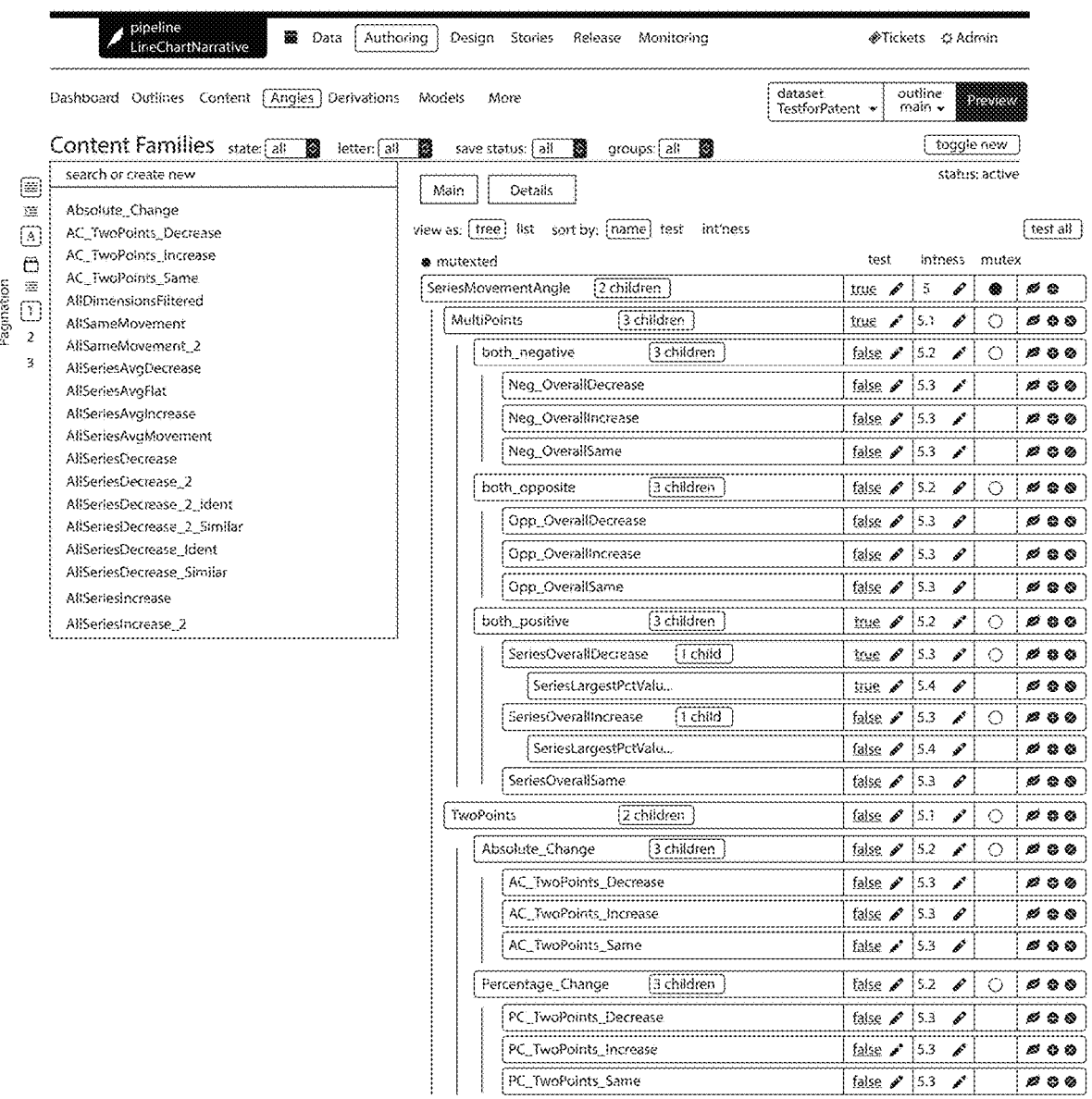

FIG. 8H depicts one possible set of evaluations for this angle family, and it illustrates that several angles evaluate as true. "Interestingness" (as discussed in greater detail in the above-referenced and incorporated patents and patent applications) can be used to rank these, and the most 'interesting' angle can be the one that will be selected for inclusion in the narrative. Interestingness is determined in this case by the number of conditions (all must be true) that are met by the particular angle or characterization, which in turn reflects how informative that characterization is (in that it depends on the most conditions). In this particular instance, that is the one that is the "most nested," which is the angle called "SeriesLargestPctValueDecSame".

Three conditions need to be true in order for this angle to evaluate as true. These are represented as derived features in the configuration.

FIG. 8I depicts the logic test for the first condition, "both_positive". This test is looking to see that the start and finish value of the series are both positive numbers. In this particular case, that's true because the start value of the series is 4471954.159 and the end value is 2865437.539, both positive.

FIG. 8J depicts a logic test for 'overall_series_decrease', the second condition. This is checking to see if the difference between the starting value and ending value is a negative number. In this case, the start to finish difference in the series is −1606516.62.

Figure 8K:
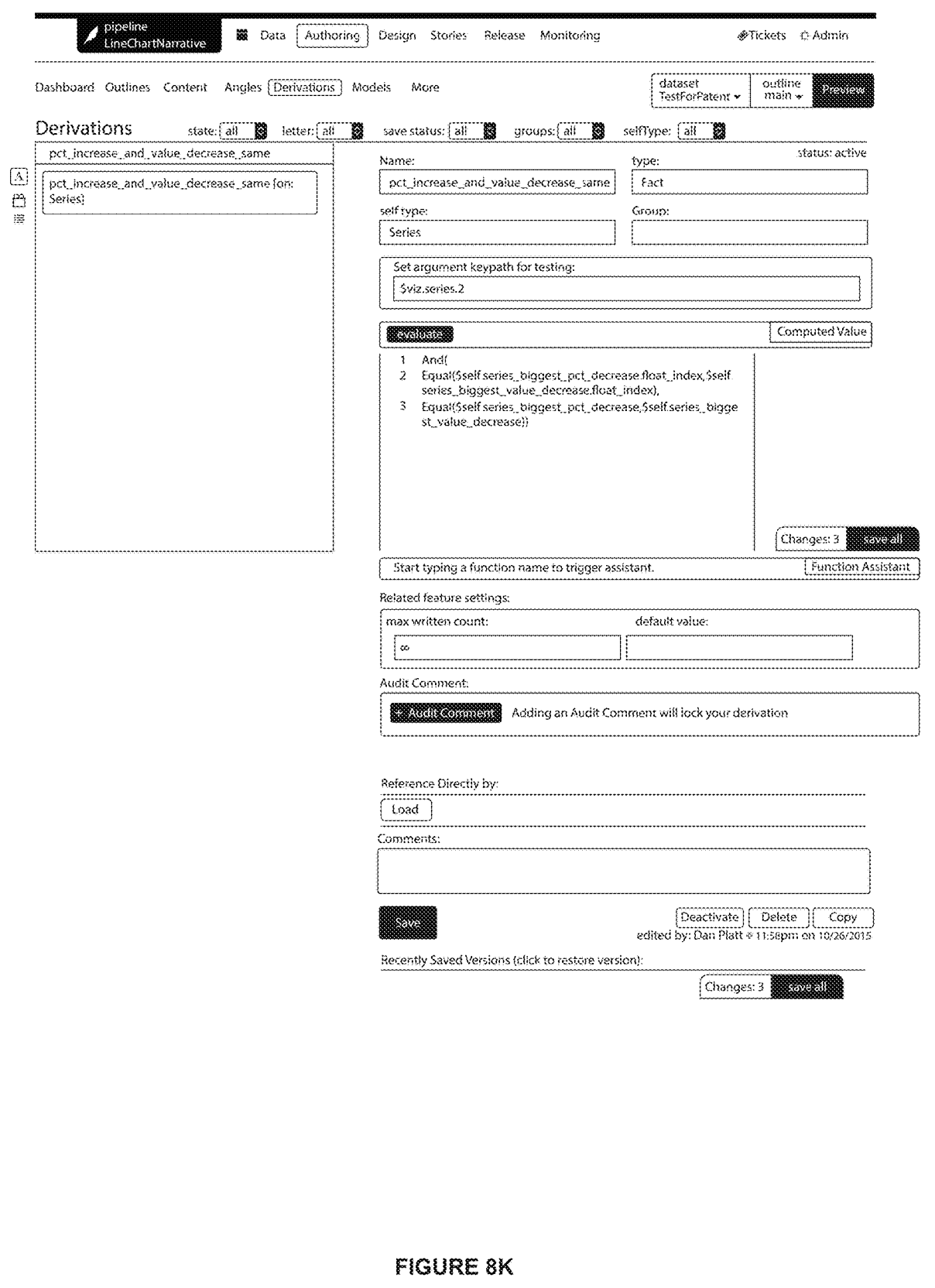

The final condition (depicted in FIG. 8K), checks whether the largest percent change in the series occurs during the same interval as the largest absolute change. In this case, the largest percent decrease and largest absolute decrease are both at the index number '6' in the series.

With all three of these conditions proving true, this angle is determined to be both applicable (appropriate) and the most interesting. The narrative will therefore include the content associated with this angle. FIG. 8L depicts the component of the configuration (blueprint) that will be utilized to guide the generation of this content. This blueprint is a combination of language and variables. The variables referenced in this blueprint include:

Overall percent change of the series

Starting value of the series

Ending value of the series

Percent value of the largest point-to-point decrease.

Numerical value of the start of the largest point-to-point decrease

Numerical value of the end of the largest point-to-point decrease.

The dimension value of the start of the largest point-to-point decrease

The dimension value of the end of the largest point-to-point decrease

Utilization of this blueprint, as determined by the system using the logic and structures represented in the configuration (outline) as described above, along with the actual values of the data, result in the generation of the following language for inclusion in the narrative associated with this visualization, as highlighted at the start of this extended example: "Revenue fell 35.92% over the course of the series from $4.5 million to $2.9 million. The largest single decrease, which was a 33.35% drop from $4.6 million to $3.1 million (−$1.6 million), occurred between June-06 and July-06."

G. End-to-End Process: An Example

Figure 9A:
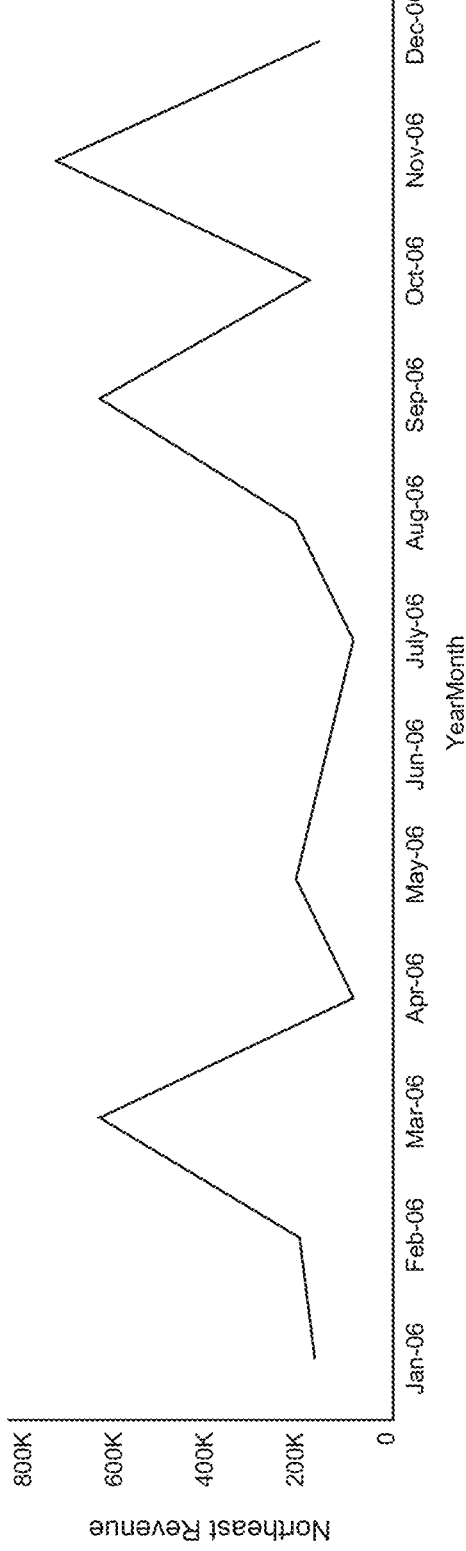
FIG. 9A depicts another example visualization of revenue by month.

The next example will describe a full process of generating a narrative to accompany the chart shown by FIG. 9A. This chart is a 12-period line chart measuring revenue by month.

When a user requests a narrative to be presented in conjunction with this visualization, the raw data that comes from this visualization platform for this particular line chart may be as shown by FIGS. 9B and 9C (which corresponds to a single data representation broken across two figures). This data representation contains all of the data necessary to generate an appropriate narrative to be presented with this chart. It includes the list of all the dimension values and the dimension name, along with the list of all of the values for the measure and the measure name. This data representation also contains metadata about the desired number format and how the user wants to see the narrative formatted.

Our extension for this particular platform takes this data and transforms it slightly to meet the data specification used by our example visualization service API. In this particular implementation, this transformation is carried out in the user's web browser. When the data leaves that transform step, it appears as shown in FIG. 9D. This data representation is simply an alternative representation of the raw (pre-analyzed) data. The main difference from the original source representation is that that original representation lists out data as an array of "points," where each point contains an x value and y value. As a user adds more measures or dimensions, organizing the data in such a format can lead to unwieldy growth in the size of the necessary data structure. This transform instead organizes the data as a list of values within each measure, and a list of values within each dimension.

Of particular note, in this instance the "is_continuous" flag set to "true" because the user chose to write about a line chart. As discussed earlier, this kind of information can be useful for determining the appropriate story type, with associated analytics, characterizations, organization, and language. And again, it should be noted that this could be determined in other ways, for example by looking at the nature of the data parameterizing the visualization.

At this point, our system applies the relevant analytics associated with the appropriate story type, as specified in the configuration, to the data. As discussed above and in the above-referenced and incorporated patents and patent applications, the resulting analyses include derived features that help to determine appropriate facts and characterizations for inclusion in the resulting narrative. The resulting analyzed data, including a variety of relevant aggregated measures, such as range, maxima, minima, periods of continual rise or decline, etc., appear as shown in FIGS. 9E-H (which corresponds to a single data representation broken across four figures).

Figure 9J:
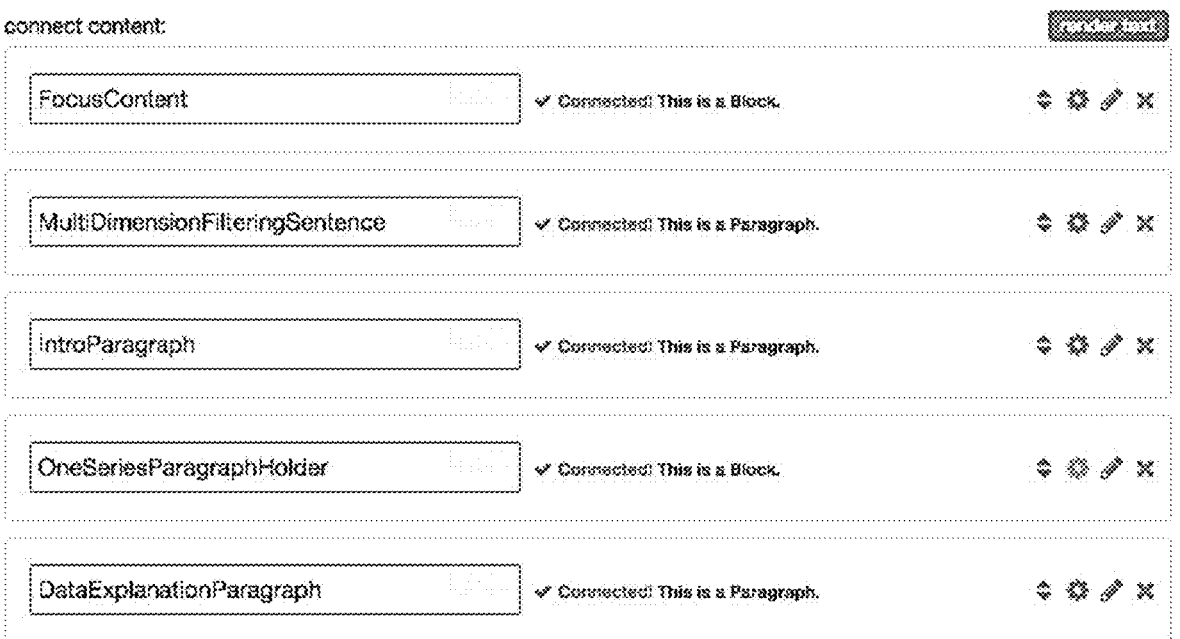

The story configuration used to generate an appropriate story also specifies a story outline that includes sections as shown by FIG. 9I. Portions of the actual configuration for this story type, as shown in a user interface used to construct, inspect, and modify such configurations, can be seen in FIGS. 9J and 9K. More detailed descriptions of such configurations are provided in the previous section and its accompanying figures.

Once the entire authoring configuration has been executed, the system outputs a representation of the story that looks as shown by FIG. 9L. This representation is then output in XML in which variables and pieces of content are tagged for the purpose of appropriate rendering and styling, but before the formatting and styles have been applied.

Once our system's number styling rules have been applied, the content goes through a "rendering" step, in which the content is transformed into HTML for presentation to the user(s) within the object representing our narrative system within the visualizations platform's GUI. Once this step is complete, the HTML form of narrative appears as shown by FIG. 9M. At this point, the HTML is returned to the browser via the API and displayed within the narrative object in the visualizations system's dashboard with proper formatting, as shown by FIG. 9N.

H. Multiple and Interactive Visualizations

A useful feature of many current visualization platforms is that a user can navigate and select different aspects of the data, switching to different "views" and creating multiple visualizations that may lead to different insights. For example, a user may select a subset of the entities in a dataset or bar chart, "drilling down" to focus on a specific comparison. Or, in viewing temporal or other continuous data on a line chart, the user may specify a particular interval of interest. This results in multiple related visualizations, which may be ephemeral and in the moment, or may be saved and organized to create a series of visualizations that tell a more complete story. In such cases it makes sense for the narrative accompanying each individual visualization to focus on the specific data—e.g., relevant to specific entities, intervals, etc.—selected by the user to create that visualization.

The narrative generation technology described herein can be adapted to automatically generate a new story for each of these new visualizations. In the simplest case, this narrative is generated without regard to the context of previous visualizations—that is, each narrative is crafted individually to accompany each visualization without regard for the fact that that visualization is related to any previous (or subsequent) visualization. But the ability to generate multiple visualizations based on different portions of the same dataset, perhaps using some kind of interactive capability, opens up the possibility of generating sequences of stories that are clearly related to each other—in fact, of crafting an overarching narrative of the sequence of data and visualizations selected by the user, itself. The result would be to generate a narrative involving multiple related visualizations (whether or not those arise from an interactive process), presented over time as a series, or all at once in a single "document."

In an approach we have developed in order to accomplish this, the narrative generation platform can be provided with three sets of information and data: access to the data involved in the current visualization; access to data involved in one or more previous visualizations in the series; and the nature of the relationship between those data and visualizations.

For example, suppose the user has generated a single line chart over some time interval, and the next visualization is the same data over some sub-interval. The relationship between these two visualizations and the corresponding datasets is that one provides a more detailed, granular view of a portion of the data: It is an instance of "zooming in" or "focusing" on a smaller region of the data. (One might of course "zoom out" as well.) In this case, it would make sense for the second narrative to explicitly explain this relationship to the first visualization as a way of providing a coherent transition. For example, the narrative accompanying the second visualization might be prefaced with an expression such as, "Zooming in to the May to July time period, . . . " It might also make sense to configure or adapt the narrative generation engine to compare and characterize the behavior of the data in that region to the behavior of the data in the larger set as a whole.

Similarly, suppose that the user generates, from a dataset describing annual vehicle production in a number of countries over some number of years, a bar chart describing the production of a single country. If the next chart generated by the user is based on the same dataset, but focused on a different country, resulting in a different bar chart, then it would make sense for the narrative accompanying this chart both to discuss both the data represented in the chart itself, and also the comparison between those data and the data presented in the previous chart. And indeed if the user went on to develop a number of charts for a number of different countries, then it would make sense for each chart to be compared with the previous chart, as well as perhaps with datasets and charts for other previous countries that might be similar in relevant respects, e.g., scale of production, or direction over the interval (whether increasing or decreasing).

To take another example, a dataset might describe the total sales for an organization over two quarters, as well as sales for major product lines that constitute those total sales over the two quarters; and the visualization selected by the user might be a clustered bar chart expressing both of those in combination. The user might then focus on (e.g., by focusing the visualization system on) the large components that have changed the most. In ordinary terms, we would say that the second visualization is focused on the drivers that led to the overall change reported in the first visualization. We would want to configure or adapt the narrative generation platform to express these relations. In order to do that, the system may be configured to, first, be provided with the information, or be able to determine, that the constituents of the aggregated data (e.g., total sales) constitute components of that total, and are in some sense siblings of each other; and second, it can determine that focusing on the large components that have changed the most is a "drill-down" strategy aimed at explaining the change in the overall (aggregate) category in terms of changes in the constituent elements or categories, so that it can configure or adapt the narrative generation engine appropriately in order to express these relations.

In sum, to generate such narratives overarching several related visualizations, the system can employ larger story types that describe the relations among different related datasets (or different components of the same dataset) and among the visualizations selected by the user to display those datasets or components.

In order to utilize such overarching or connected story types, our approach utilizes a mapping between, on the one hand, kinds of relations among datasets (or components of datasets)—e.g., subset, sibling, etc.—and visualizations (and parameterizations) used to display those datasets or components, and, on the other, these larger story types that analyze, characterize, and discuss these relations in useful terms. These story types in turn will comprise, in our approach, story specifications or outlines including outline sections, analytic methods, and characterizations (e.g., content blocks, angles, derivations), and other components required to generate the appropriate story based on the specific data at hand.

While the invention has been described above in relation to its example embodiments, various modifications may be made thereto that still fall within the invention's scope. Such modifications to the invention will be recognizable upon review of the teachings herein.

The invention claimed is:

1. A method comprising:

receiving, from a user interface, user input including visualization parameter data indicating a selection of a visualization type from among a plurality of different visualization types for visualization of a structured data set;

obtaining, using a processor, metadata associating a natural language narrative story type with the visualization type;

determining, using the metadata, a subset of the structured data set based on the visualization parameter data;

determining a data visualization corresponding to the visualization type based on the subset of the structured data set, the data visualization comprising a visual representation of the subset of the structured data set configured based, at least in part, on the visualization type;

applying, using the metadata, a mapping of the subset of the structured data set to a story configuration for the natural language narrative story type; and generating, using the processor, a natural language narrative story about the structured data set based on the story configuration, the data visualization and the natural language narrative story generated by the processor being capable of being displayed in coordination in a display of a computing device.

2. The method recited in claim 1, the method further comprising:

displaying the natural language narrative story in coordination with a display of the visualization.

3. The method recited in claim 1, wherein the different visualization types comprise a bar chart and a line chart, wherein (1) bar charts are associated with a first story type and (2) line charts are associated with a second story type that is different than the first story type.

4. The method recited in claim 3, wherein the first story type defines a story that compares a plurality of elements of the bar chart, and wherein the second story type defines a story that describes a trend in a plurality of data values of the line chart.

5. The method recited in claim 4, wherein the story configuration comprises a plurality of narrative analytics, the method further comprising executing the narrative analytics using a plurality of data elements from the structured data set that correspond to the subset of the structured data set mapped to the story configuration to determine data content for expression in the natural language narrative story.

6. The method recited in claim 4, the method further comprising determining a characterization of the structured data set based on execution of the narrative analytics, and wherein the natural language narrative story expresses the characterization using natural language.

7. The method recited in claim 6, wherein the story configuration defines an outline for the natural language narrative story.

8. The method recited in claim 1, wherein the visualization parameter data includes a measure name and a measure data type for a plurality of data elements shown by the data visualization.

9. The method recited in claim 1, wherein the visualization parameter data includes a dimension name and a dimension type for the data visualization.

10. The method recited in claim 1 wherein the visualization type comprises a chart selected from the group consisting of: a line chart, a bar chart, and a histogram.

11. The method recited in claim 1, wherein the different visualization types include a first line chart with a single line and a second line chart with multiple lines, wherein line charts with a single line are associated with a first story type and line charts with multiple lines are associated with a second story type that is different than the first story type.

12. The method recited in claim 11, wherein the first story type defines a story that describes a trend in a plurality of data values of the line chart, and wherein the second story type defines a story that characterizes a correlation between (1) a plurality of data values that correspond to a first line of the multiple lines and (2) a plurality of data values that correspond to a second line of the multiple lines.

13. The method recited in claim 1, wherein the processor is part of a narrative generation platform, wherein the narrative generation platform is configured to (1) receive the visualization parameter data from a visualization platform and (2) provide the natural language narrative story to the visualization platform for display in coordination with the visualization.

14. The method recited in claim 1, wherein the processor comprises a plurality of processors.

15. One or more non-transitory computer readable media having instructions stored thereon for performing a method, the method comprising:

receiving, from a user interface, user input including visualization parameter data indicating a selection of a visualization type from among a plurality of different visualization types for visualization of a structured data set;

obtaining, using a processor, metadata associating a natural language narrative story type with the visualization type;

determining, using the metadata, a subset of the structured data set based on the visualization parameter data;

determining a data visualization corresponding to the visualization type based on the subset of the structured data set, the data visualization comprising a visual representation of the subset of the structured data set configured based, at least in part, on the visualization type;

applying, using the metadata, a mapping of the subset of the structured data set to a story configuration for the natural language narrative story type; and generating, using the processor, a natural language narrative story about the structured data set based on the story configuration, the data visualization and the natural language narrative story generated by the processor being capable of being displayed in coordination in a display of a computing device.

16. The one or more non-transitory computer readable media recited in claim 15, the method further comprising:

displaying the natural language narrative story in coordination with a display of the visualization.

17. The one or more non-transitory computer readable media recited in claim 15, wherein the different visualization types comprise a bar chart and a line chart, wherein (1) bar charts are associated with a first story type and (2) line charts are associated with a second story type that is different than the first story type, wherein the first story type defines a story that compares a plurality of elements of the bar chart, and wherein the second story type defines a story that describes a trend in a plurality of data values of the line chart, wherein the story configuration comprises a plurality of narrative analytics, the method further comprising executing the narrative analytics using a plurality of data elements from the structured data set that correspond to the subset of the structured data set mapped to the story configuration to determine data content for expression in the natural language narrative story.

18. A system including a processor and memory, the system configured to perform a method comprising:

receiving, from a user interface, user input including visualization parameter data indicating a selection of a visualization type from among a plurality of different visualization types for visualization of a structured data set;

obtaining, using the processor, metadata associating a natural language narrative story type with the visualization type;

determining, using the metadata, a subset of the structured data set based on the visualization parameter data;

determining a data visualization corresponding to the visualization type based on the subset of the structured data set, the data visualization comprising a visual representation of the subset of the structured data set configured based, at least in part, on the visualization type;

applying, using the metadata, a mapping of the subset of the structured data set to a story configuration for the natural language narrative story type; and generating, using the processor, a natural language narrative story about the structured data set based on the story configuration, the data visualization and the natural language narrative story generated by the processor being capable of being displayed in coordination in a display of a computing device.

19. The system recited in claim 18, the method further comprising:

displaying the natural language narrative story in coordination with a display of the visualization.

20. The system recited in claim 18, wherein the different visualization types comprise a bar chart and a line chart, wherein (1) bar charts are associated with a first story type and (2) line charts are associated with a second story type that is different than the first story type, wherein the first story type defines a story that compares a plurality of elements of the bar chart, and wherein the second story type defines a story that describes a trend in a plurality of data values of the line chart, wherein the story configuration comprises a plurality of narrative analytics, the method further comprising executing the narrative analytics using a plurality of data elements from the structured data set that correspond to the subset of the structured data set mapped to the story configuration to determine data content for expression in the natural language narrative story.

* * * * *